(12) United States Patent  
Kondo et al.

(10) Patent No.: US 7,576,780 B2  
(45) Date of Patent: Aug. 18, 2009

(54) SIGNAL PROCESSING METHOD AND APPARATUS AND RECORDING MEDIUM

(75) Inventors: Tetsujiro Kondo, Tokyo (JP); Junichi Ishibashi, Saitama (JP); Takashi Sawao, Tokyo (JP); Seiji Wada, Kanagawa (JP); Tohru Miyake, Tokyo (JP); Takahiro Nagano, Kanagawa (JP); Naoki Fujiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 11/446,886

(22) Filed: Jun. 5, 2006

(65) Prior Publication Data

US 2006/0227219 A1    Oct. 12, 2006

Related U.S. Application Data

(62) Division of application No. 09/830,858, filed as application No. PCT/JP00/09421 on Dec. 28, 2000.

(30) Foreign Application Priority Data

Dec. 28, 1999   (JP)   ................... 11/373782

(51) Int. Cl.  
*H04N 5/225* (2006.01)  
(52) U.S. Cl. ............... 348/220.1; 348/222.1; 348/208.1  
(58) Field of Classification Search ............. 348/220.1, 348/222.1, 208.1, 208.4, 208.13, 208.16, 348/586, 607, 154, 155, 254; 382/254, 255, 382/274, 275, 266, 268, 236; 358/3.26, 3.27, 358/501, 577, 538, 452, 453, 463  
See application file for complete search history.

(56) References Cited

U.S. PATENT DOCUMENTS

| 4,689,671 A | * | 8/1987 | Ohki et al. ............. 375/240.13 |
| 5,508,747 A | * | 4/1996 | Lee ............................ 348/441 |
| 5,528,300 A | * | 6/1996 | Kim ...................... 375/240.12 |
| 6,035,067 A | * | 3/2000 | Ponticos ..................... 382/226 |

FOREIGN PATENT DOCUMENTS

EP    0 455 444 A1    11/1991

(Continued)

OTHER PUBLICATIONS

Tull D L et al: "Iterative restoration of fast-moving objects in dynamic image sequences" Optical Engineering SPIE USA, vol. 35, No. 12, Dec. 1996, pp. 3460-3469, XP00067873 ISSN: 0091-3286.

(Continued)

*Primary Examiner*—Sinh N Tran  
*Assistant Examiner*—Yogesh Aggarwal  
(74) *Attorney, Agent, or Firm*—Frommer Lawrence & Huag LLP; William S. Frommer; Thomas F. Presson

(57) ABSTRACT

A signal processor 12 acquires a second signal obtained by detecting a first signal, as a signal of the real world, having a first dimension. The second signal is of a second dimension lower than the first dimension and has distortion relative to the first signal. The signal processor 12 performs signal processing which is based on the second signal to generate a third signal alleviated in distortion as compared to the second signal.

5 Claims, 75 Drawing Sheets

FOREIGN PATENT DOCUMENTS

| | | |
|---|---|---|
| EP | 0 502 615 A2 | 9/1992 |
| EP | 0 551 077 A2 | 7/1993 |
| EP | 0 771 107 | 5/1997 |
| EP | 0 933 727 | 8/1999 |
| EP | 98 303 415.8 | 7/2006 |
| GB | 2 279 531 | 1/1995 |
| JP | 4-11471 | 1/1992 |
| JP | 4-280171 | 10/1992 |
| JP | 6-137974 | 5/1994 |
| JP | 7-325906 | 12/1995 |
| WO | WO 92 05662 | 4/1992 |
| WO | WO 99 22520 | 5/1999 |

OTHER PUBLICATIONS

Patent Abstracts of Japan, vol. 1998, No. 11, Sep. 30, 1998 & JP 10 164436 A (Sony Corp), Jun. 19, 1998.

Michaelis B et al: "Compensation of motion blur in binary images" Pattern Recognition, 1992. vol. III. Conference C: Image, Speech and Signal Analysis, Proceedings., $11^{th}$ IAPR International Conference on the Hague, Netherlands Aug. 30-Sep. 3, 1992, Los Alamitos, CA, USA,IEEE Comput. Soc, US, Aug. 30, 1992, pp. 561-564, XP010030231 ISBN: 0-8186-2920-7.

Chen W-G et al: "Image Motion Estimation From Motion Smear-A New Computational Model" IEEE Transactions on Pattern Analysis and Machine Intelligence, IEEE Service Center, Los Alamitos, CA, US, vol. 18, No. 4, Apr. 1, 1996, pp. 412-425, XP000591169 ISSN: 0162-8828.

Wang Y F et al: "3D shape and motion analysis from image blur and smear: a unified approach" Sixth International Conference on Computer Vision (IEEE Cat. No. 98CH36271) Narosa Publishing House New Delhi, India, 1998, pp. 1029-1034, XP002398151 ISBN: 81-7319-221-9.

Dubuisson M-P et al: "Contour Extraction of Moving Objects in Complex Outdoor Scenes" International Journal on Computer Vision, Kluwer Academic Publishers, Norwell, US, vol. 14, No. 1, Jan. 1995, pp. 83-105, XP000486840 ISSN: 0920-5691.

Toyama K et al: "Wallflower: principles and practice of background maintenance" Computer Vision, 1999. The Proceedings of the Seventh IEEE International Conference on Kerkyra, Greece Sep. 20-27, 1999, Los Alamitos, CA, USA,IEEE Comput. Soc, US, Sep. 20, 1999, pp. 255-261, XP010350430 ISBN: 9-7695-0164-8.

Dinstein I: "A New Technique for Visual Motion Alarm" Pattern Recognition Letters, North-Holland Publ. Amsterdam, NL, vol. 8, No. 5, Dec. 1, 1988, pp. 347-351, XP000118647 ISSN: 0167-8655.

Bascle B et al: "Motion Deblurring and Super-Resolution From an Image Sequence" European Conference on Computer Vision, Berlin, DE, vol. 2, 1996, pp. 573-582, XP008025986.

Andrew J Patti et al: "Superresolution Video Reconstruction with Arbitrary Sampling Lattices and Nonzero Aperture Time" IEEE Transactions on Image Processing, IEEE Service Center, Piscataway, NJ, US, vol. 6, No. 8, Aug. 1997, XP011026196 ISSN: 1057-7149.

Irani M et al: "Image Sequence enhancement using multiple motions analysis" Proceedings of the Computer Society Conference on Computer Vision and Pattern Recognition. Champaign, IL, Jun. 15-18, 1992, New York, IEEE, US, Jun. 15, 1992, pp. 216-221, XP010029353 ISBN: 0-8186-2855-3.

Stern A et al: "Restoration and Resolution Enhancement of a Single Image From a Vibration-Distorted Image Sequence" Optical Engineering, Soc. of Photo-Optical Instrumentation Engineers. Bellingham, vol. 39, No. 9, Sep. 1, 2000, pp. 2451-2457, XP001065017 ISSN: 0091-3286.

\* cited by examiner

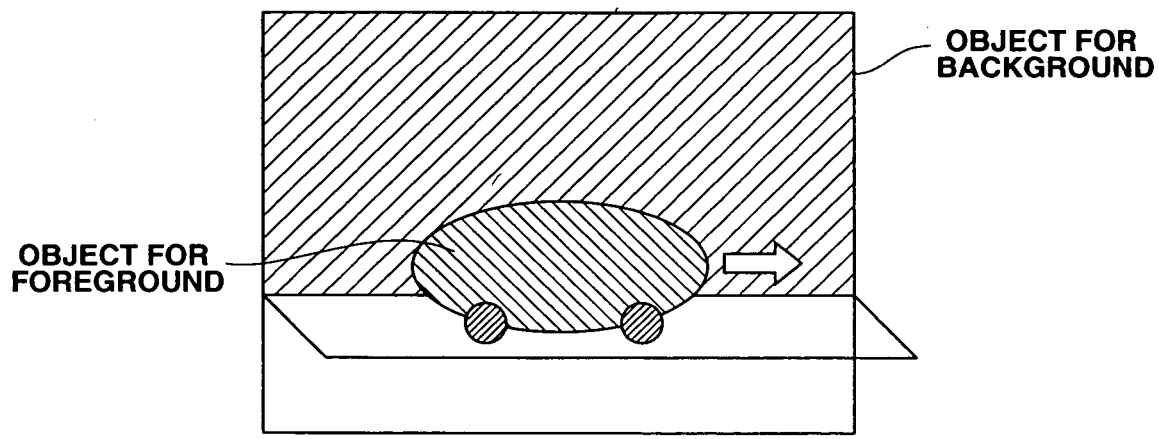
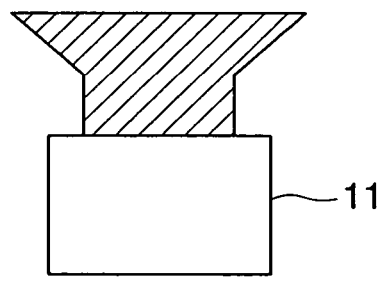
FIG.11

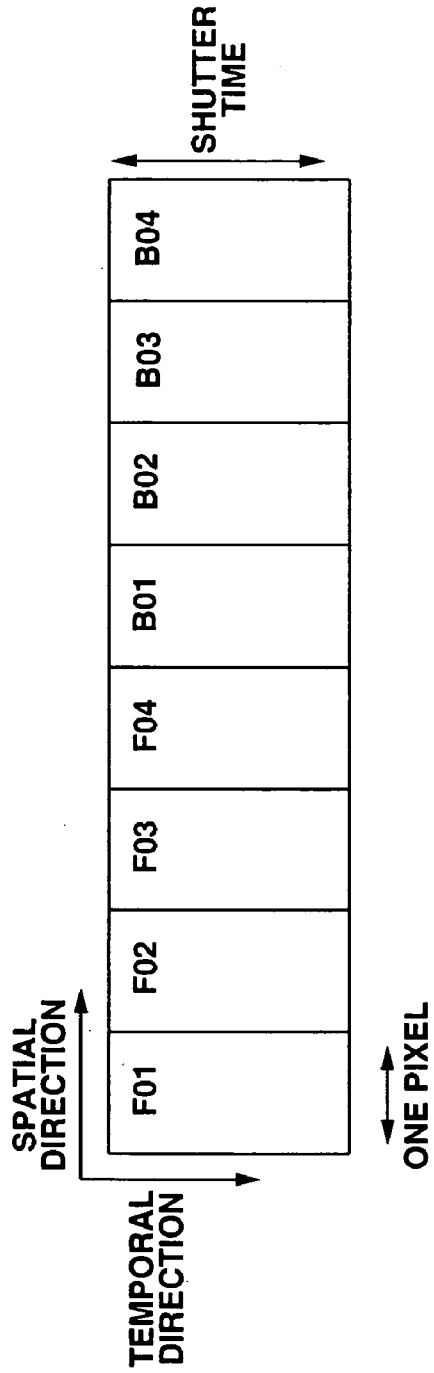

| AREA DECISION | STILL/MOVING DECISION OF FRAME #n-2 AND FRAME #n-1 | STILL/MOVING DECISION OF FRAME #n-1 AND FRAME #n | STILL/MOVING DECISION OF FRAME #n AND FRAME #n+1 | STILL/MOVING DECISION OF FRAME #n+1 AND FRAME #n+2 |
|---|---|---|---|---|
| COVERED BACKGROUND AREA DECISION | STILL | MOVING | — | — |
| STILL AREA DECISION | — | STILL | STILL | — |
| MOVING AREA DECISION | — | MOVING | MOVING | — |
| UNCOVERED BACKGROUND AREA DECISION | — | — | MOVING | STILL |

FIG.33

SIGNAL PROCESSING METHOD AND APPARATUS AND RECORDING MEDIUM

This is a division of application Ser. No. 09/830,858, filed May 1, 2001, which is based on International Application PCT/JP00/09421 filed Dec. 28, 2000, pursuant to 35 USC 371, and is entitled to the priority filing date of Japanese application 11/373782, filed in Japan on Dec. 28, 1999, the entirety of which is incorporated herein by reference.

TECHNICAL FIELD

This invention relates to a signal processing method and apparatus and to a recording medium. More particularly, it relates to a signal processing method and apparatus and to a recording medium which takes the difference between the signals as detected by the sensor and the real world into account.

BACKGROUND ART

Such a technique is widely exploited which detects events in the real world by sensors and which processes sampling data output by the sensors, such as data associated with pictures, speech, temperature, pressure, acceleration or odor.

For example, a picture obtained on imaging an object moving in front of a predetermined still background by a video camera is subjected to motion blurring in case the object is moved at a higher velocity.

For example, a picture obtained on imaging an object moving in front of a predetermined still background by a video camera employing a CCD is subjected to motion blurring in case the object is moved at a higher velocity. That is, when the real world is detected by a CCD as a sensor, the picture, as sampling data, undergoes distortion.

The conventional practice in suppressing this motion blurring is to increase the speed of e.g., an electronic shutter to provide for shorter light exposure time.

However, in raising the shutter speed in this manner, it is necessary to adjust the shutter speed of the video camera before proceeding to photographing. So, the blurred picture, previously acquired, cannot be corrected to obtain a clear picture.

On the other hand, if an object is moved in front of a stationary background, not only motion blurring due to mixing of no other than the picture of the moving object, but also the mixing of the background picture and the moving object occurs. In the conventional system, no consideration is given to detecting the mixing state of the background picture and the moving object.

Moreover, the information of the real world having the space and the time axis is acquired by a sensor and made into data. The data acquired by the sensor is the information obtained on projecting the information of the real world in the time and space of a lower dimension than the real world. So, the information obtained on projection is distorted due to projection. Stated differently, the data output by the sensor is distorted relative to the information of the real world. Moreover, the data, distorted by projection, also includes the significant information for correcting the distortion.

In the conventional signal processing on the sampling data, acquired by the sensor, the sampling data obtained by the sensor is deemed to be the most reliable data, such that, in subsequent data processing, such as transmission, recording or reproduction, it has been a sole concern to realize the state of data which is as close to that of the original data as possible, in consideration of deterioration caused by e.g., data transmission.

Heretofore, the sampling data output by the sensor is deemed to be the most reliable data, such that no attempt has been made to prepare data higher in quality than the sampling data or to perform signal processing of extracting the significant information buried by projection.

DISCLOSURE OF THE INVENTION

It is therefore an object of the present invention to provide for adjustment of the amount of motion blurring contained in detection signals of a:blurred picture.

It is another object of the present invention to enable detection of a mixing ratio indicating the state of mixing of plural objects such as a background picture and a picture of a moving object.

It is yet another object of the present invention to provide a signal processing apparatus in which sampling data output by a sensor may be freed of distortion or the significant information can be extracted from the sampling data, for example, to provide for adjustment of the amount of motion blurring contained in the detection signal if the sampling data is that of picture.

The present invention provides a picture processing apparatus for processing picture data made up of a predetermined number of pixel data acquired by an imaging device having a predetermined number of pixels each having an integrating effect, the picture processing apparatus including processing unit decision means for deciding, based on area information specifying a foreground area made up only of foreground object components making up a foreground object in the picture data, a background area made up only of background object components making up a background object in the picture-data, and a mixed area which is a mixture of the foreground object components and the background object components in the picture data, the mixed area including a covered background area formed at a leading end in a movement direction of the foreground object, and an uncovered background area formed at a trailing end of the foreground object, a processing unit made up of pixel data lying on at least a straight line extending in a direction coincident with the direction of movement of the foreground object from an outer end of the covered background area to an outer end of the uncovered background area, centered about the foreground area, normal equation generating means for generating a normal equation by setting pixel values of pixels in the processing unit decided based on the processing unit and a dividing value which is an unknown dividing value obtained on dividing the foreground object components in the mixed area with a predetermined dividing number, and calculating means for solving the normal equation by the least square method to generate foreground object components adjusted for the quantity of movement blurring.

The present invention also provides a picture processing method for processing picture data made up of a predetermined number of pixel data acquired by an imaging device having a predetermined number of pixels each having an integrating effect, the picture processing method including a processing unit decision step of deciding, based on area information specifying a foreground area made up only of foreground object components making up a foreground object in the picture data, a background area made up only of background object components making up a background object in the picture data, and a mixed area which is a mixture of the foreground object components and the background object components in the picture data, the mixed area including a covered background area formed at a leading end in a movement direction of the foreground object, and an uncovered background area formed at a trailing end of the foreground object, a processing unit made up of pixel data lying on at least a straight line extending in a direction coincident with the: direction of movement of the foreground object from an outer end of the covered background area to an outer end of the uncovered background area, centered about the foreground area, a normal equation generating step of generating a normal equation by setting pixel values of pixels in the processing unit decided based on the processing unit and a dividing value which is an unknown dividing value obtained on dividing the foreground object components in the mixed area with a predetermined dividing number, and a calculating step of solving the normal equation by the least square method to generate foreground object components adjusted for the quantity of movement blurring.

The present invention also provides a picture processing program for processing picture data made up of a predetermined number of pixel data acquired by an imaging device having a predetermined number of pixels each having an integrating effect, the picture processing program including a processing unit decision step of deciding, based on area information specifying a foreground area made up only of foreground object components making up a foreground object in the picture data, a background area made up only of background object components making up a background object in the picture data, and a mixed area which is a mixture of the foreground object components and the background object components in the picture data, the mixed area including a covered background area formed at a leading end in a movement direction of the foreground object, and an uncovered background area formed at a trailing end of the foreground object, a processing unit made up of pixel data lying on at least a straight line extending in a direction coincident with the direction of movement of the foreground object from an outer end of the covered background area to an outer end of the uncovered background area, centered about the foreground area, a normal equation generating step of generating a normal equation by setting pixel values of pixels in the processing unit decided based on the processing unit and a dividing value which is an unknown dividing value obtained on dividing the foreground object components in the mixed area with a predetermined dividing number and a calculating step of solving the normal equation by the least square method to generate foreground object components adjusted for the quantity of movement blurring.

The present invention also provides a signal processing apparatus for processing detection data, acquired every predetermined time period by a sensor made up of a predetermined number of detection elements having time-integrating effects, every predetermined time period, the signal processing apparatus including foreground sample data extracting means for extracting the sample data present in detection data before or after considered detection data where there exists considered sample data which is the sample data under consideration, as foreground sample data corresponding to an object proving the foreground in the real world, background sample data extracting means for extracting the sample data present in detection data lying after or before the considered detection data where there exists considered sample data which is the sample data under consideration, as background sample data corresponding to an object proving the background in the real world and detection means for detecting a mixing ratio of the considered sample data based on the considered sample data, the foreground sample data and the background sample data.

The present invention also provides a signal processing method for processing detection data, acquired every predetermined time period by a sensor made up of a predetermined number of detection elements having time-integrating effects, every predetermined time period, the signal processing method including a foreground sample data extracting step of extracting the sample data present in detection data before or after considered detection data where there exists considered sample data which is the sample data under consideration, as foreground sample data corresponding to an object proving the foreground in the real world, a background sample data extracting step of extracting the sample data present in detection data lying after or before the considered detection data where there exists considered sample data which is the sample data under consideration, as background sample data corresponding to an object proving the background in the real world and a detection step of detecting a mixing ratio of the considered sample data based on the considered sample data, the foreground sample data and the background sample data.

The present invention also provides a signal processing program for processing detection data, acquired every predetermined time period by a sensor made up of a predetermined number of detection elements having time-integrating effects, every predetermined time period, the signal processing program including a foreground sample data extracting step of extracting the sample data present in detection data before or after considered detection data where there exists considered sample data which is the sample data under consideration, as foreground sample data corresponding to an object proving the foreground in the real world, a background sample data extracting step of extracting the sample data present in detection data lying after or before the considered detection data where there exists considered sample data which is the sample data under consideration, as background sample data corresponding to an object proving the background in the real world and a detection step of detecting a mixing ratio of the considered sample data based on the considered sample data, the foreground sample data and the background sample data.

The present invention also provides a signal processing apparatus for processing detection data, acquired every predetermined time period by a sensor made up of a predetermined number of detection elements having time-integrating effects, every predetermined time period, the signal processing apparatus including still/movement decision means for deciding still/movement based on the detection data, and detection means for detecting a mixed area containing sample data having plural real world objects mixed together based on the results of discrimination.

The present invention also provides a signal processing method for processing detection data, acquired every predetermined time period by a sensor made up of a predetermined number of detection elements having time-integrating effects, every predetermined time period, the signal processing method including a still/movement decision step of deciding still/movement based on the detection data, and a detection step of detecting a mixed area containing sample data having plural real world objects mixed together based on the results of discrimination.

The present invention also provides a signal processing program for processing detection data, acquired every predetermined time period by a sensor made up of a predetermined number of detection elements having time-integrating effects, every predetermined time period, the signal processing program including a still/movement decision step of deciding still/movement based on the detection data, and a detection step of detecting a mixed area containing sample data having plural real world objects mixed together based on the results of discrimination.

The present invention also provides a signal processing apparatus including means for acquiring second signals of a second dimension by projecting first signals as real-world signals of a first dimension on a sensor and by detecting the mapped signals by the sensor, the first dimension being lower than the first dimension, and signal processing means for extracting the significant information, buried by the projection from the second signals, by performing signal processing which is based on the second signals.

The present invention also provides a recording medium having recorded thereon a computer-readable program, the program including a signal acquisition step of acquiring a second signal by projecting a first signal as a real world signal of a first dimension on a sensor and detecting the so-mapped first signal by the sensor, the signal being of a second dimension lower than the first dimension, and a signal processing step of performing signal processing based on the second signal to extract the significant information buried by projection from the second signal.

The present invention provides a signal processing apparatus including signal acquisition means for acquiring a second signal by detecting a first signal as a real world signal of a first dimension by a sensor, the signal being of a second dimension lower than the first dimension and containing distortion with respect to the first signal, and signal processing means for performing signal processing on the second signal for generating a third signal alleviated in distortion as compared to the second signal.

The present invention also provides a signal processing apparatus for processing a predetermined number of detection signals acquired by a sensor made up of a predetermined number of detection elements having time integrating effects, the signal processing apparatus including area specifying means for specifying a foreground area made up only of foreground object components constituting an foreground object, a background area made up only of background object components constituting a background object, and a mixed area mixed from the foreground object components and the background object components, mixed area detection means for detecting a mixing ratio of the foreground object components and the background object components at least in the mixed area, and separating means for separating the foreground object and the background object from each other based on the specified results by the area specifying means and the mixing ratio.

The present invention also provides a signal processing method for processing a predetermined number of detection signals acquired by a sensor made up of a predetermined number of detection elements having time integrating effects, the signal processing method including an area specifying step of specifying a foreground area, made up only of foreground object components constituting an foreground object, a background area made up only of background object components constituting a background object, and a mixed area mixed from the foreground object components and the background object components, a mixed area detection step of detecting a mixing ratio of the foreground object components and the background object components at least in the mixed area, and a separating step of separating the foreground object and the background object from each other based on the specified results by the area specifying means and the mixing ratio.

The present invention also provides a recording medium having a computer-readable program, recorded thereon, the computer-readable program including an area specifying step of specifying a foreground area, made up only of foreground object components constituting an foreground object, a background area made up only of background object components constituting a background object, and a mixed area mixed from the foreground object components and the background object components, a mixed area detection step of detecting a mixing ratio of the foreground object components and the background object components at least in the mixed area and a separating step of separating the foreground object and the background object from each other based on the specified results by the area specifying means and the mixing ratio.

The present invention also provides a signal processing apparatus for processing a predetermined number of detection signals acquired by a sensor made up of a predetermined number of detection elements having time integrating effects, the signal processing apparatus including area specifying means for specifying a foreground area, made up only of foreground object components constituting an foreground object, a background area made up only of background object components constituting a background object, and a mixed area mixed from the foreground object components and the background object components, and mixing ratio detecting means for detecting a mixing ratio between the foreground object components and the background object components at least in the mixed area based on the results specified by the area specifying means.

The present invention also provides a signal processing method for processing a predetermined number of detection signals acquired by a sensor made up of a predetermined number of detection elements having time integrating effects, the signal processing method including an area specifying step of specifying a foreground area, made up only of foreground object components constituting an foreground object, a background area made up only of background object components constituting a background object, and a mixed area mixed from the foreground object components and the background object components, and a mixing ratio detecting step of detecting a mixing ratio between the foreground object components and the background object components at least in the mixed area based on the results specified by the area specifying means.

The present invention also provides a recording medium having a computer-readable program recorded thereon, the signal processing method for processing a predetermined number of detection signals acquired by a sensor made up of a predetermined number of detection elements having time integrating effects, the computer-readable program including an area specifying step of specifying a foreground area, made up only of foreground object components constituting an foreground object, a background area made up only of background object components constituting a background object, and a mixed area mixed from the foreground object components and the background object component, and a mixing ratio detecting step of detecting a mixing ratio between the foreground object components and the background object components at least n the mixed area based on the results specified by the area specifying means.

The present invention also provides a signal processing apparatus for processing a predetermined number of detection signals acquired by a sensor made up of a predetermined number of detection elements having time integrating effects, the signal processing apparatus including mixing ratio detecting means for detecting a mixing ratio of foreground object components and background object components in a mixed area in which said foreground object components constituting a foreground object and said background object components constituting a background object are mixed, and separating means for separating the foreground object and the background object from each other based on the mixing ratio.

The present invention provides a signal processing method for processing a predetermined number of detection signals acquired by a sensor made up of a predetermined number of detection elements having time integrating effects, the signal processing method including a mixing ratio detecting step of detecting a mixing ratio of foreground object components and background object components in a mixed area in which said foreground object components constituting a foreground object and said background object components constituting a background object are mixed, and a separating step of separating the foreground object and the background object from each other based on the mixing ratio.

The present invention also provides a recording medium having recorded thereon a computer-readable program for processing a predetermined number of detection signals acquired by a sensor made up of a predetermined number of detection elements having time integrating effects, the computer-readable program including a mixing ratio detecting step of detecting a mixing ratio of foreground object components and background object components in a mixed area in which said foreground object components constituting a foreground object and said background object components constituting a background object, and a separating step of separating the foreground object and the background object from each other based on the mixing ratio.

BRIEF DESCRIPTION OF THE DRAWINGS

FIG. 11 illustrates the photographing by a sensor.

FIG. 15 illustrates a background area, a foreground area, a mixed area, a covered background area and an uncovered background area.

FIG. 16 is a diagrammatic view showing pixel values of pixels arranged in a neighboring relation to another in a row in a picture obtained on imaging an object corresponding to the stationary foreground and a picture obtained on imaging an object corresponding to the stationary background, with the pixel values extended in the time axis direction.

FIG. 33 illustrates a condition for areal decision.

BEST MODE FOR CARRYING OUT THE INVENTION

Figure 1:
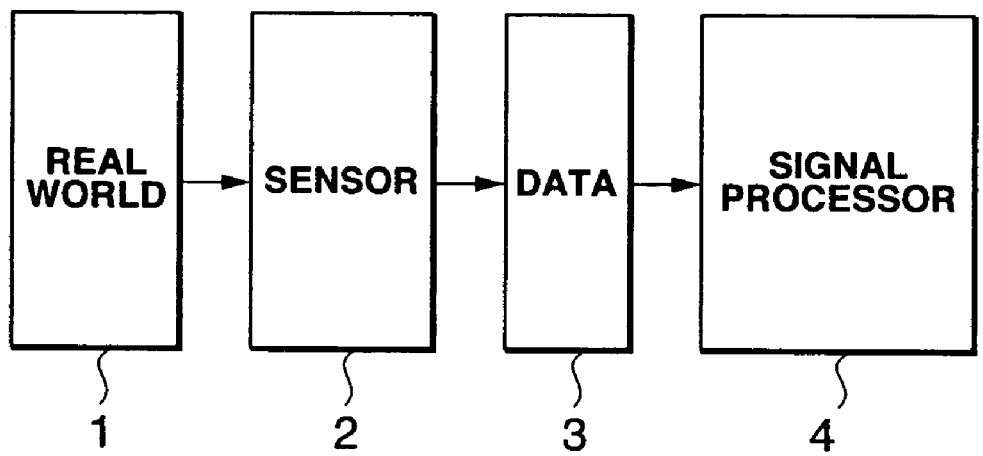
FIG. 1 illustrates the principle of the present invention.

FIG. 1 shows the principle of the present invention. As may be seen in FIG. 1, a first signal, as the information of a real world 1 having the spatial axis and the temporal axis, is acquired by a sensor 2, and is made into data. A detection signal, as data 3 acquired by the sensor 2, is the information obtained on projecting the information of the real world 1 on a time space of a lower dimension than in the real world 1. Therefore, the information, resulting from the projection, contains distortion ascribable to projection. Stated differently, the data 3, output by the sensor 2, is distorted relative to the information of the real world 1. Moreover, the data 3, thus distorted as a result of projection, also includes the significant information usable or correcting the distortion.

Thus, according to the present invention, the data output by the sensor 2 is processed by a signal processor 4, whereby the distortion is removed, reduced or adjusted. Alternatively, the data output by the sensor 2 is processed by the signal processor 4 to extract the significant information.

Figure 2:
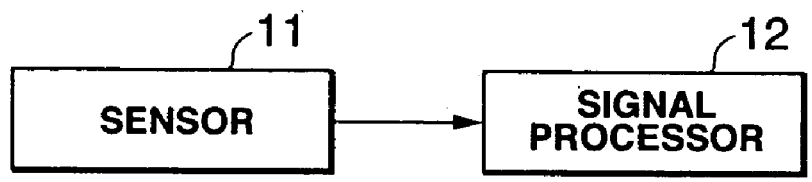
FIG. 2 is a block diagram showing an illustrative structure of a system embodying the present invention.

FIG. 2 shows an illustrative structure of a signal processing apparatus according to the present invention The sensor 1 is comprised e.g., of a video camera, which photographs a picture of the real world to output the resulting picture data to the signal processor 12. The signal processor is comprised e.g., of a personal computer for processing the data input from the sensor 11, adjusting the amount of distortion produced by projection, specifying an area containing the significant information buried by the projection, extracting the significant information from a specified area and for processing the input data based on the extracted significant information.

The significant information may, for example, be a mixing ratio, as later explained.

Meanwhile, the information indicating an area containing the significant information buried by the projection may also be deemed to be the significant information. Here, the areal information, as later explained, corresponds to the significant information.

Figure 3:
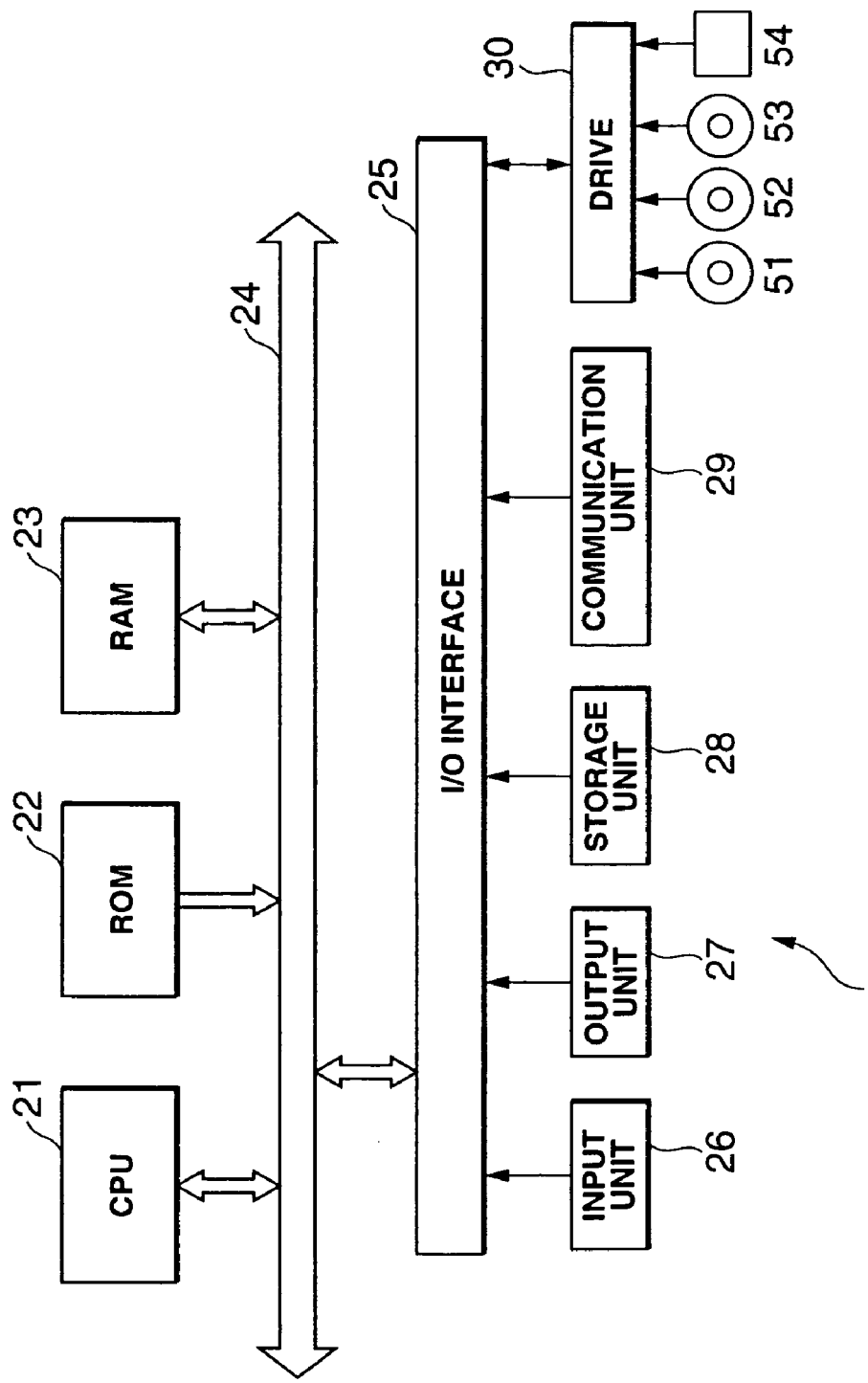
FIG. 3 is a block diagram showing an illustrative structure of a signal processor of FIG. 2.

The signal processor 12 is configured as shown for example in FIG. 3. A CPU (central processing unit) 21 executes various processing operations in accordance with a program stored in a ROM (read-only memory) 22 or in a storage unit 28. In a RAM (random access memory) 23, the program executed by the CPU 21 or data are stored as necessary. The CPU 21, ROM 22 and the RAM 23 are interconnected over a bus 24.

To the CPU 21 is connected an input/output interface 25 over a bus 24. To the input/output interface 25 are connected an input unit 26, comprised of a keyboard, a mouse and a microphone, and an output unit 27, comprised of a display and a speaker. The CPU 21 executes various processing operations responsive to commands input from the input unit 26. The CPU 21 outputs a picture, speech and so forth, obtained on processing, to the output unit 27.

The storage unit 28, connected to the input/output interface 25, is constituted e.g., by a hard disc, for storing the program executed by the CPU 21 and a variety of data. A communication unit 29 communicate with external equipment over a network, such as Internet. In the present embodiment, the communication unit 29 operates for acquiring an output of the sensor 11.

The program may also be acquired over the communication unit 29 for storage in the storage unit 28.

A driver 30 connected to the input/output interface 25 drives a magnetic disc 51, an optical disc 52, a magneto-optical disc 53 or a semiconductor memory 54, to acquire the program and data recorded therein, when these devices are connected thereto. The program and the data, thus acquired, are transferred to the storage unit 28, as necessary, for storage therein.

Figure 4:
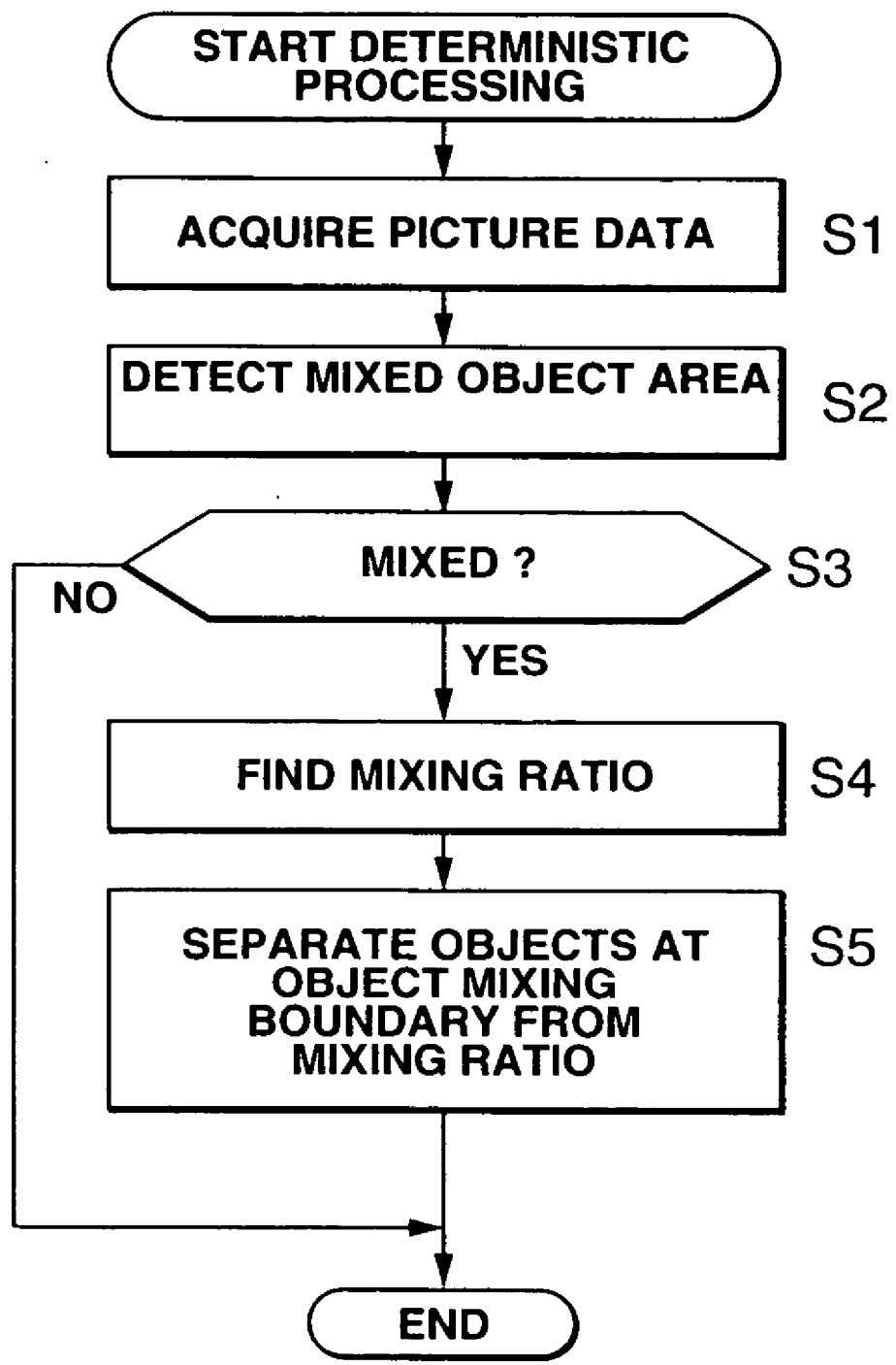
FIG. 4 is a flowchart for illustrating the operation of the system of FIG. 2.

Referring to the flowchart of FIG. 4, the operation performed by the signal processing apparatus based on the program stored in the storage unit 28, is explained. First, at step S1, a picture of an object, acquired by the sensor 11, is acquired through e.g., the communication unit 29. The CPU 21 of the signal processor 12 sends the acquired picture data to the storage unit 28 for storage therein.

Figure 5:
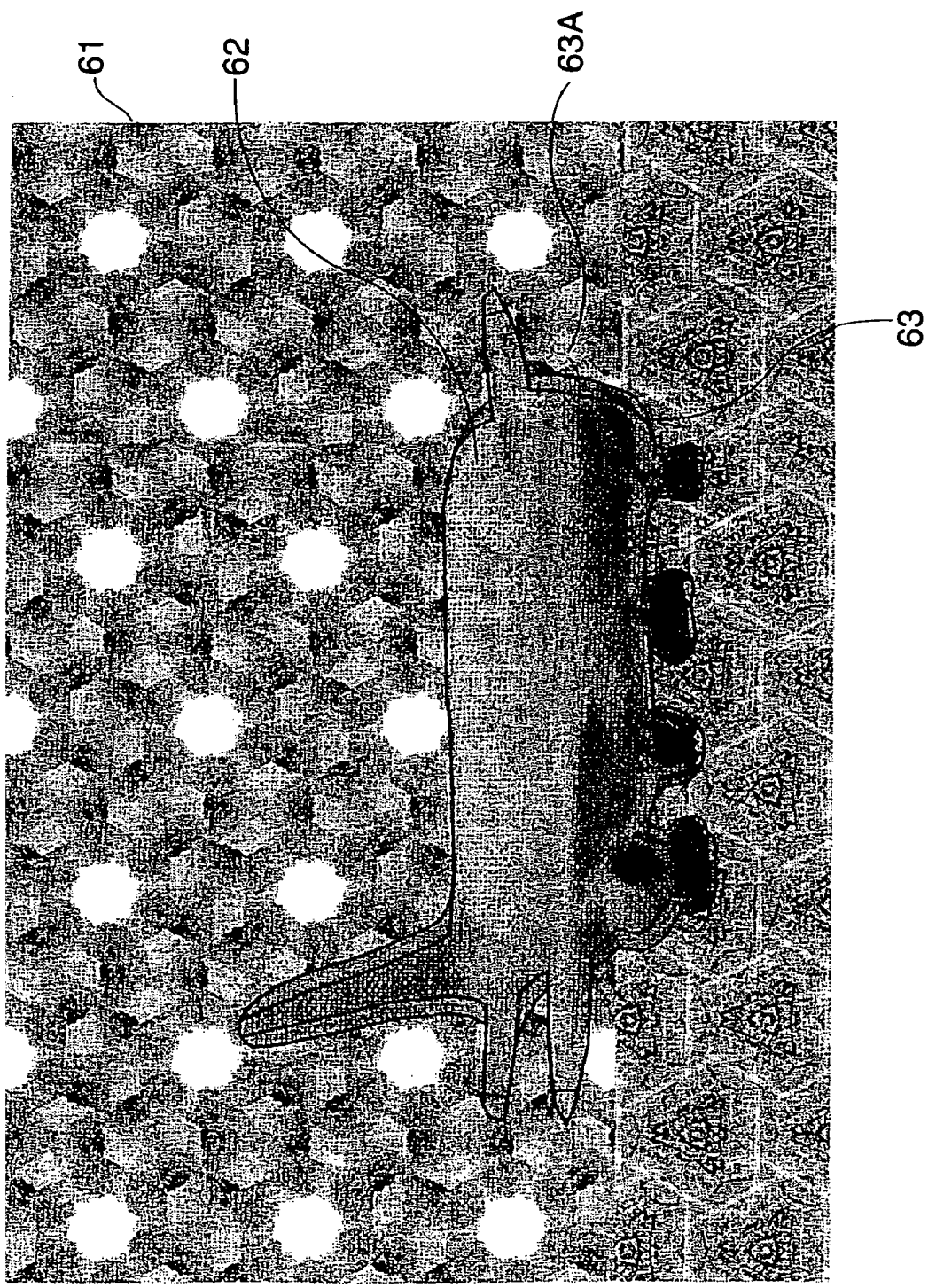
FIG. 5 illustrates a typical picture acquired at step S1 of FIG. 4.

FIG. 5 shows a picture associated with the so-acquired picture data. The picture, shown in this embodiment, is comprised of a foreground 62 arranged ahead of a background 61. The foreground here is a toy plane moving at a predetermined speed ahead of the still background 61 towards right in the drawing. The result is that the picture of the foreground 62 is a picture subjected to so-called motion blurring. Conversely, the picture of the background 61 is stationary and hence is a clear picture free of motion blurring. A mixed area 63 is a picture comprised of a mixture of an object which is the background 61 and an object which is the foreground 62.

Then, at step S2, the CPU 21 detects the mixed area of the objects. In the embodiment of FIG. 5, the mixed area 63 is detected as an area of the mixture of the two objects.

The CPU 21 at step S3 decides whether or not the objects are mixed. If the objects are not mixed, that is if there is no mixed area 63, the picture is not what is to be processed by the present information processing apparatus and hence the processing is finished.

If conversely a decision is made at step S3 that the objects are mixed, the CPU 21 proceeds to step S4 to find the object mixing ratio in the detected mixed area. The mixing ratio may be found by finding the motion vector of the foreground 21 relative to the background 61 and by fitting, from the motion vector, so that the mixing ratio in the mixed area 63 will be changed in a range from 0 to 1. At step S5, the CPU 21 performs the processing of separating the objects in the mixed area 63 where plural objects are mixed together, based on the so-found mixing ratio.

Figure 6:
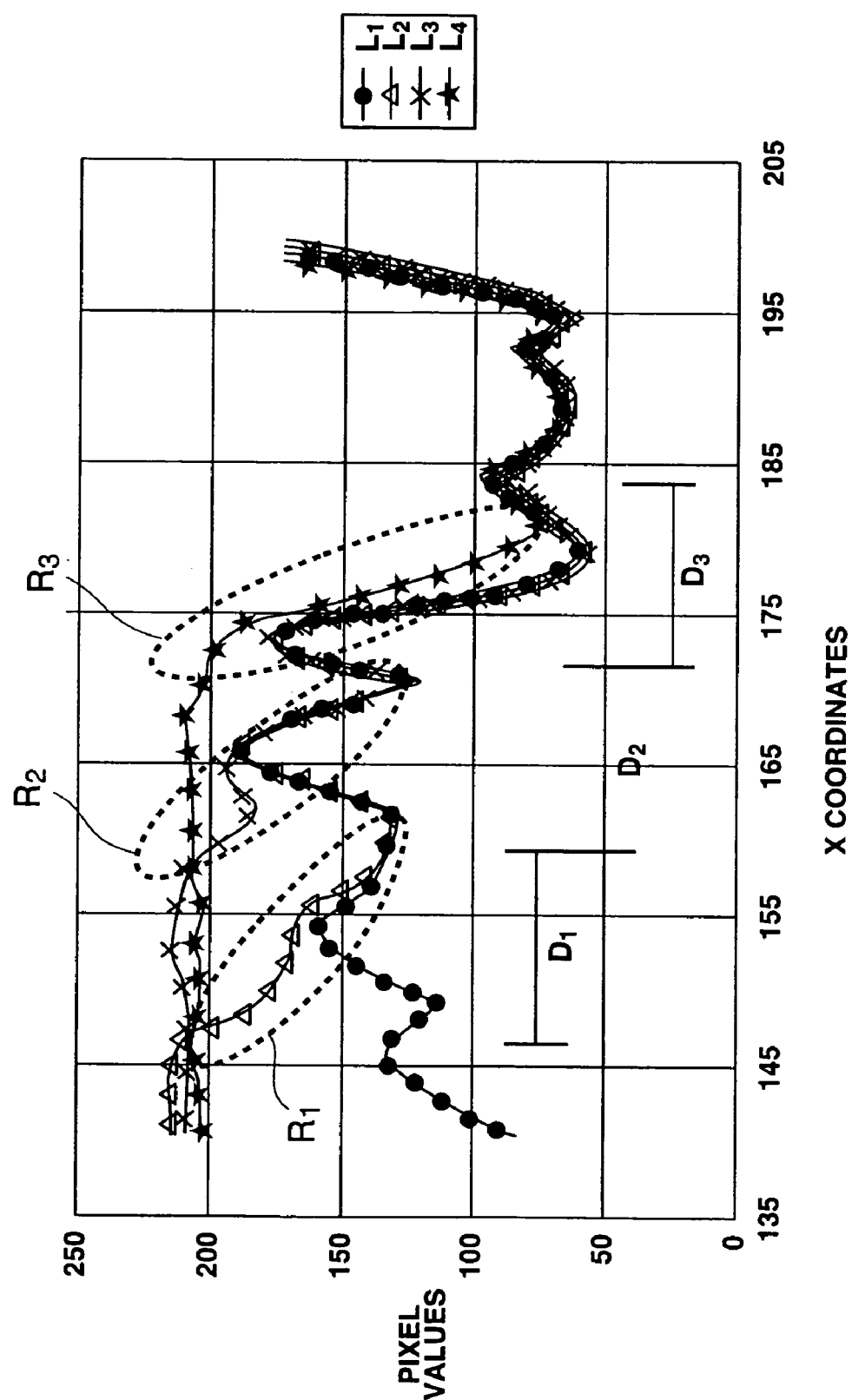
FIG. 6 illustrates pixel values of a mixed area.

The above-described processing is explained in further detail, taking a picture of FIG. 5 as an example. If picture data on one line of a portion 63A on the right end of the mixed area 63 of FIG. 5 is plotted, the result is as shown in FIG. 6, in which the abscissa denotes X-coordinates (coordinates in the horizontal direction in FIG. 5) and the ordinate denotes pixel values on the X-coordinates.

A curve L1 denotes pixel values on a line of a first timing, whilst a curve L2 denotes pixel values on another line of the next timing. Similarly, curves Light reflecting layer 3 and L4 denote pixel values of lines of the sequentially consecutive timings. Stated differently, FIG. 6 shows changes in the pixel values on associated lines at the four consecutive timings.

The curve Li shows the state in the first timing in which state the foreground 62 has not yet been imaged. So, the curve L1 represents pixels of the foreground 61.

On the curve L1, the pixel value is approximately 75 in the vicinity of the X-coordinate 140, and is increased to approximately 130 at the X-coordinate 145. The pixel value then is lowered and is approximately 120 in the vicinity of the X-coordinate 149. As the X-coordinate is increased, the pixel value is again increased and reaches approximately 160 in the vicinity of the X-coordinate 154. The pixel value then is again lowered and reaches approximately 130 in the vicinity of the X-coordinate 162. Then, in the vicinity of the X-coordinate of 165, the pixel value is approximately 180 and, in the vicinity of the X-coordinate of 170, the pixel value is again lowered to approximately 125. Then, in the vicinity of the X-coordinate of 172, the pixel value is increased to approximately 175 and, in the vicinity of the X-coordinate of 178, the pixel value is lowered to approximately 60. Subsequently, the pixel value is slightly fluctuated between 60 and 80 in a domain of the X-coordinates of from 178 to 195. In the X-coordinates on the further right side of approximately. 195, the pixel value is again increased to approximately 160.

As for the curve L2 of the next frame, the pixel value is constant at approximately 200 up to the pixel value of 145. The pixel value then is gradually lowered in a range from the X-coordinate of 145 to the Y-coordinate of 160, at which Y-coordinate value the pixel value is approximately 125. The curve then undergoes changes in a manner similar to those of the curve L1.

The pixel value of the curve Light reflecting layer 3 is substantially constant at 200 up to the vicinity of the X-coordinate 158 and is then lowered to approximately 164 at the X-coordinate 164, after which it is increased to approximately 190. The curve then undergoes changes in a manner similar to those of the curve L1.

The pixel value of the curve L4 is constant at approximately 200 from the vicinity of the X-coordinate of 140 up to the vicinity of the X-coordinate 170, and is abruptly lowered from the vicinity of the X-coordinate of 170 up to the vicinity of the X-coordinate 180, with the pixel value in the vicinity of the X-coordinate of 170 being approximately 70. The curve then undergoes changes in a manner similar to those of the curve L1.

These changes in the pixel values of the curves L2 to L4 are ascribable to the fact that, while the picture of only the background 61 exists in the state of the curve L1, the picture of the foreground 62 is gradually increased with the movement of the picture of the foreground 62, that is with lapse of time.

Specifically, as may be seen from comparison of the curve L1 and the curve L2 of the next following timing, the values of the curves L2 to L4 are substantially equal in values up to the vicinity of the X-coordinate of 147. Beginning from the vicinity of the X-coordinate 147, the values of the curve L2 differ from those of the curves Light reflecting layer 3, L4, becoming equal to the values of the curve L1 in vicinity of the X-coordinate 159. Subsequently, the pixel values of the curve L2 are approximately equal to those in the curve L1. That is, the values of the curve L2 in an area R1 corresponding to a domain D1 from an X-coordinate 146 to an X-coordinate 159 indicate that the foremost part of the foreground 62 has been moved from the left end to the right end of the domain D1 during one unit period.

Similarly, the pixel values of the curve Light reflecting layer 3 of the next timing in an area Rigid substrate 2 corresponding to a domain D2 from an X-coordinate 159 to an X-coordinate 172 indicate that the foremost part of the foreground 62 has been moved in the interim. The pixel values of the curve L4 of the next timing in an area R3 corresponding to a domain D3 from the X-coordinate 172 to an X-coordinate 184 indicate that the foremost part of the foreground 62 has been moved in the interim.

Figure 7:
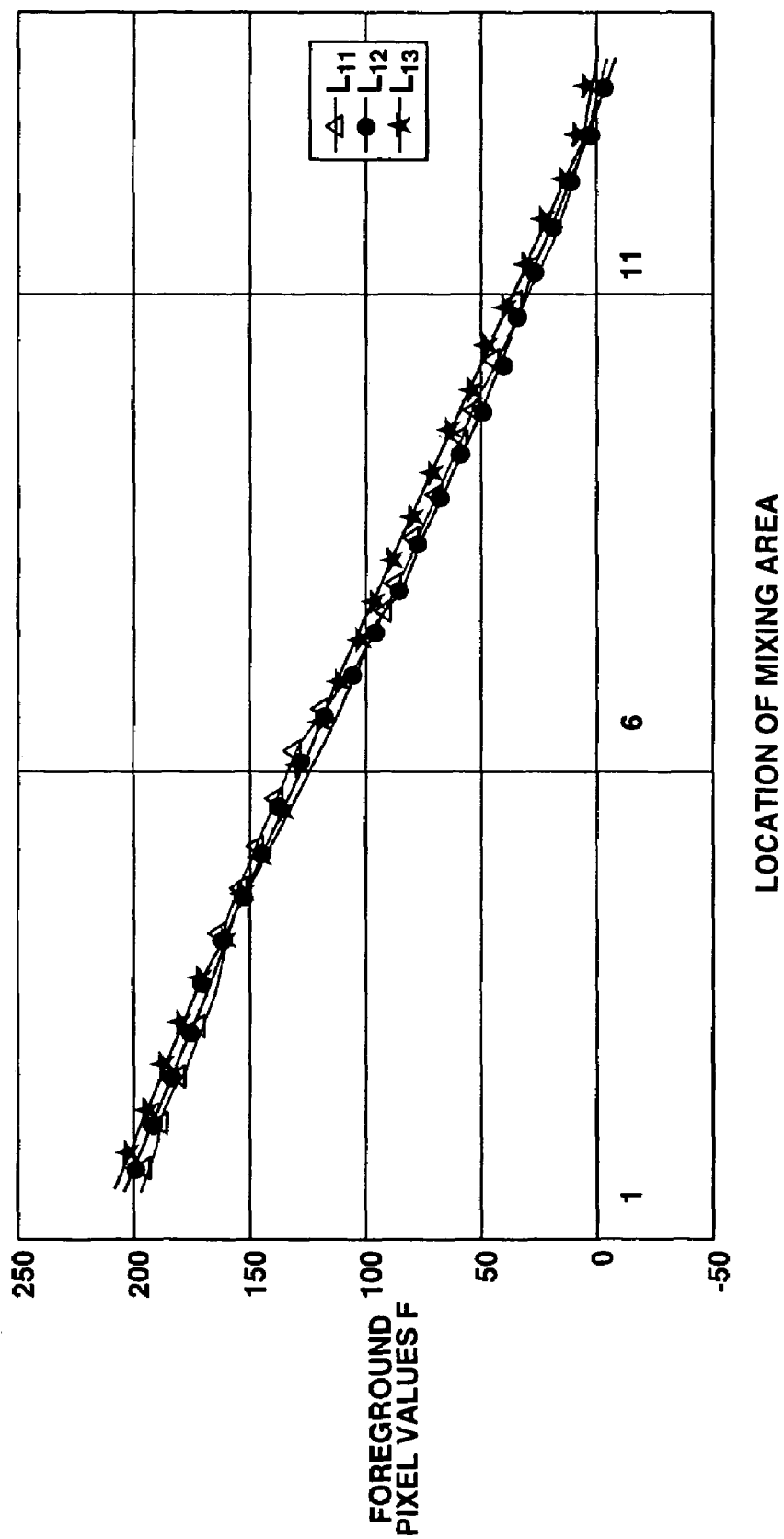
FIG. 7 illustrates the result of subtracting picture components of the background in domains D1 to D3 of FIG. 6.

So, if the pixel values of the curve L1, weighted on the basis of a mixing ratio of the foreground 62 to the background 61, are subtracted from the pixel values of the curve L2, a curve L11 shown in FIG. 7 is obtained. This curve L11, tantamount to subtraction of the values corresponding to background 61 from the pixels of the foreground 62 in the mixed area 63, represents a picture of the foreground on the background having the pixel value of 0. Meanwhile, in FIG. 7, the abscissa and the ordinate denote the position and the pixel values of the extracted foreground, respectively. As for the position, the left and the right end correspond to the left and right ends in the domain D1 in FIG. 6, respectively.

Similarly, if, in the domain D2 of FIG. 6, the pixel values of the curve L1, weighted by the mixing ratio, are subtracted from the pixel values of the curve Light reflecting layer 3, a curve L12 in FIG. 7 is obtained, whereas, if, in the domain D3 of FIG. 6, the pixel values of the curve L1, weighted by the mixing ratio, are subtracted from the curve L4, a curve L13 in FIG. 7 is obtained. The curves L12, L13 are substantially coincident with the curve L11, as shown in FIG. 7. This indicates that the foreground 62 is moving at an approximately equal speed during the three timing unit periods, and that the black background, that is the foreground pixel values on the background having the pixel value of 0, has been obtained correctly by weighted subtraction.

Figure 8:
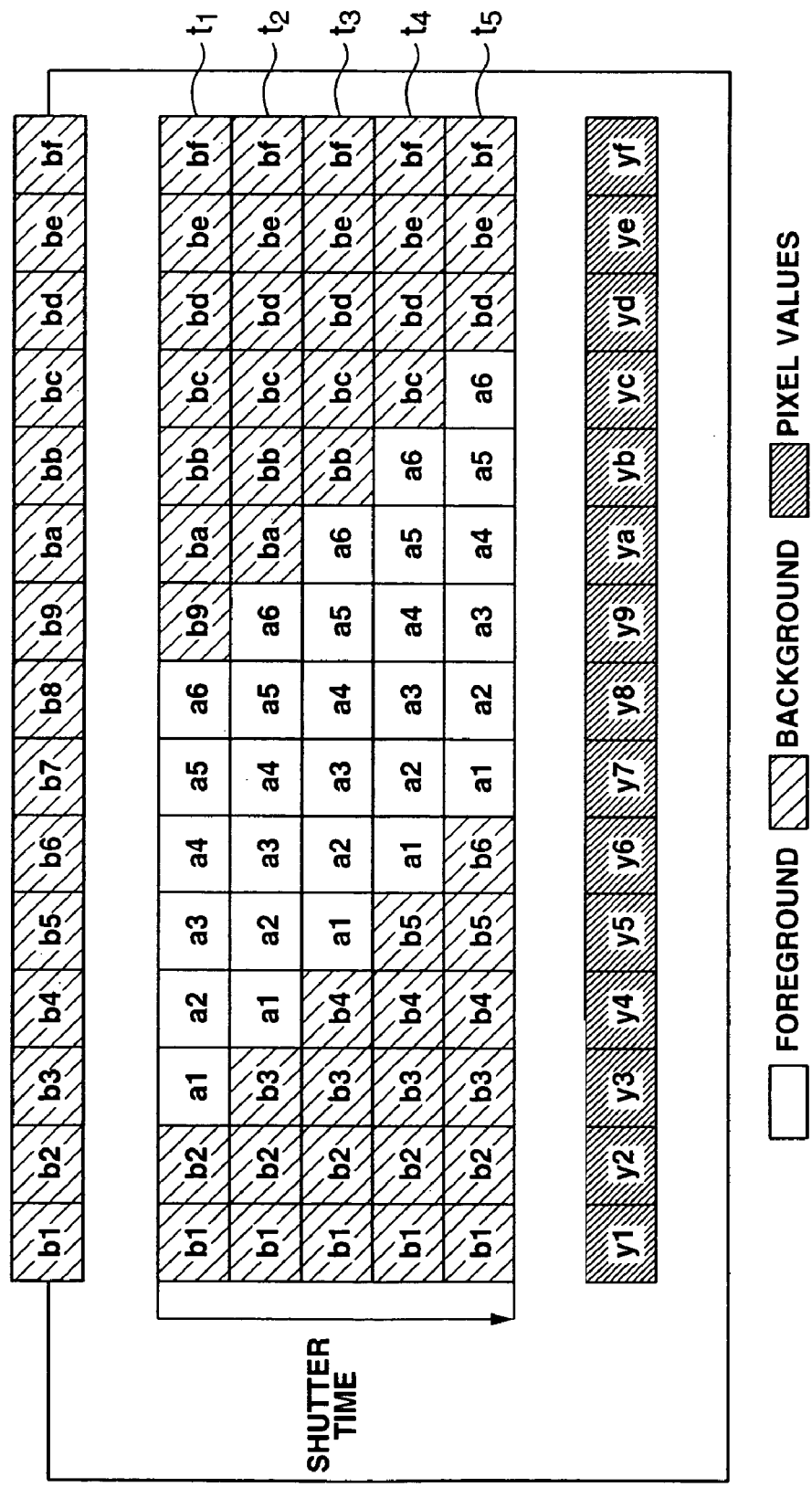
FIG. 8 illustrates the structure of motion blurring.

If the above-described operation is explained in connection with pixels by referring to FIG. 8, in which the abscissa denotes the X-coordinate of a portion 63A, with the ordinate denoting the time axis directing from above towards below. Since the amount of movement is 5 in the present embodiment, light exposure is made within the time interval of t1 to t5 (within the shutter time). In FIG. 8, b1 to bf denote pixel values of the respective pixels of the background 61 and A1 to A6 denote pixel values of the foreground 62.

That is, the pixels A1 to A6 of the foreground 62 appear at the positions of the pixels b3 to b8 of the background 61, with the pixels A1 to A6 of the foreground 62 moving rightwards at the timing t2 by one pixel, that is to the position of the pixels b4 to b9 of the background 61.

In similar manner, the pixels A1 to A6 of the foreground 62 are sequentially moved rightwards at a pitch of one pixel as time elapses from timing t3 to timing t5. In this case, the pixel values y1 to yf, obtained on averaging the pixels of the respective lines of the timings t1 to t5, constitute pixels obtained on imaging, that is pixels exhibiting motion blurring, with the values being represented by the following equations:

$$y_3 = \frac{1}{5} \cdot a_1 + \frac{4}{5} \cdot b_3 \tag{1}$$

$$y_4 = \frac{1}{5} \cdot (a_1 + a_2) + \frac{3}{5} \cdot b_4 \tag{2}$$

$$y_5 = \frac{1}{5} \cdot (a_1 + a_2 + a_3) + \frac{2}{5} \cdot b_5 \tag{3}$$

$$y_6 = \frac{1}{5} \cdot (a_1 + a_2 + a_3 + a_4) + \frac{1}{5} \cdot b_6 \tag{4}$$

$$y_7 = \frac{1}{5} \cdot (a_1 + a_2 + a_3 + a_4 + a_5) \tag{5}$$

$$y_8 = \frac{1}{5} \cdot (a_1 + a_2 + a_3 + a_4 + a_5 + a_6) \tag{6}$$

$$y_9 = \frac{1}{5} \cdot (a_3 + a_4 + a_5 + a_6) + \frac{1}{5} \cdot b_9 \tag{7}$$

$$y_a = \frac{1}{5} \cdot (a_4 + a_5 + a_6) + \frac{2}{5} \cdot b_a \tag{8}$$

$$y_b = \frac{1}{5} \cdot (a_5 + a_6) + \frac{3}{5} \cdot b_b \tag{9}$$

$$y_c = \frac{1}{5} \cdot a_6 + \frac{4}{5} \cdot b_c \tag{10}$$

Meanwhile, y1, y2, yd, ye and yf are equal to background pixels b1, b2, bd, be and bf, respectively.

If pixels b1 to bf of the background are removed, the background 61 and the foreground 62 in the mixed area 63 can be separated from each other. That is, plural objects can be separated from one another. Moreover, the background pixels b1 to bf can be found by solving the above equations, using, for example, the least square method, by assuming the background pixels b1 to bf to be known such as by employing the pixel values of the fore and aft shutter time (frame). This gives a foreground picture freed of the motion blurring. In this manner, distortion caused by projection in the information of the real world can be reduced to create a clear picture such as by processing for resolution creation.

Figure 9:
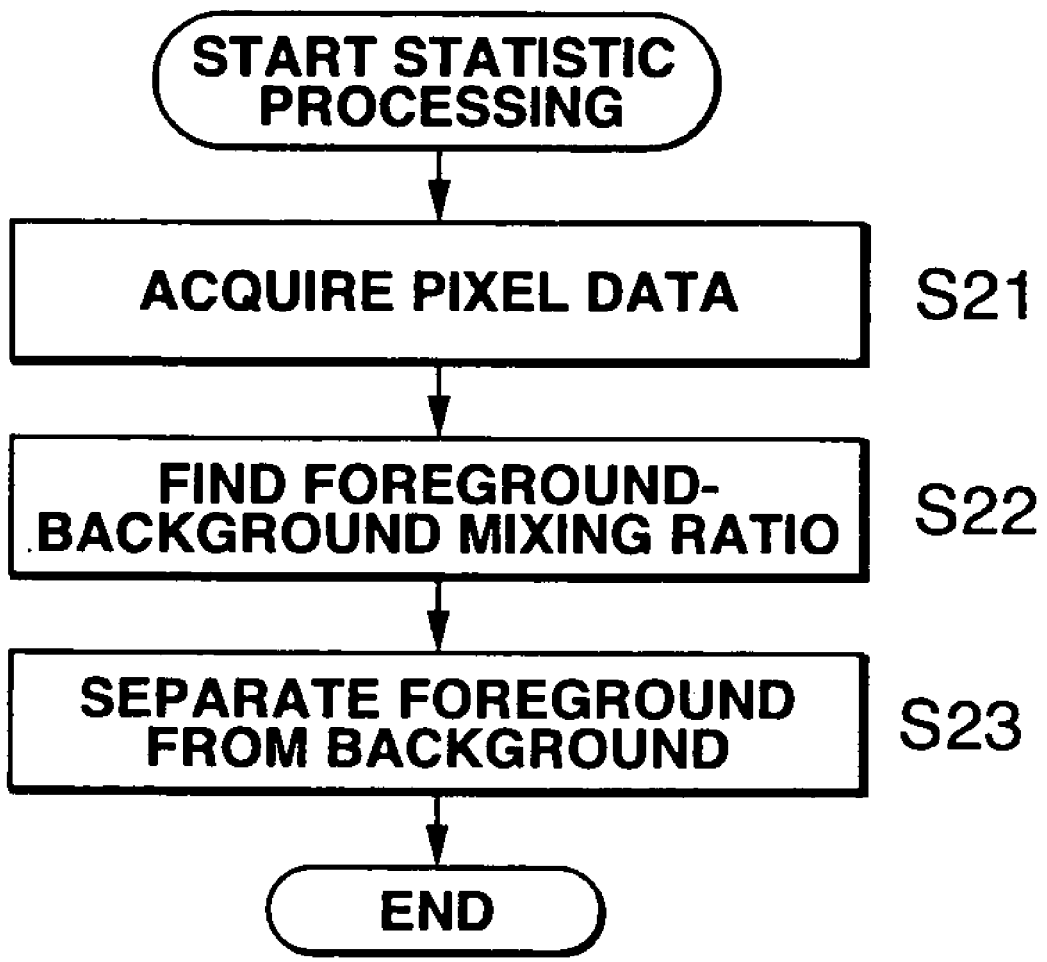
FIG. 9 is a flowchart for illustrating another typical processing of the system of FIG. 2.

In FIG. 4, it is the deterministic processing that is executed, that is, the previous processing is used as basis and the next following processing is executed on the assumption that the result of the previous processing is just. Alternatively, statistic processing is also possible, as now explained with reference to illustrative processing shown in FIG. 9.

Specifically, when carrying out the statistic processing, the CPU 21 acquires picture data at step S21. This processing is similar to that performed at step S1 in FIG. 4.

Next, st step S22, the CPU 21 performs the processing of finding the mixing ratio of the foreground an the background from the picture data obtained at step S21. At step S23, the CPU 21 executes the processing of separating the foreground and the background based on the mixing ratio found at step S22.

If the statistic processing is used, the processing of deciding whether or not the boundary of an object exists, such as that at step S23 of FIG. 4, is unnecessary, thus enabling the foreground and the background to be separated from each other more expeditiously.

The foregoing shows the manner as to how a clear picture of the foreground 62 can be separated and extracted from the motion-blurred picture obtained on photographing a picture of the foreground 62 moving ahead of the background 61.

A more specified embodiment of a signal processing apparatus for identifying an area having the significant information buried therein or extracting the so-buried significant information from data acquired from the sensor by the deterministic processing is now explained. In the following embodiment, a CCD line sensor or a CCR area sensor corresponds to the sensor, while the areal information or the mixing ratio corresponds to the significant information and the mixing of the foreground and the background or the motion blurring corresponds to distortion.

Figure 10:
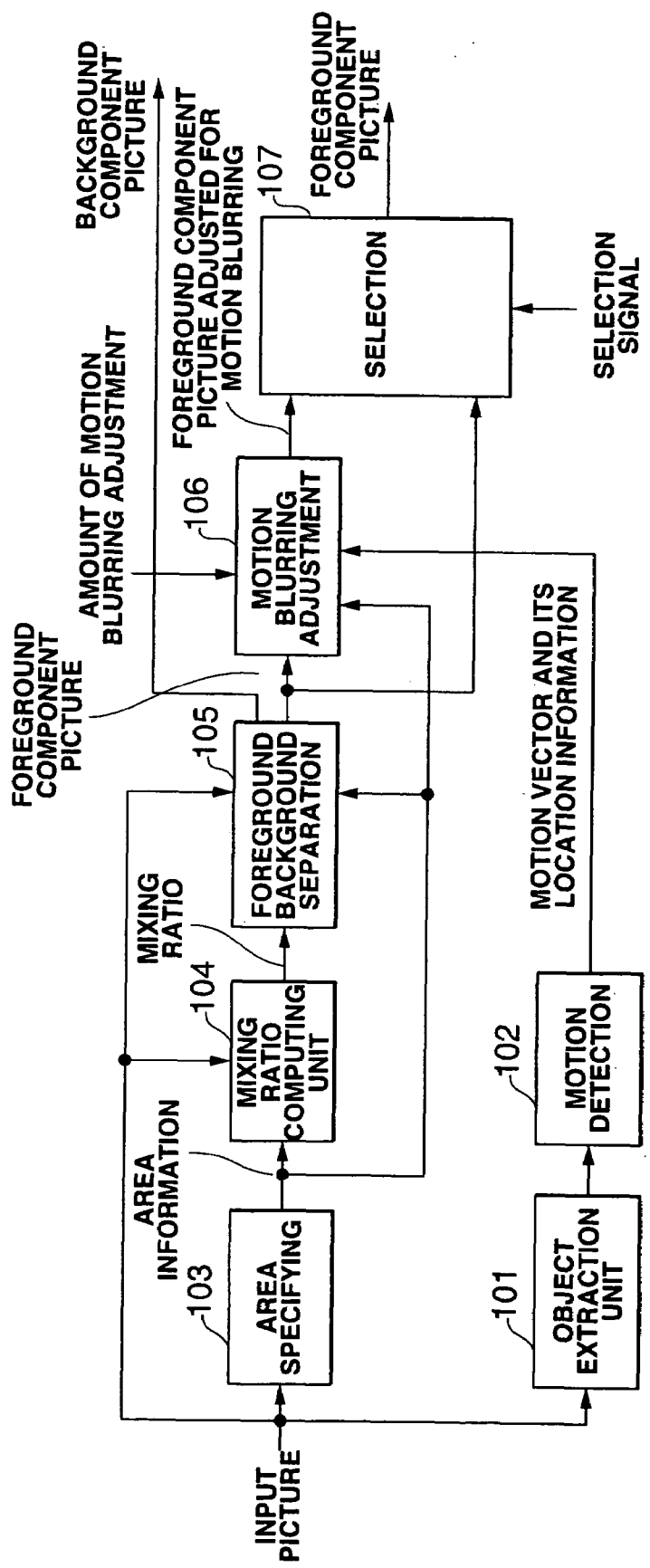
FIG. 10 is a block diagram showing a signal processor 12.

FIG. 10 is a block diagram showing the signal processor 12.

Meanwhile, it does not matter whether the respective functions of the signal processor 12 are to be implemented by hardware or by software. That is, the block diagrams of the present specification may be deemed to be a hardware block diagram or a functional software block diagram.

It is noted that the motion blurring means distortion contained in a moving object, which distortion is produced by the movement of an object in the real world being imaged and by imaging characteristics proper to the sensor 11.

In the present specification, the picture corresponding to an object in the real world is called a picture object.

An input picture, supplied to the signal processor 12, is furnished to an object extraction unit 101, an area specifying unit 103, a mixing ratio calculating unit 104 and a foreground background separating unit 105.

The object extraction unit 101 roughly extracts a picture object corresponding to a foreground object contained in the input picture to send the extracted picture object to a motion detection unit 102. The object extraction unit 101 detects the contour of the picture object corresponding to the foreground object contained in the input picture to roughly extract the picture object corresponding to the foreground object.

The object extraction unit 101 roughly extracts the picture object corresponding to the foreground object contained in the input picture to route the extracted picture object to the motion detection unit 102. The object extraction unit 101 roughly extracts the picture object corresponding to the background object, based on the difference between the input picture and the picture object corresponding to the extracted foreground object.

It is also possible for the object extraction unit 101 to roughly extract the picture object corresponding to the foreground object and the picture object corresponding to the background object based on the difference between the background picture stored in an internal background memory and the input picture.

The motion detection unit 102 computes the motion vector of the picture object corresponding to the roughly extracted foreground, by techniques such as block matching method, gradient method, phase correlation method or the Pel-Recursive method, to route the motion vector so calculated and the position information of the motion vector (the information specifying the position of the pixel corresponding to the motion vector) to the motion blurring adjustment unit 106.

In the motion vector, output by the motion detection unit 102, there is contained the information corresponding to a movement quantity v.

It is also possible for the motion detection unit 102 to output the picture object based motion vector, along with the pixel position information specifying the pixels for the picture object, to the motion blurring adjustment unit 106.

The movement quantity v is a value for representing position changes of picture corresponding to a moving object in terms of a pixel-to-pixel interval as unit. For example, if a picture of an object corresponding to the foreground is moved so as to be displayed at a position offset by four pixels in a frame with respect to a directly previous frame, the movement quantity v of the object corresponding to the foreground is 4.

Meanwhile, the object extraction unit 101 and the motion detection unit 102 are used when the quantity of the motion blurring associated with a moving object is adjusted in the motion blurring adjustment unit 106.

The area specifying unit 103 sends the information specifying each pixel of an input picture to one of the foreground area, a background area or a mixed area and for indicating to which of the foreground area, background area and the mixed area belong the pixels, from pixel to pixel, to the mixing ratio calculating unit 104, foreground/background separating unit 105 and to the motion blurring adjustment unit 106. The aforementioned information is referred to below as the area information.

The mixing ratio calculating unit 104 calculates the mixing ratio for pixels contained in the mixed area 63, based on the input picture and the area information supplied from the area specifying unit 103, to route the so-calculated mixing ratio to the foreground/background separating unit 105. This mixing ratio is referred to below as a mixing ratio $\alpha$.

The mixing ratio $\alpha$ indicates the proportion in the pixel value of the components of a picture corresponding to the background object, as indicated by an equation (13) to be described later. These components are also referred to below as the background components.

The foreground/background separating unit 105 separates the input picture into a foreground component picture, made up only of a picture component associated with the foreground, also referred to below as foreground components, and a background component picture, composed only of background components, based on the area information supplied from the area specifying unit 103, and on the mixing ratio $\alpha$ supplied from the mixing ratio calculating unit 104, to route the foreground component picture to the motion blurring adjustment unit 106 and to the selection unit 107. The separated foreground component picture may also be an ultimate output. It is possible to realize the foreground and the background more accurate than those obtained in the conventional system in which only the foreground and the background can be specified without taking the conventional mixed area into consideration.

The motion blurring adjustment unit 106 decides a processing unit, indicating one or more pixels contained in the foreground component picture, based on the movement quantity v as found from the motion vector and on the area information. The processing unit is data for specifying a set of pixels to be processed for adjusting the quantity of the motion blurring.

The motion blurring adjustment unit 106 adjusts the quantity of the motion blurring contained in the foreground component picture, such as by removing the motion blurring contained in the foreground component picture, decreasing the quantity of the motion blurring or increasing the quantity of the motion blurring, based on the motion blurring adjusting quantity input to the signal processor 12, foreground component picture supplied from the foreground/background separating unit 105, the motion vector supplied from the motion detection unit 102, along with the corresponding position information, and on the processing unit, to output the foreground component picture, adjusted for the quantity of the motion blurring, to the selection unit 107. The motion vector with its position information may not be used, if so desired.

The selection unit 107 selects one of the foreground component picture supplied from the foreground/background separating unit 105 and the foreground component picture from the motion blurring adjustment unit 106, adjusted as to the motion blurring quantity, to output the selected foreground component picture.

Referring to FIGS. 11 to 26, an input picture sent to the signal processor 12 is explained.

FIG. 11 illustrates imaging by a sensor 11 constituted by a CCD video camera provided with a CCD (charge coupled device) which is a solid state imaging device. An object corresponding to the foreground in the real world is moved between the object of the background in the real world an the sensor 11 e.g., horizontally from left to right.

The sensor 11 images an object corresponding to the foreground along with the object corresponding to the background. The sensor 11 outputs the photographed picture on the frame basis. For example, the sensor 11 outputs a picture of 30 frames per sec. The exposure time of the sensor 11 may be set to 1/30 sec. The exposure time is the time which elapses since the start of conversion of light input to the sensor 11 into electrical charges until the end of the conversion of the input light into electrical charges. This exposure time is sometimes referred to below as the shutter time.

Figure 12:
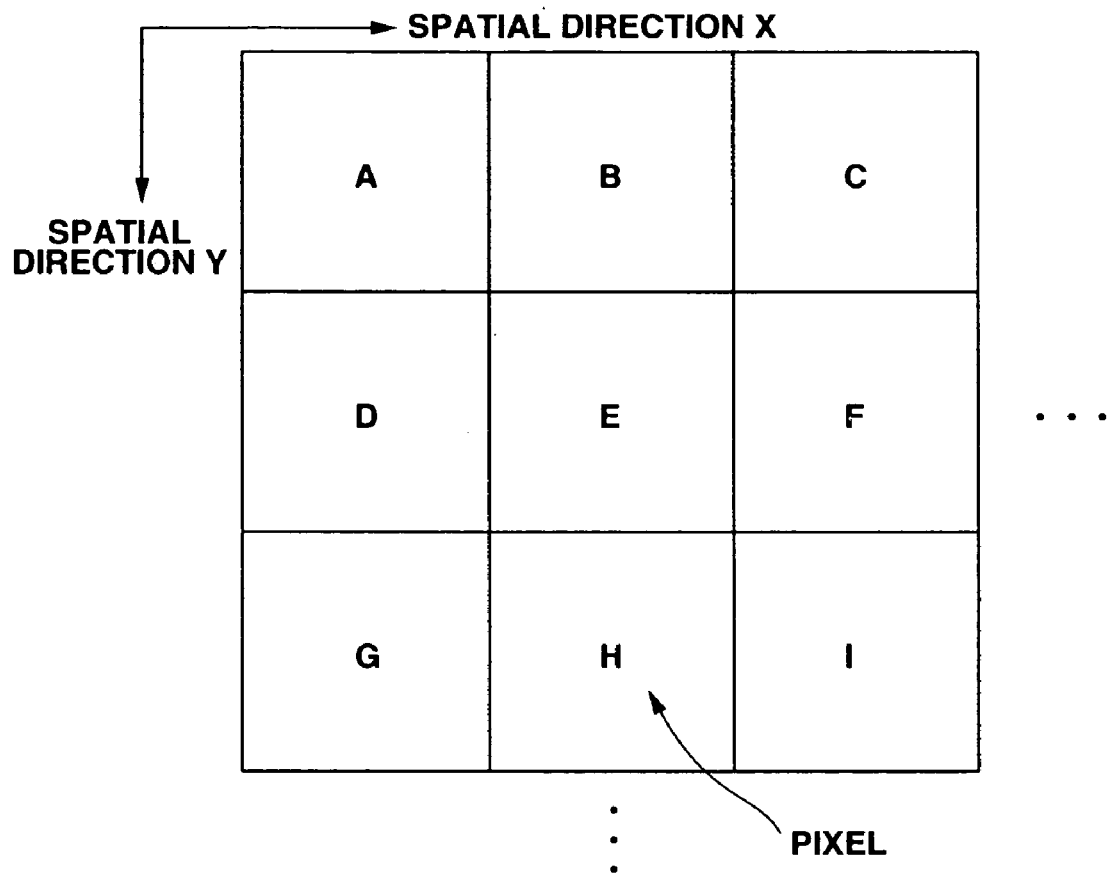
FIG. 12 illustrates pixel arrangement.

Referring to FIG. 12, showing pixel arrangement, A to I denote individual pixels. The pixels are arranged in a plane corresponding to a picture. A detection element associated with one pixel is arranged on the sensor 11. When the sensor 11 photographs a picture, one detection element outputs a pixel value associated with one pixel belonging to the picture. For example, the position of the detection device along the X-direction corresponds to the position on the picture in the transverse direction, whilst that along the Y-direction corresponds to the position on the picture in the longitudinal direction.

Figure 13:
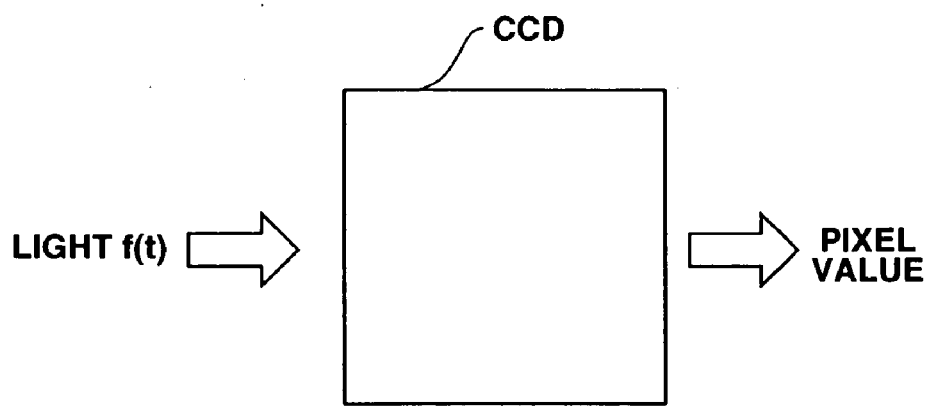
FIG. 13 illustrates the operation of a detection device.

Referring to FIG. 13, a detection device, such as the CCD, converts the input light into electrical charges, during the time corresponding to the shutter time, to store the as-converted electrical charges. The quantity of the electrical charges is approximately equal to the intensity of the input light and to the time during which the light is input. The detection device sums the electrical charges, converted from the input light, to the electrical charges, already stored, during the time corresponding to the shutter time. That is, the detection device integrates the input light during the time corresponding to the shutter time to accumulate electrical charges in an amount corresponding to the integrated light. The detection device is said to have an integrating effect with respect to time.

The charges accumulated in the detection device are converted into an electrical voltage by a circuit, not shown. The voltage, in turn, is converted into a pixel value, such as digital data, which is output. So, the individual pixels, output by the sensor 11, are of a value mapped to a one-dimensional space, which is the result of integration with respect to the shutter time of a spatially extended portion of an object corresponding to the foreground or the background.

By such accumulating operation of the sensor 11, the signal processor 12 extracts the significant information buried in the output signal, such as the mixing ratio α. The signal processor 12 adjusts the quantity of distortion caused by the mixing of no other than the foreground picture object, for example, the quantity of the motion blurring. The signal processor 12 also adjusts the quantity of the distortion produced by the mixing of the foreground picture object with the background picture object.

Figure 14A:
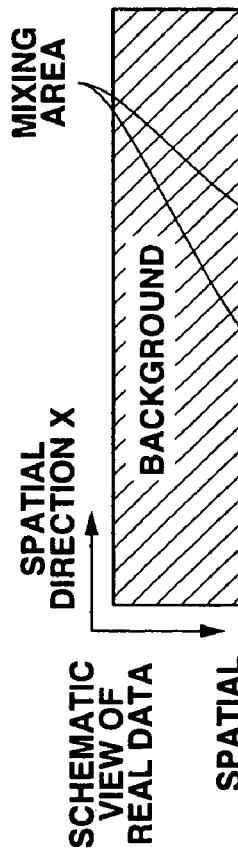
FIG. 14 illustrates a picture obtained on imaging an object corresponding to the moving foreground and an object corresponding to a stationary background.

FIG. 14 illustrates a picture obtained on imaging an object corresponding to a moving foreground and an object corresponding to a still background. FIG. 14A shows a picture obtained on imaging an object corresponding to the moving foreground and an object corresponding to the still background. In an embodiment shown in FIG. 14A, the object corresponding to the foreground is moving horizontally from left towards right relative to the picture.

Figure 14B:
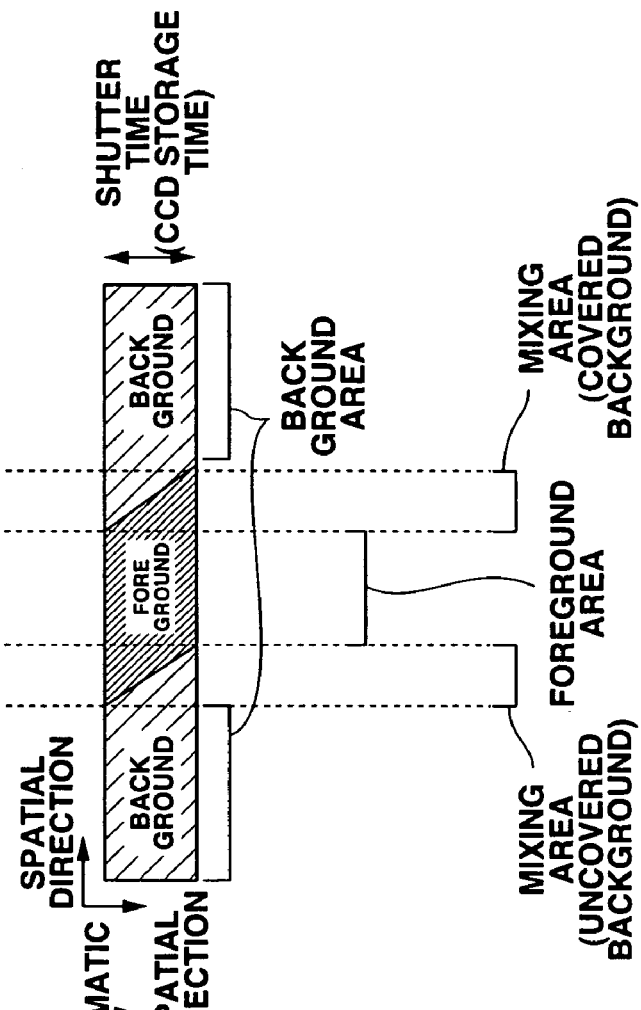

FIG. 14B is a diagrammatic view showing pixel values, corresponding to a line of the picture shown in FIG. 14A, as extended along the time axis. The transverse direction of FIG. 14B corresponds to the spatial direction X of FIG. 14A.

The pixels of the background area are constituted solely by the background components, that is components of a picture corresponding to a background object. The pixels of the: foreground area are constituted solely by the foreground components, that is components of a picture corresponding to a foreground.

The pixels of the mixed area are constituted from the background and foreground components. The mixed area, the pixel values of which are constituted from the background components and the foreground components, may be said to be a distorted area. The mixed area is further classified into a covered background area and an uncovered background area.

The covered background area is a portion of the mixed area in register with the foremost part along the proceeding direction of the foreground and is an area in which the background component is hidden by the foreground with lapse of time.

On the other hand, the uncovered background area is a portion of the mixed area in register with the rear part along the proceeding direction of the foreground and is an area in which the background component presents itself with lapse of time.

A picture comprised of the foreground area, background area, a covered background area or the uncovered background area is input as an input picture to the area specifying unit 103, mixing ratio calculating unit 104 and to the foreground/background separating unit 105.

FIG. 15 illustrates the background area, foreground area, mixed area, covered background area and the uncovered background area, as described above. In relation to the picture shown in FIG. 14, the background area is a still portion, the foreground area is a moving portion, the covered background area of the mixed area is an area where the picture is changed from the background to the foreground, and the uncovered background area of the mixed area is an area where the picture is changed from the foreground to the background.

FIG. 16 diagrammatically shows pixel values of neighboring pixels in a row in a photographed picture of an object corresponding to a still foreground and an object corresponding to a sill background, with the pixel values shown developed along the temporal axis direction. As the neighboring pixels, arranged in a row, it is possible to select pixels arranged on a line of a picture.

The pixel values of F01 to F04, shown in FIG. 16, are those of pixels of the object of the still foreground. The pixel values of B01 to B04, shown in FIG. 16, are those of pixels of the object of the still background.

In FIG. 16, time elapses from above towards below. The position of an upper side of a rectangle in FIG. 16 corresponds to the time the sensor 11 begins converting the input light into electrical charges, while that of the rectangle in FIG. 16 corresponds to the time the sensor 11 finishes the conversion of the input light into electrical charges. That is, the distance from the upper to the lower sides of the rectangle of FIG. 16 corresponds to the shutter time.

In the following description, it is assumed that the shutter time is equal to the frame interval.

The transverse direction in FIG. 16 corresponds to the spatial direction X, explained with reference to FIG. 14. More specifically, the distance from the left side of a rectangle "F01" to the right side of a rectangle "B04" in FIG. 16 is eight times the pixel pitch, that is the span of the eight consecutive pixels.

If the foreground and the background object are still, the light input to the sensor 11 is not changed during the time corresponding to the shutter time.

The time span corresponding to the shutter time is split into two or more equal time periods. For example, if the number of times of the virtual splitting is four, the diagram of FIG. 16 may be represented as the diagram of FIG. 17. The number of times of the virtual splitting is set in association with e.g., the movement quantity v in the shutter time of the object corresponding to the foreground. For example, if the movement quantity v is four, the number of times of the virtual splitting is 4, with the time span corresponding to the shutter time being then split into four.

The uppermost row in the drawing corresponds to the first split time period since the time of shutter opening. The second row corresponds to the second split time period since the time of shutter opening. The third row corresponds to the third split time period since the time of shutter opening, whilst the fourth row corresponds to the fourth split time period since the time of shutter opening.

The shutter rime split in association with the movement quantity v is also called the shutter time/v hereinbelow.

When the object corresponding to the foreground is at a standstill, the light input to the sensor 11 is not changed. So, the foreground component F01/v is equal to the pixel value F01 divided by the number of times of the virtual splitting. Similarly, when the object corresponding to the foreground is at a standstill, the foreground component F02/v is equal to the pixel value F02 divided by the number of times of the virtual splitting, whilst the foreground component F03/v is equal to the pixel value F03 divided by the number of times of the virtual splitting and the foreground component F04/v is equal to the pixel value. F04 divided by the number of times of the virtual splitting.

When the object corresponding to the background is at a standstill, the light incident on the sensor 11 is not changed. So, the background component B01/v is equal to the pixel value B01 divided by the number of times of the virtual splitting. Similarly, when the object corresponding to the background is at a standstill, the background component B02/v is equal to the pixel value B02 divided by the number of times of the virtual splitting, whilst the background component B03/v is equal to the pixel value. B03 divided by the number of times of the virtual splitting and the background component B04/v is equal to the pixel value B04 divided by the number of times of the virtual splitting.

That is, when the object corresponding to the foreground is at a standstill, the light corresponding to the foreground input to the sensor 11 during the time corresponding to the shutter time remains unchanged. So, the first foreground component F01v, corresponding to the shutter time/v, as from the shutter opening, the second foreground component F01v, corresponding to the shutter time/v, as from the shutter opening, the third foreground component F01v, corresponding to the shutter time/v, as from the shutter opening and the fourth foreground component F01v, corresponding to the shutter time/v, as from the shutter opening, are of equal values. The above for F01/v holds for F02/v to F04/v as well.

When the object corresponding to the background is at a standstill, the light corresponding to the background object input to the sensor 11 during the time corresponding to the shutter time remains unchanged. So, the first background component B01v, corresponding to the shutter time/v, as from the shutter opening, the second background component B01v, corresponding to the shutter time/v, as from the shutter opening, the third background component B01v, corresponding to the shutter time/v, as from the shutter opening and the fourth background component B01v, corresponding to the shutter time/v, as from the shutter opening, are of equal values. The above for B01/v holds for B02/v to B04/v as well.

In the following description, it is assumed that the object corresponding to the foreground is moving, with the object corresponding to the background being at a standstill.

Figure 18:
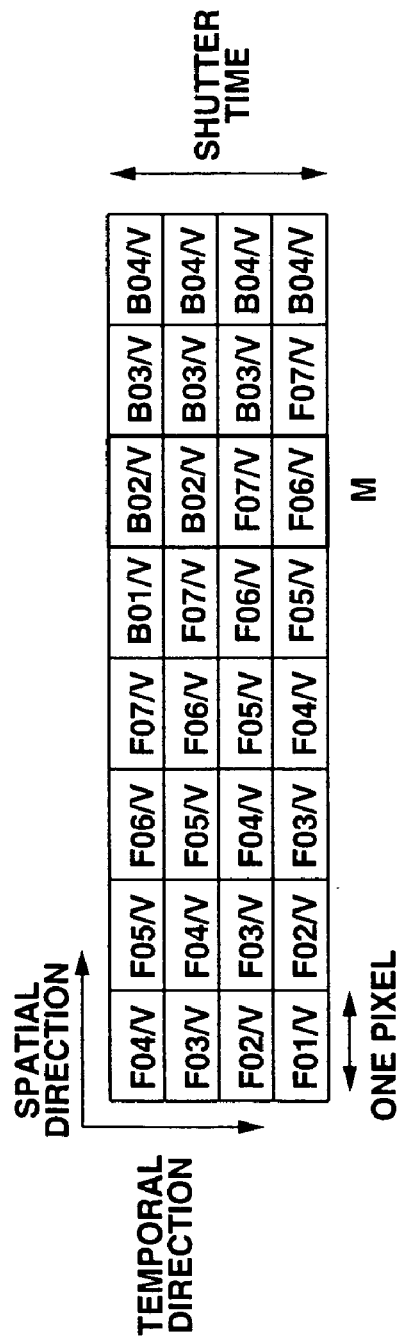
FIG. 18 is a diagrammatic view showing pixel values extended in the time axis direction, with the time period corresponding to the shutter time shown split.

FIG. 18 diagrammatically shows pixel values of pixels arranged on a line including the covered background area when the object corresponding to the foreground is moving towards right in the drawing, with the pixel values being shown developed in the time axis direction. In FIG. 18, the movement quantity v of the foreground is 4. Since one frame is of short duration, it may be assumed that the object corresponding to the foreground is a rigid body and moving at an equal speed. In FIG. 18, the picture of the object corresponding to the foreground is moved so as to be displayed four pixels rightwards in a frame next to a directly previous reference frame.

In FIG. 18, the leftmost to fourth left pixels belong to the foreground area. In FIG. 18, fifth left to seventh left pixels in FIG. 18 belong to the mixed area which is the covered background area. In FIG. 18, the rightmost pixel belongs to the background area.

Since the object corresponding to the foreground is moved to hide the object corresponding to the background, as time elapses, the components contained in the pixel values of the pixels belonging to the covered background area are switched from the background component picture to the foreground component picture at a certain time point of the time period corresponding to the shutter time.

For example, the pixel value M, shown with a bold line frame in FIG. 18, is represented by the equation (11):

$$M = B02/v + B02/v + F07/v + F06/v \tag{11}$$

For example, the pixel value M, shown with a bold line frame in FIG. 18, contains the background component corresponding to one shutter time/v and the foreground component corresponding to three shutter time/v, the mixing ratio $\alpha$ of the fifth left pixel is ¼. The sixth left pixel contains the background component corresponding to two shutter time/v and the foreground component corresponding to two shutter time/v, so the mixing ratio $\alpha$ is ½. The seventh left pixel contains the background component corresponding to three shutter time/v and the foreground component corresponding to one shutter time/v, so the mixing ratio $\alpha$ is ¾.

Since the object corresponding to the foreground is a rigid body, such that the foreground picture is moved at an equal speed so as to be displayed four pixels towards right in the next frame, the first foreground component F07/v of the fourth left pixel in FIG. 18, with the first shutter time/v since the time of shutter opening, is equal to the second foreground component of the fifth left pixel in FIG. 18 corresponding to the second shutter time/v since the time of shutter opening. Similarly, the foreground component F07/v is equal to the foreground component of the sixth left pixel in FIG. 18 corresponding to the third shutter time/v since the time of shutter opening and to the foreground component of the seventh left pixel in FIG. 18 corresponding to the fourth shutter time/v since the time of shutter opening.

Since the object corresponding to the foreground is a rigid body, such that the foreground picture is moved at an equal speed so as to be displayed four pixels towards right in the next frame, the first foreground component F06/v of the third left pixel in FIG. 18, with the first shutter time/v since the time of shutter opening, is equal to the second foreground component of the fourth left pixel in FIG. 18 corresponding to the second shutter time/v since the time of shutter opening. Similarly, the foreground component F06/v is equal to the foreground component of the fifth left pixel in FIG. 18 corresponding to the third shutter time/v since the time of shutter opening and to the foreground component of the sixth left pixel in FIG. 18 corresponding to the fourth shutter time/v since the time of shutter opening.

Since the object corresponding to the foreground is a rigid body, such that the foreground picture is moved at an equal speed so as to be displayed four pixels towards right in the next frame, the first foreground component F05/v of the second left pixel in FIG. 18, with the first shutter time/v since the time of shutter opening, is equal to the third foreground component of the fourth left pixel in FIG. 18 corresponding to the second shutter time/v since the time of shutter opening. Similarly, the foreground component F05/v is equal to the foreground component of the fourth left pixel in FIG. 18 corresponding to the third shutter time/v since the time of shutter opening and to the foreground component of the fifth left pixel in FIG. 18 corresponding to the fourth shutter time/v since the time of shutter opening.

Since the object corresponding to the foreground is a rigid body, such that the foreground picture is moved at an equal speed so as to be displayed four pixels towards right in the next frame, the first foreground component F04/v of the leftmost pixel in FIG. 18, with the first shutter time/v since the time of shutter opening, is equal to the second foreground component of the second left pixel in FIG. 18 corresponding to the second shutter time/v since the time of shutter opening. Similarly, the foreground component F04/v is equal to the foreground component of the third left pixel in FIG. 18 corresponding to the third shutter time/v since the time of shutter opening and to the foreground component of the fourth left pixel in FIG. 18 corresponding to the fourth shutter time/v since the time of shutter opening.

The foreground area corresponding to the moving object thus contains the motion blurring and hence may be said to be a distorted area.

Figure 19:
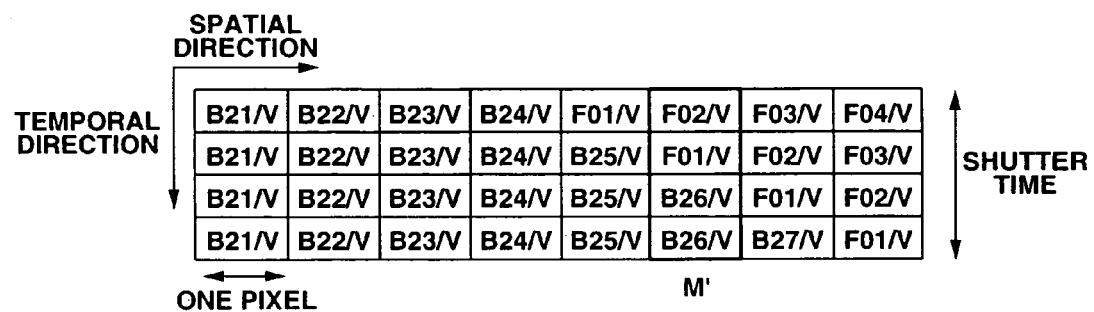
FIG. 19 is a diagrammatic view showing pixel values extended in the time axis direction, with the time period corresponding to the shutter time shown split.

FIG. 19 diagrammatically shows pixel values of pixels on a line comprehending the uncovered background area in case the foreground is moving towards right in the drawing, with the pixels shown extended in the time axis direction. In FIG. 19, the movement quantity v of the foreground is 4. Since one frame is of short duration, it may be assumed that the object corresponding to the foreground is a rigid body and moving at an equal speed. In FIG. 19, the picture of the object corresponding to the foreground is moved so as to be displayed four pixels rightwards in a frame next to a directly previous frame.

In FIG. 19, the leftmost to fourth left pixels belong to the background area. In FIG. 19, fifth left to seventh left pixels belong to the mixed area which is the covered background area. In FIG. 19, the rightmost pixel belongs to the background area.

Since the object corresponding to the foreground which has hidden the object corresponding to the background is moved so as to be removed from a position ahead of the object corresponding to the background, as time elapses, the components contained in the pixel values of the pixels belonging to the covered background area are switched from the background component picture to the foreground component picture at a certain time point of the time period corresponding to the shutter time.

For example, the pixel value M', shown with a bold line frame in FIG. 18, is represented by the equation (12):

$$M' = F02/v + F01/v + B26/v + B26/v \quad (12).$$

For example, the fifth left pixel contains the background component corresponding to three shutter time/v and the foreground component corresponding to one shutter time/v, the mixing ratio α of the fifth left pixel is ¾. The sixth left pixel contains the background component corresponding to two shutter time/v and the foreground component corresponding to two shutter time/v, so the mixing ratio α is ½. The seventh left pixel contains the background component corresponding to one shutter time/v and the foreground component corresponding to three shutter time/v, so the mixing ratio α is ¼.

56.
If the equations (11), (12) are generalized, the pixel value M is represented by the following equation (13):

$$M = \alpha \cdot \beta + \sum_i Fi/v \quad (13)$$

where α is a mixing ratio, B is a pixel value of the background and Fi/v is the foreground component.

Since the object corresponding to the foreground is a rigid body and may be assumed to be moving at an equal speed, with the movement quantity v being 4, the first foreground component F01/v of the fifth left pixel in FIG. 19, with the first shutter time/v since the time of shutter opening, is equal to the second foreground component of the sixth left pixel in FIG. 19 corresponding to the second shutter time/v since the time of shutter opening. Similarly, the F01/v is equal to the foreground component of the seventh left pixel in FIG. 19 corresponding to the third shutter time/v since the time of shutter opening and to the foreground component of the eighth left pixel in FIG. 19 corresponding to the fourth shutter time/v since the time of shutter opening.

Since the object corresponding to the foreground is a rigid body and may be assumed to be moving at an equal speed, with the movement quantity v being 4, the first foreground component F02/v of the sixth left pixel in FIG. 19, with the first shutter time/v since the time of shutter opening, is equal to the second foreground component of the seventh left pixel in FIG. 19 corresponding to the second shutter time/v since the time of shutter opening. Similarly, the foreground component F02/v is equal to the foreground component of the eighth left pixel in FIG. 19 corresponding to the third shutter time/v since the time of shutter opening.

Since the object corresponding to the foreground is a rigid body and may be assumed to be moving at an equal speed, with the movement quantity v being 4, the first foreground component F03/v of the seventh left pixel in. FIG. 19, with the first shutter time/v since the time of shutter opening, is equal to the second foreground component of the eighth left pixel in FIG. 19 corresponding to the second shutter time/v since the time of shutter opening.

Figure 17:
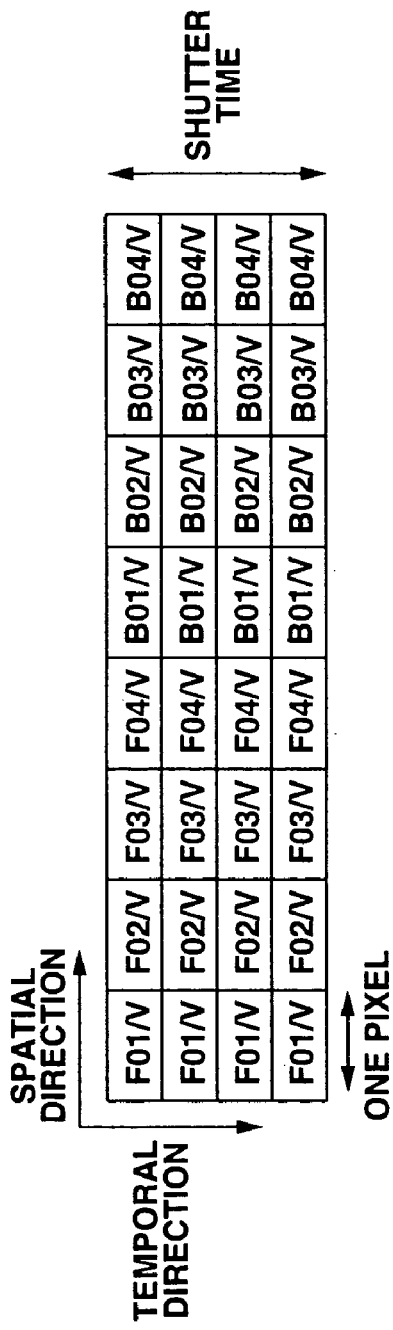
FIG. 17 is a diagrammatic view showing pixel values extended in the time axis direction, with the time period corresponding to the shutter time shown split.

Although the number of times of the virtual splitting is four in the description with respect to FIGS. 17 to 19, the number of times of the virtual splitting corresponds to the movement quantity v. The movement quantity v generally corresponds to the movement speed of the object corresponding to the foreground. For example, if the object corresponding to the foreground is moving so as to be displayed four pixels rightwards in a frame next to a previous reference frame, the movement quantity v is 4. The number of times of the virtual splitting is set to 4 in association with the movement quantity v. Similarly, if the object corresponding to the foreground is moving so as to be displayed six pixels rightwards in a frame next to a previous reference frame, the movement quantity v is 6, with the number of times of the virtual splitting being six.

Figure 20:
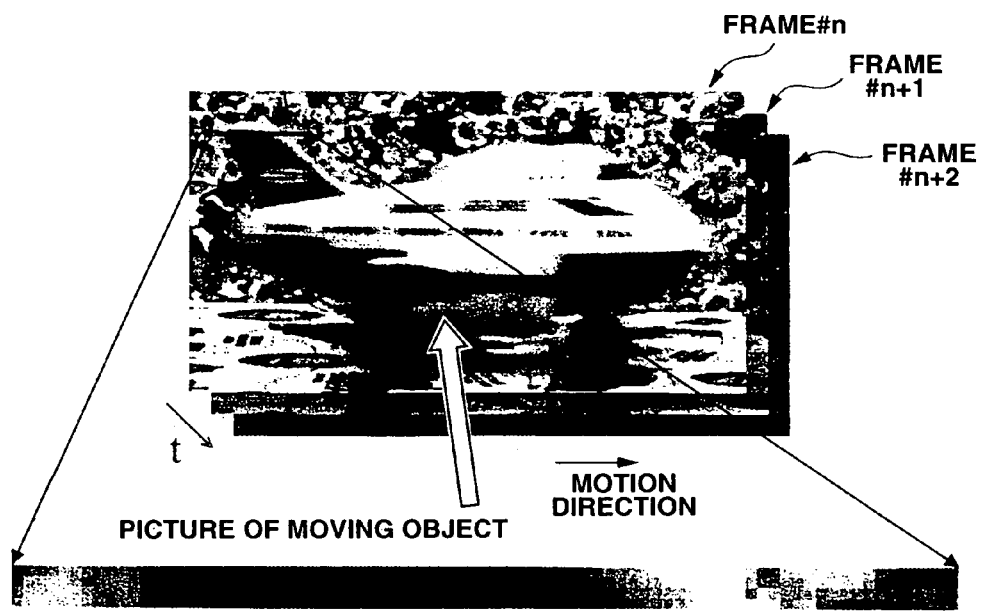
FIG. 20 shows extracted pixels of a foreground area, a background area and a mixed area.
Figure 21:
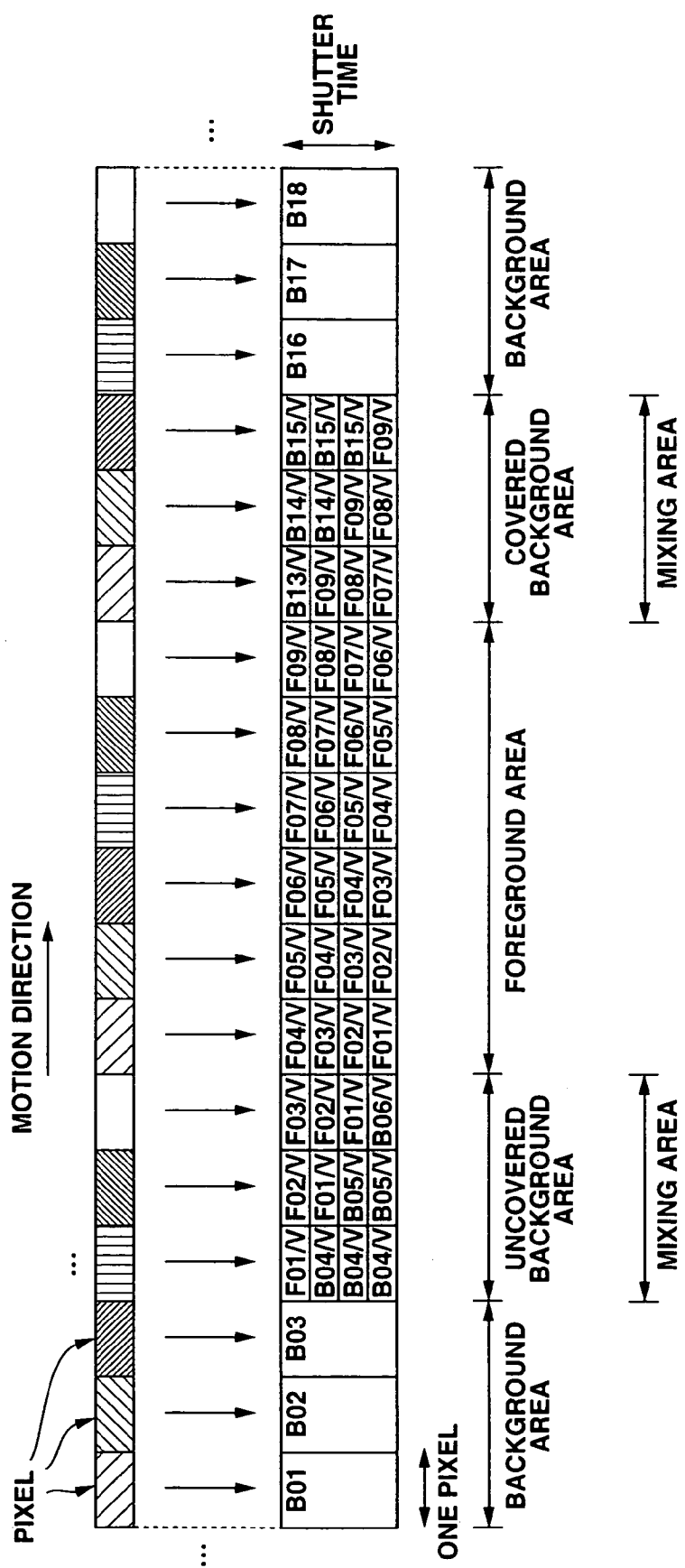
FIG. 21 shows the relation of correspondence between pixels and a model obtained on expanding the pixel values in the time axis direction.

FIGS. 20 and 21 show the relation between the foreground area, background area, and the mixed area, comprised of the covered background area and the uncovered background area, on one hand, and the foreground and background components corresponding to the split shutter time, on the other hand, as described above.

FIG. 20 shows an example of extraction of pixels of the foreground area, background area and the mixed area as extracted from a picture corresponding to an object moving before a still background. In the embodiment shown in FIG. 20, an object corresponding to the foreground is moving horizontally with respect to the picture.

The frame #n+1 is a frame next to the frame #n, with the frame #n+2 being a frame next to the frame #n+1.

FIG. 21 diagrammatically shows a model obtained on extracting pixels of the foreground area, background area and the mixed area, extracted in turn from one of the frames #n to #n+2, with the movement quantity v being 4, and on expanding the pixel values of the extracted pixels along the time axis direction.

Since the object corresponding to the foreground is moved, the pixel values of the foreground area are constituted by four different foreground components corresponding to the period of the shutter time/v. For example, the leftmost one of pixels of the foreground area shown in FIG. 21 are F01/v, F02/v, F03/v and F04/v. That is the pixels of the foreground area contain are corrupted with motion blurring.

Since the object corresponding to the background is at a standstill, the light corresponding to the background input to the sensor 11 during the time corresponding to the shutter time is not changed. In this case, the pixel values of the background are free of the motion blurring.

The pixel values or the pixels belonging to the mixed area composed of the covered background area or the uncovered background area are comprised of the foreground and background components.

A model comprised of neighboring pixels in a row in plural frames, in which the pixel values of pixels lying at the same position on a frame are developed in the time axis direction, with the picture corresponding to an object being moved, is explained. For example, if the picture corresponding to the object is moving horizontally with respect to the picture, the pixels arrayed on the same row on the picture may be selected as the pixels in a row in a picture.

Figure 22:
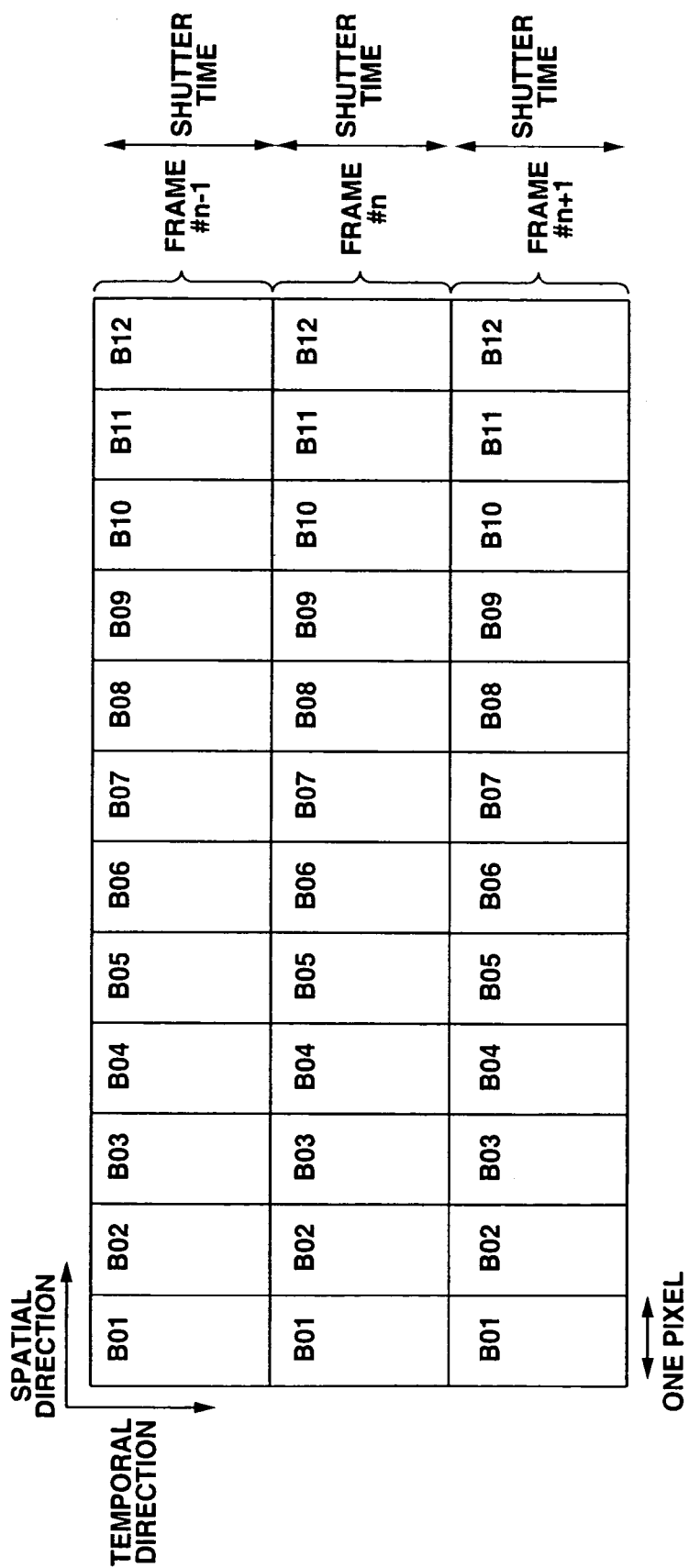
FIG. 22 is a diagrammatic view showing pixel values developed in the time axis direction and showing the time period corresponding to the shutter period shown split.

FIG. 22 diagrammatically shows a model obtained on temporally expanding the pixel values of pixels arrayed in a row of each of three frames of a picture of a photographed object corresponding to a still background, with the developed pixels being at the same positions on the respective frames. The frame #n is the frame next to the frame #n−1, with the frame #n+1 being the frame next to the frame #n. The remaining frames are termed in similar manner.

The pixel values of B01 to B12 shown in FIG. 22 are those of pixels corresponding to the object of the still background. Since the object corresponding to the background is at a standstill, the pixel values of the corresponding pixels in the frames #n·1 ti frame n+1 are not changed. For example, the pixel in the frame #n and the pixel in the frame #n+1, corresponding to the positions of the pixels having pixel values of B05 in the frame #n·1, are of pixel values of B05.

Figure 23:
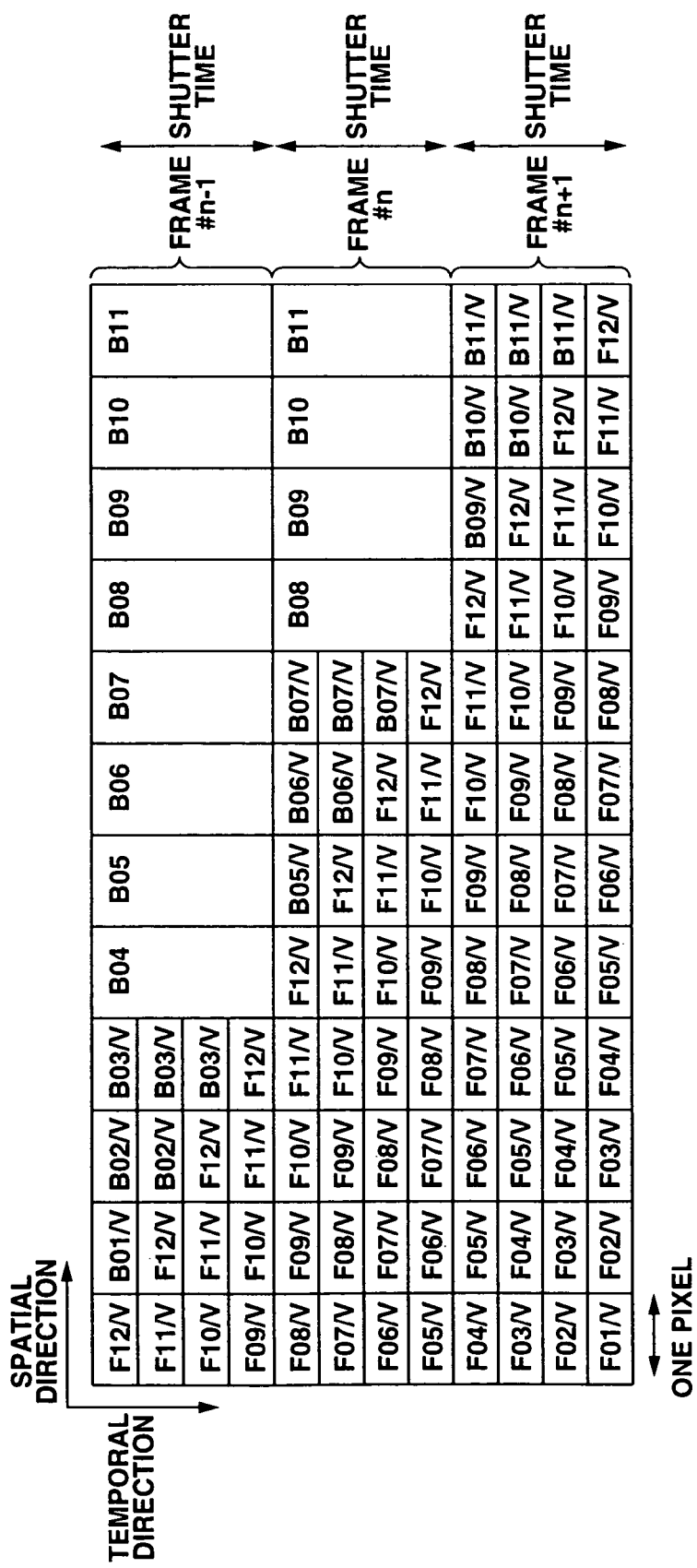
FIG. 23 is a diagrammatic view showing pixel values developed in the time axis direction and showing the time period corresponding to the shutter period shown split.

FIG. 23 shows pixel values of neighboring pixels in a row in each of three frames of a photographed picture of an object corresponding to the foreground moving rightwards in FIG. 23, along with the object corresponding to the still background, with the pixel values being shown developed along the time axis direction. The model shown in FIG. 23 includes a covered background area.

In FIG. 23, the object corresponding to the foreground is a rigid body and may be assumed to be moving at a constant speed, with the foreground picture being moved so that the foreground picture will be displayed four pixels rightwards in the next frame. So, the movement quantity v of the foreground is 4, with the number of times of the virtual splitting being 4.

For example, the foreground component of the leftmost pixel of the frame #n·1 in FIG. 23, with the first shutter time/v since the opening of the shutter, is F12/v, whilst the foreground component of the second left pixel, with the second shutter time/v since the opening of the shutter, is also F12v. The foreground component of the third left pixel in FIG. 23, with the third shutter time/v since the opening of the shutter, and the foreground component of the fourth left pixel in FIG. 23, with the fourth shutter time/v since the opening of the shutter, are each F12/v.

For example, the foreground component of the leftmost pixel of the frame #n·1 in FIG. 23, with the second shutter time/v since the opening of the shutter, is F11/v, whilst the foreground component of the second left pixel, with the third shutter time/v since the opening of the shutter, is also F11v. The foreground component of the third left pixel in FIG. 23, with the fourth shutter time/v since the opening of the shutter, is F11/v.

The foreground component of the leftmost pixel of the frame #n·1 in FIG. 23, with the third shutter time/v since the opening of the shutter, is F10/v, whilst the foreground component of the second left pixel, with the fourth shutter time/v since the opening of the shutter, is also F10v. The foreground component of the leftmost pixel in FIG. 23, with the fourth shutter time/v since the opening of the shutter, is F09/v.

Since the object corresponding to the background is at a standstill, the background component of the second left pixel of the frame #n·1 in FIG. 23, with the first shutter time/v as from the shutter opening time, is B01/v. The background component of the third left pixel of the frame #n·1 in FIG. 23, with the first and second shutter time/v as from the shutter opening time, is B02/v, while the background component of the fourth left pixel of the frame #n·1 in FIG. 23, with the first to third shutter time/v as from the shutter opening time, is B03/v.

In the frame #n·1 in FIG. 23, the leftmost pixel belongs to the foreground area, while the second to fourth left pixels belong to the mixed area which is the covered background area.

The fifth to twelfth left pixels of the frame #n·1 in FIG. 23 belong to the background area, with the corresponding pixel values being B04 to B11, respectively.

The first to fifth pixels of the frame #n·1 in FIG. 23 belong to the background area. The foreground component in the foreground area of the frame #n, with the shutter time/v, is one of F05v to F12/v.

Since the object corresponding to the foreground is a rigid body and may be assumed to be moving at a constant speed, with the foreground picture being moved so that the foreground picture will be displayed four pixels rightwards in the next frame, the foreground component of the fifth left pixel of the frame #n· in FIG. 23, with the first shutter time/v since the opening of the shutter, is F12/v, whilst the foreground component of the sixth left pixel, with the second shutter time/v since the opening of the shutter, is also F12v. The foreground component of the seventh left pixel in FIG. 23, with the third shutter time/v since the opening of the shutter, and the foreground component of the eighth left pixel in FIG. 23, with the fourth shutter time/v since the opening of the shutter, are each F12/v.

The foreground component of the fifth left pixel of the frame #n in FIG. 23, with the second shutter time/v since the opening of the shutter, is F11/v, whilst the foreground component of the sixth left pixel, with the third shutter time/v since the opening of the shutter, is also F11v. The foreground component of the seventh left pixel in FIG. 23, with the fourth shutter time/v since the opening of the shutter, is F11/v.

The foreground component of the fifth left pixel of the frame #n in FIG. 23, with the third shutter time/v since the opening of the shutter, is F10/v, whilst the foreground component of the sixth left pixel, with the fourth shutter time/v since the opening of the shutter, is also F10v. The foreground component of the fifth left pixel in FIG. 23, with the fourth shutter time/v since the opening of the shutter, is F09/v.

Since the object corresponding to the background is at a standstill, the background component of the sixth left pixel of the frame #n in FIG. 23, with the first shutter time/v as from the shutter opening time, is B05/v. The background component of the seventh left pixel of the frame #n in FIG. 23, with the first and second shutter time/v as from the shutter opening time, is B06/v, while the background component of the eighth left pixel of the frame #n in FIG. 23, with the first to third shutter time/v as from the shutter opening time, is B07/v.

In the frame #n·1. in FIG. 23, the first to ninth left pixels belong to the foreground area, while the sixth to eighth left pixels belong to the mixed area which is the covered background area.

The first to ninth to twelfth left pixels of the frame #n+1 in FIG. 23 belong to the foreground area, with the pixel values being B08 to B11, respectively.

The first to ninth pixels of the frame #n+1 in FIG. 23 belong to the foreground area. The foreground component in the foreground area of the frame #n+1, with the shutter time/v, is one of F01v to F12/v.

Since the object corresponding to the foreground is a rigid body and may be assumed to be moving at a constant speed, with the foreground picture being moved so that the foreground picture will be displayed four pixels rightwards in the next frame, the foreground component of the ninth left pixel of the frame #n+1 in FIG. 23, with the first shutter time/v since the opening of the shutter, is F12/v, whilst the foreground component of the tenth left pixel, with the second shutter time/v since the opening of the shutter, is also F12v. The foreground component of the eleventh left pixel in FIG. 23, with the third shutter time/v since the opening of the shutter, and the foreground component of the twelfth left pixel in FIG. 23, with the fourth shutter time/v since the opening of the shutter, are each F12/v.

The foreground component of the ninth left pixel of the frame #n+1 in FIG. 23, with the second shutter time/v since the opening of the shutter, is F11/v, whilst the foreground component of the tenth left pixel, with the third shutter time/v since the opening of the shutter, is also F11v. The foreground component of the eleventh left pixel in FIG. 23, with the fourth shutter time/v since the opening of the shutter, is F11/v.

The foreground component of the ninth left pixel of the frame #n+1 in FIG. 23, with the third shutter time/v since the opening of the shutter, is F10/v, whilst the foreground component of the tenth left pixel, with the fourth shutter time/v since the opening of the shutter, is also F10v. The foreground component of the ninth left pixel of the frame #n+1 in FIG. 23, with the fourth shutter time/v since the opening of the shutter, is F09/v.

Since the object corresponding to the background is at a standstill, the background component of the tenth left pixel of the frame #n+1 in FIG. 23, with the first shutter time/v as from the shutter opening time, is B09/v. The background component of the eleventh left pixel of the frame #n+1 in FIG. 23, with the first and second shutter time/v as from the shutter opening time, is B10/v, while the background component of the twelfth left pixel of the frame #n+1 in FIG. 23, with the first to third shutter time/v as from the shutter opening time, is B11/v.

In the frame #n+1 in FIG. 23, the tenth to twelfth left pixels correspond to the mixed area which is the covered background area.

Figure 24:
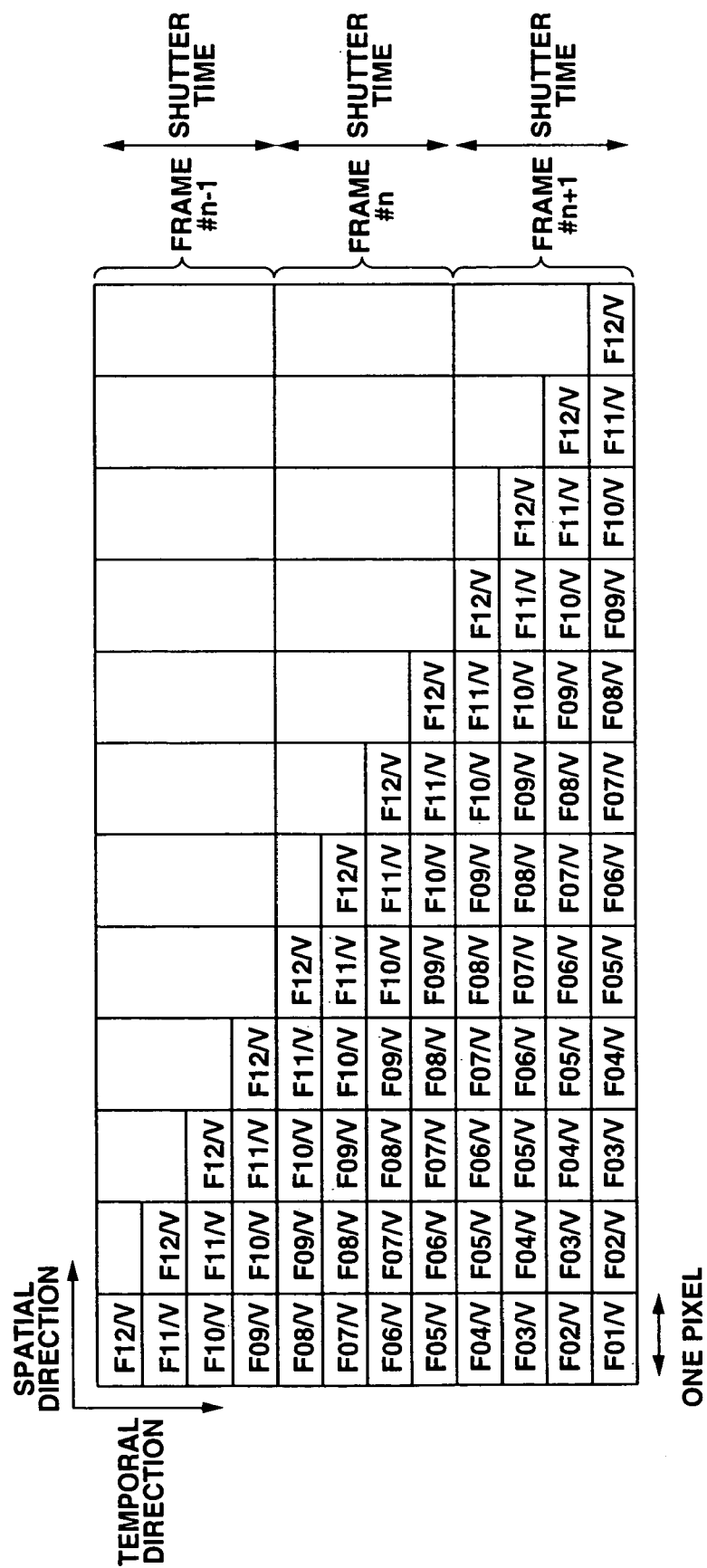
FIG. 24 is a diagrammatic view showing pixel values developed in the time axis direction and showing the time period corresponding to the shutter period shown split.

FIG. 24 diagrammatically shows a picture obtained on extracting the foreground component from the pixel values shown in FIG. 23.

Figure 25:
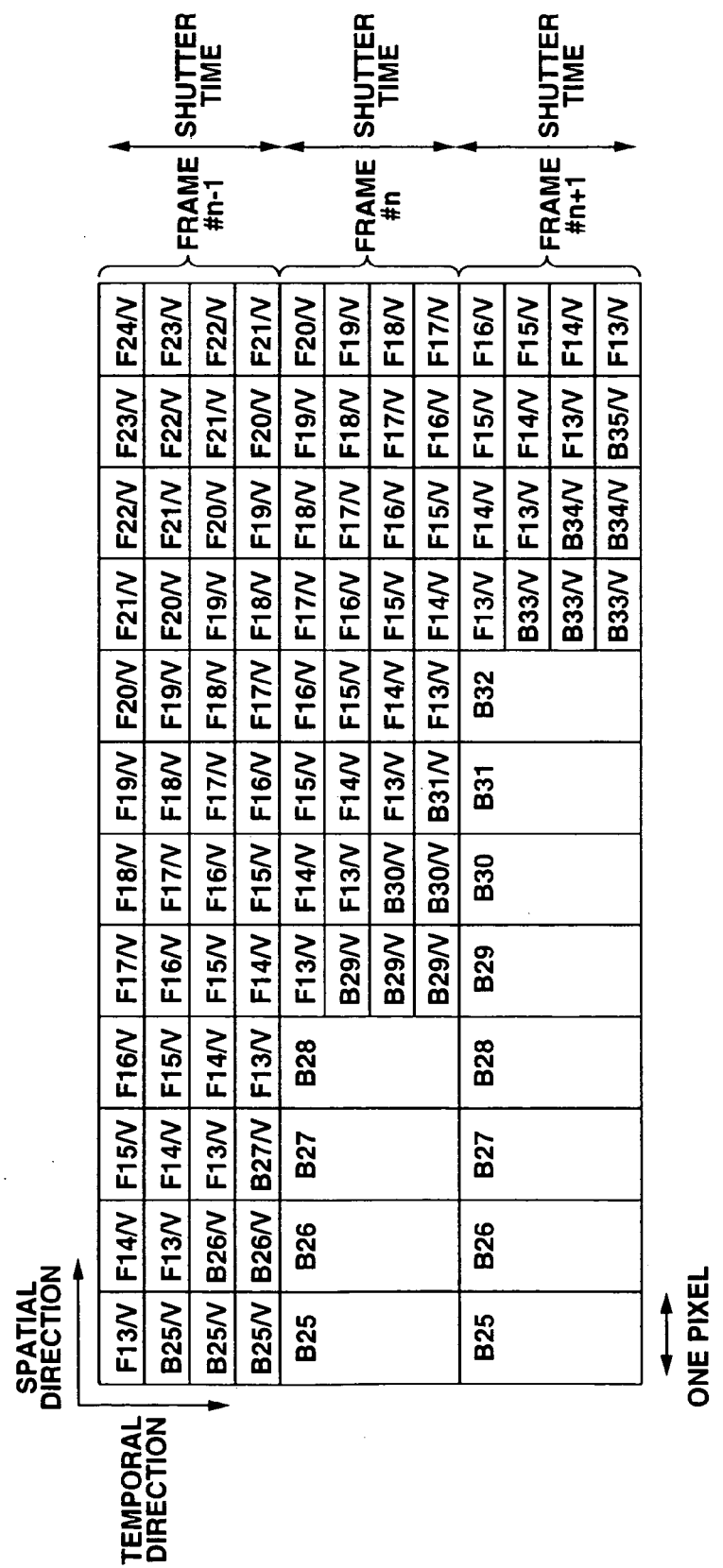
FIG. 25 is a diagrammatic view showing pixel values developed in the time axis direction and showing the time period corresponding to the shutter period shown split.

FIG. 25 shows neighboring pixels in a row of each of three frames of a photographed picture of the foreground corresponding to an object moving rightwards in the drawing, along with the still background. In FIG. 25, there is also shown the uncovered background area.

In FIG. 25, the object corresponding to the foreground is a rigid body and may be assumed to be moving at a constant speed, with the foreground picture being moved so that the foreground picture will be displayed four pixels rightwards in the next frame. So, the movement quantity v of the foreground is 4.

For example, the foreground component of the leftmost pixel of the frame #n·1 in FIG. 25, with the first shutter time/v since the opening of the shutter, is F13/v, whilst the foreground component of the second left pixel, with the second shutter time/v since the opening of the shutter, is also F13v. The foreground component of the third left pixel in FIG. 23, with the second shutter time/v since the opening of the shutter, and the foreground component of the fourth left pixel in FIG. 25, with the fourth shutter time/v since the opening of the shutter, are each F13/v.

For example, the foreground component of the second left pixel of the frame #n·1 in FIG. 23, with the first shutter time/v since the opening of the shutter, is F14/v, whilst the foreground component of the third left pixel, with the second shutter time/v since the opening of the shutter, is also F14v. The foreground component of the third left pixel in FIG. 25, with the first shutter time/v since the opening of the shutter, is F15/v.

Since the object corresponding to the background is at a standstill, the background component of the leftmost pixel of the frame #n·1 in FIG. 25, with the second to fourth shutter time/v as from the shutter opening time, is B01/v. The background component of the second left pixel of the frame #n·1 in FIG. 25, with the third and fourth shutter time/v as from the shutter opening time, is B26/v, while the background component of the third left pixel of the frame #n·1 in FIG. 25, with the fourth shutter time/v as from the shutter opening time, is B27/v.

In the frame #n·1 in FIG. 25, the first to third left pixel belongs to the mixed area which is the covered background area.

The fourth to twelfth left pixels of the frame #n·1 in FIG. 25 belong to the foreground area, with the foreground component of the foreground of the frame being one of F13v to F24v.

The first to fourth left pixels of the frame #n in FIG. 25 belong to the background area, with the pixel values being B25 to B28, respectively.

Since the object corresponding to the foreground is a rigid body and may be assumed to be moving at a constant speed, with the foreground picture being moved so that the foreground picture will be displayed four pixels rightwards in the next frame, the foreground component of the fifth left pixel of the frame #n in FIG. 23, with the first shutter time/v since the opening of the shutter, is F13/v, whilst the foreground component of the sixth left pixel, with the second shutter time/v since the opening of the shutter, is also F13v. The foreground component of the seventh left pixel in FIG. 25, with the third shutter time/v since the opening of the shutter, and the foreground component of the eighth left pixel in FIG. 25, with the fourth shutter time/v since the opening of the shutter, are each F13/v.

The foreground component of the sixth left pixel of the frame #n in FIG. 23, with the first shutter time/v since the opening of the shutter, is F14/v, whilst the foreground component of the seventh left pixel, with the second shutter time/v since the opening of the shutter, is also F14v. The foreground component of the eighth left pixel in FIG. 25, with the first shutter time/v since the opening of the shutter, is F15/v.

Since the object corresponding to the background is at a standstill, the background component of the fifth left pixel of the frame #n in FIG. 25, with the second to fourth shutter time/v as from the shutter opening time, is B29/v. The background component of the sixth left pixel of the frame #n in FIG. 25, with the third and fourth shutter time/v as from the shutter opening time, is B30/v, while the background component of the seventh left pixel of the frame #n in FIG. 23, with the fourth shutter time/v as from the shutter opening time, is B31/v.

In the frame #n in FIG. 25, the first to ninth left pixels belong to the foreground area, while the fifth to seventh left pixels belong to the mixed area which is the covered background area.

The eighth to twelfth left pixels of the frame #n+1 in FIG. 25 belong to the foreground area, with the pixel values being B25 to B32, respectively.

The first to eighth pixels of the frame #n+1 in FIG. 25 belong to the background area, with the pixel values being B25 to B32, respectively.

Since the object corresponding to the foreground is a rigid body and may be assumed to be moving at a constant speed, with the foreground picture being moved so that the foreground picture will be displayed four pixels rightwards in the next frame, the foreground component of the ninth left pixel of the frame #n+1 in FIG. 25, with the first shutter time/v since the opening of the shutter, is F13/v, whilst the foreground component of the tenth left pixel, with the second shutter time/v since the opening of the shutter, is also F13v. The foreground component of the eleventh left pixel in FIG. 25, with the third shutter time/v since the opening of the shutter, and the foreground component of the twelfth left pixel in FIG. 25, with the fourth shutter time/v since the opening of the shutter, are each F13/v.

The foreground component of the tenth left pixel of the frame #n+1 in FIG. 25, with the first shutter time/v since the opening of the shutter, is F14/v, whilst the foreground component of the eleventh left pixel, with the second shutter time/v since the opening of the shutter, is also F14v. The foreground component of the twelfth left pixel in FIG. 25, with the first shutter time/v since the opening of the shutter, is F15/v.

Since the object corresponding to the background is at a standstill, the background component of the ninth left pixel of the frame #n+1 in FIG. 25, with the second to fourth shutter time/v as from the shutter opening time, is B33/v. The background component of the tenth left pixel of the frame #n+1 in FIG. 25, with the third and fourth shutter time/v as from the shutter opening time, is B34/v, while the background component of the eleventh left pixel of the frame #n+1 in FIG. 25, with the fourth shutter time/v as from the shutter opening time, is B35/v.

In the frame #n+1 in FIG. 25, the ninth to eleventh left pixels correspond to the mixed area which is the covered background area.

In FIG. 25, the twelfth left pixel of the frame #n+1 belong to the foreground area. The foreground component with the shutter time/v in the foreground area of frame #n+1 is one of F13v to F16v.

Figure 26:
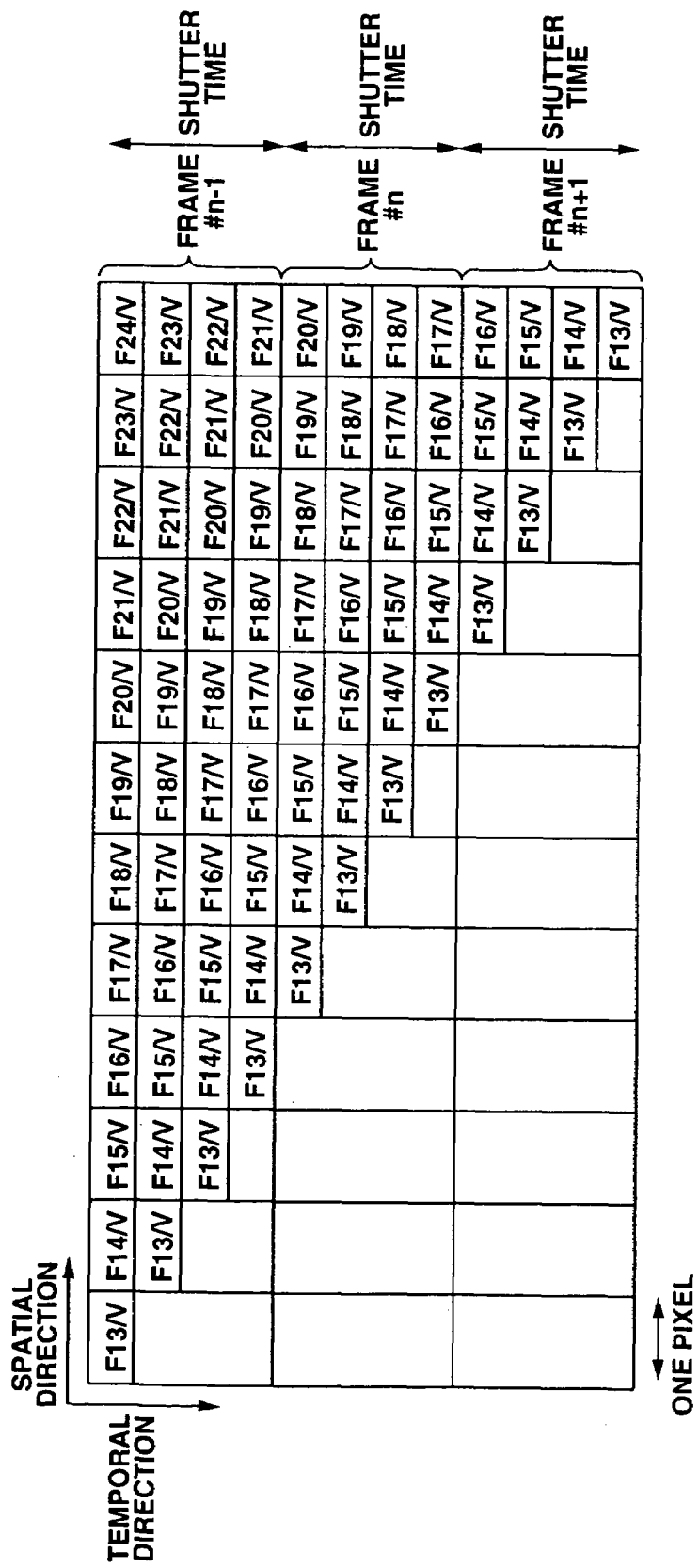
FIG. 26 is a diagrammatic view showing pixel values developed in the time axis direction and showing the time period corresponding to the shutter period shown split.

FIG. 26 diagrammatically shows a picture obtained on extracting the foreground component from the pixel values shown in FIG. 25.

Reverting to FIG. 10, the area specifying unit 103 associates a flag, indicating that a given picture belong to the foreground area, a background area, a covered background area or an uncovered background area, from pixel to pixel, using pixel value of plural frames, and routes the resulting areal information to the mixing ratio calculating unit 104 and to the motion blurring adjustment unit 106.

Based on the pixel values of plural frames and the areal information, the mixing ratio calculating unit 104 computes the mixing ratio α for each of the pixels contained in the mixed area, and sends the computed mixing ratio α to the foreground/background separating unit 105.

Based on the pixel values of the plural frames, areal information and the mixing ratio α, the foreground/background separating unit 105 extracts the foreground component picture made up only of the foreground component to send the extracted component picture to the motion blurring adjustment unit 106.

Based on the foreground component picture sent from the foreground/background separating unit 105, the motion vector sent from the motion detection unit 102 and on the areal information sent from the area specifying unit 103, the motion blurring adjustment unit 106 adjusts the quantity of the motion blurring contained in the foreground component picture to output the foreground component picture adjusted for the motion blurring.

Figure 27:
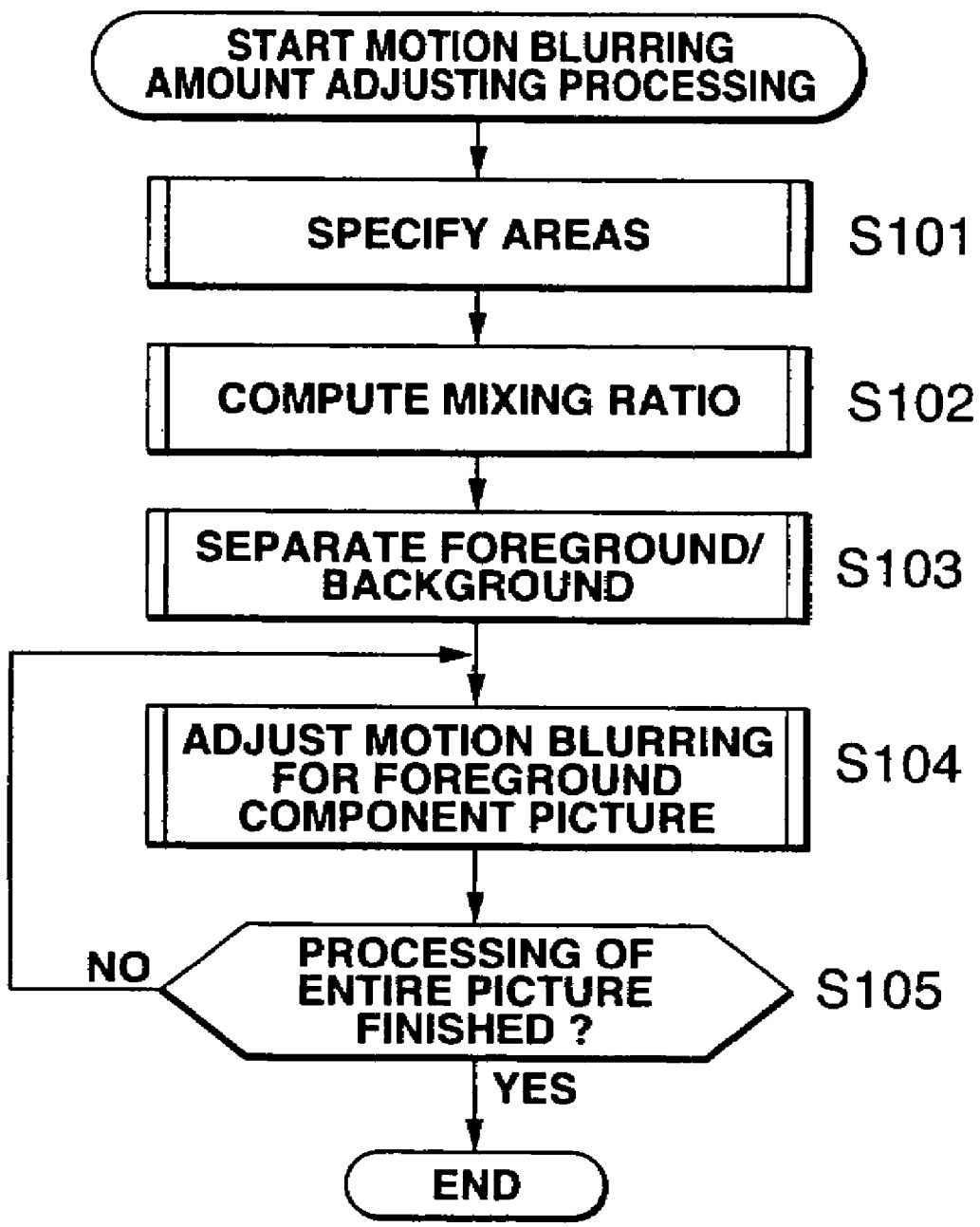
FIG. 27 is a flowchart for illustrating the processing for adjusting the amount of the motion blurring.

Referring to the flowchart of FIG. 27, the processing for adjusting the motion blurring caused by the signal processor 12 is explained. At step S101, the area specifying unit 103 executes the area specifying processing for generating the areal information indicating to which of the foreground area, background area, covered background area or the uncovered background area belong the pixels of the input picture, from one pixel of the input picture to another. The area specifying processing will be explained subsequently by referring to the flowchart of FIG. 36. The area specifying unit 103 sends the generated area information to the mixing ratio calculating unit 104.

Meanwhile, the area specifying unit 103 at step S101 may generate the areal information indicating to which of the foreground area, background area or the mixed area belong the pixels of the input picture, from one pixel of the input picture to another, based on the input picture. In this case, no distinction is made between the covered background area and the uncovered background area. In this case, the foreground/background separating unit 105 and the motion blurring adjustment unit 106 decide whether the mixed area is the covered background area or the uncovered background area, based on the direction of the motion vector. For example, if the foreground area, mixed area and the background area are arrayed sequentially in association with the direction of the motion vector, the mixed area is verified to be the covered background area, whereas, if the background area, mixed area and the foreground area are arrayed sequentially in association with the direction of the motion vector, the mixed area is verified to be the uncovered background area.

At step S102, the mixing ratio calculating unit 104 calculates the mixing ratio α, from one pixel contained in the mixing area to another, based on the input picture and the area information. The processing for computing the mixing ratio will be explained in detail subsequently by referring to the flowchart of FIG. 46. The mixing ratio calculating unit 104 sends the computed mixing ratio α to the foreground/background separating unit 105.

At step S103, the foreground/background separating unit 105 extracts the foreground component from the input picture, based on the motion vector and the areal information, to send the extracted component to the motion blurring adjustment unit 106 as the foreground component picture.

At step S104, the motion blurring adjustment unit 106 generates a processing unit for indicating a position on the picture of pixels arrayed consecutively in the movement direction of each of the uncovered background area, foreground area and the covered background area, based on the motion vector and on the area information, to adjust the quantity of the motion blurring contained in the foreground component corresponding to the processing unit. The processing for adjusting the quality of the motion blurring will be explained subsequently by referring to the flowchart of FIG. 63.

At step S105, the signal processor 12 verifies whether or not the processing has been finished for the entire picture. If the signal processor 12 has verified that the processing has not been finished fort the entire picture, it proceeds to step S104 to repeat the processing for adjusting the quantity of the motion blurring for the foreground component corresponding to the processing unit.

If, at step S106, it is verified that the processing has been finished for the entire picture, the processing is terminated.

In this manner, the signal processor 12 is able to separate the foreground and the background from each other to adjust the quantity of the motion blurring contained in the foreground. That is, the signal processor 12 is able to adjust the amount of motion blurring contained in sample data as pixel value of the foreground pixel.

In the following, illustrative structures of the area specifying unit 103, mixing ratio calculating unit 104, foreground/background separating unit 105 and the motion blurring adjustment unit 106 are hereinafter explained.

Figure 28:
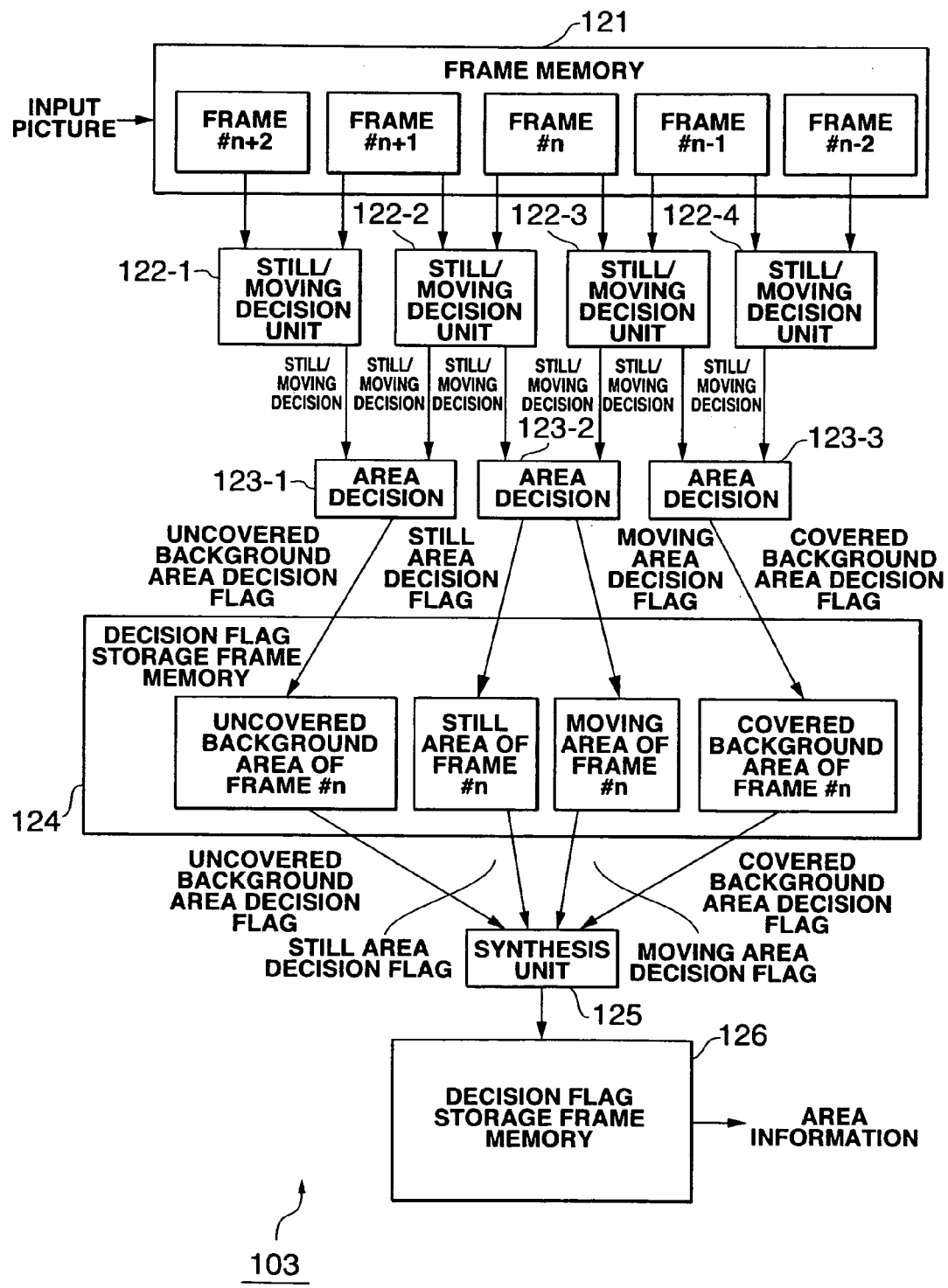
FIG. 28 is a block diagram showing an illustrative structure of an area specifying unit 103.

FIG. 28 is a block diagram showing an illustrative structure of the area specifying unit 103. A frame memory 121 stores an input picture on the frame basis. When a frame being processed is a frame #n, the frame memory 121 stores a frame #n·2, as a frame two frames before the frame #n, a frame #n·1, as a frame one frame before the frame #n, a frame #n+1, as a frame one frame after the frame #n, and a frame #n+2, as a frame two frames after the frame #n.

A still/movement discriminating unit 122-1 reads out a pixel value of a pixel of the frame #n+2 lying at the same position as the position on the picture of the pixel of the frame #n being area-specified, and a pixel value of a pixel of the frame #n+1 lying at the same position as the position on the picture of the pixel of the frame #n being area-specified, from the frame memory 121, to calculate an absolute value of the difference of the read-our pixel values. The still/movement discriminating unit 122-1 verifies whether or not the absolute value of the difference between the pixel value of the frame #n+2 and the frame #n+1 is larger than a predetermined threshold value Th. If it is verified that the absolute value of the difference is larger than the threshold value Th, the still/movement discriminating unit 122-1 routes a still/movement decision specifying the movement decision to an area decision unit 123-1. If it is verified that the absolute value o the difference between the pixel value of the frame #n+2 nd the pixel value of the frame #n+1 is not larger than the threshold value Th, the still/movement discriminating unit 122-1 routes a still/movement decision specifying the still decision to an area decision unit 123-1.

A still/movement discriminating unit 122-2 reads out a pixel value of a pixel of the frame #n+1 lying at the same position as the position on the picture of the pixel of the frame #n being area-specified, and a pixel value of a pixel of the frame #n+1 lying at the same position as the position on the picture of the pixel of the frame #n being area-specified, from the frame memory 121, to calculate an absolute value of the difference of the read-our pixel values. The still/movement discriminating unit 122-2 verifies whether or not the absolute value of the difference between the pixel value of the frame #n+1 and the frame #n is larger than a predetermined threshold value Th. If it is verified that the absolute value of the difference between the is larger than the threshold value Th, the still/movement discriminating unit 122-1 routes a still/movement decision specifying the movement decision to an area decision unit 123-1and to an area decision unit 123-2. If it is verified that the absolute value of the difference between the pixel value of the pixel of the frame #n+1 and that of the pixel of the frame #n is not larger than the threshold value Th, the still/movement discriminating unit 122-1 routes a still/movement decision specifying the still decision to an area decision unit 123-1 and to an area decision unit 123-2.

A still/movement discriminating unit 122-3 reads out a pixel value of a pixel of the frame #n lying at the same position as the position on the picture of the pixel of the frame #n being area-specified, and a pixel value of a pixel of the frame #n·1 lying at the same position as the position on the picture of the pixel of the frame #n being area-specified, from the frame memory 121, to calculate an absolute value of the difference of the read-our pixel values. The still/movement discriminating unit 122-3 verifies whether or not the absolute value of the difference between the pixel value of the frame #n and the frame #n·1 is larger than a predetermined threshold value Th. If it is verified that the absolute value of the difference between the pixel values is larger than the threshold value Th, the still/movement discriminating unit 122-3 routes a still/movement decision specifying the movement decision to an area decision unit 123-1 and to an area decision unit 123-3. If it is verified that the absolute value of the difference between the pixel value of the pixel of the frame #n and that of the pixel of the frame #n·1 is not larger than the threshold value Th, the still/movement discriminating unit 122-3 routes a still/movement decision specifying the still decision to an area decision unit 123-2 and to an area decision unit 123-3.

A still/movement discriminating unit 122-4 reads out the pixel value of the pixel of the frame #n·1 lying at the same position as the position on the picture of the pixel of the frame #·n being area-specified, and the pixel value of the pixel of the frame #n·2 lying at the same position on the picture of the pixel of the frame #n being area-specified, to calculate the absolute value of the difference of the pixel values. The still/movement discriminating unit 122-4 verifies whether or not the absolute value of the difference of the pixel value of the frame #n·1 and the pixel value of the frame #n·2 is larger than the predetermined threshold value Th. If the absolute value of the difference between the pixel value of the frame #n·1 and the pixel value of the frame #n·2 is verified to be larger than the threshold value Th, a still/movement decision indicating the decision for movement is routed to the area decision unit 123-3. If it is verified that the absolute value of the difference between the pixel value of the frame #n·1 and the pixel value of the frame #n·2 is not larger than the threshold value Th, the still/movement discriminating unit 122-4 routes a still/movement decision indicating the still decision to the area decision unit 123-3.

If the still/movement decision routed from the still/movement discriminating unit 122-1 indicates still and the still/movement decision routed from the still/movement discriminating unit 122-2 indicates movement, the area decision unit 123-1 decides that the pixel on the frame #n being area-specified belongs to the uncovered background area and sets "1" in an uncovered background area decision flag associated with the pixel being area-specified for indicating that the pixel belongs to the uncovered background area.

If the still/movement decision routed from the still/movement discriminating unit 122-1 indicates movement and the still/movement decision routed from the still/movement discriminating unit 122-2 indicates still, the area decision unit 123-1 decides that the pixel on the frame #n being area-specified does not belong to the uncovered background area and sets "0" in an uncovered background area decision flag associated with the pixel being area-specified for indicating that the pixel does not belong to the uncovered background area.

The area decision unit 123-1 routes the uncovered background area decision flag, having "1" or "0" set in this manner, to a decision flag storage memory 124.

If the still/movement decision routed from the still/movement discriminating unit 122-2 indicates still and the still/movement decision routed from the still/movement discriminating unit 122-3 indicates still, the area decision unit 123-2 decides that the pixel on the frame #n being area-specified belongs to the still area and sets "1" in a still area decision flag associated with the pixel being area-specified for indicating that the pixel belongs to the uncovered background area.

If the still/movement decision routed from the still/movement discriminating unit 122-2 indicates movement or the still/movement decision routed from the still/movement discriminating unit 122-3 indicates movement, the area decision unit 123-2 decides that the pixel on the frame #n being area-specified does not belong to the still area and sets "0" in a still area decision flag associated with the pixel being area-specified for indicating that the pixel does not belong to the still area.

The area decision unit 123-2 routes the still area decision flag, thus having "1" or "0" set therein, to the decision flag storage memory 124.

If the still/movement decision routed from the still/movement discriminating unit 122-2 indicates movement and the still/movement decision routed from the still/movement discriminating unit 122-3 indicates movement, the area decision unit 123-2 decides that the pixel on the frame #n being area-specified belongs to the movement area and sets "1" in a movement area decision flag associated with the pixel being area-specified for indicating that the pixel belongs to the movement area.

If the still/movement decision routed from the still/movement discriminating unit 122-2 indicates still or the still/movement decision routed from the still/movement discriminating unit 122-3 indicates still, the area decision unit 123-2 decides that the pixel on the frame #n being area-specified does not belong to the movement area and sets "0" in a movement area decision flag associated with the pixel being area-specified for indicating that the pixel does not belong to the movement area.

The area decision unit 123-2 routes the movement area decision flag, thus having "1" or "0" set therein, to the decision flag storage memory 124.

If the still/movement decision routed from the still/movement discriminating unit 122-3 indicates movement and the still/movement decision routed from the still/movement discriminating unit 122-4 indicates still, the area decision unit 123-3 decides that the pixel on the frame #n being area-specified belongs to the uncovered background area and sets "1" in a covered background area decision flag associated with the pixel being area-specified for indicating that the pixel belongs to the covered background area.

If the still/movement decision routed from the still/movement discriminating unit 122-3 indicates still or the still/movement decision routed from the still/movement discriminating unit 122-4 indicates movement, the area decision unit 123-3 decides that the pixel on the frame #n being area-specified does not belong to the covered background area and sets "0" in a covered background area decision flag associated with the pixel being area-specified for indicating that the pixel does not belong to the covered background area.

The area decision unit 123-3 routes the covered background area decision flag, thus having "1" or "0" set therein, to the covered background area decision flag storage memory 124.

The decision flag storage memory 124 stores the uncovered background area decision flag, sent from the area decision unit 123-1, the still area decision flag, sent from the area decision unit 123-2, the movement area decision flag, sent from the area decision unit 123-2, and the uncovered background area decision flag, sent from the area decision unit 123-3.

The decision flag storage memory 124 sends the uncovered background area decision flag, still area decision flag, movement area decision flag and the covered background area decision flag to a synthesis unit 125. Based on the uncovered background area decision flag, still area decision flag, movement area decision flag and the covered background area decision flag, supplied from the decision flag storage memory 124, the synthesis unit generates the area information indicating to which of the uncovered background area, still area, movement area and the covered background area belong the respective pixels, and routes the information so generated to a decision flag storage frame memory 126.

The decision flag storage frame memory 126 stores the area information, supplied from the synthesis unit 125, while outputting the area information stored therein.

Referring to FIGS. 29 to 33, a typical processing by the area specifying unit 103 is explained.

Figure 29:
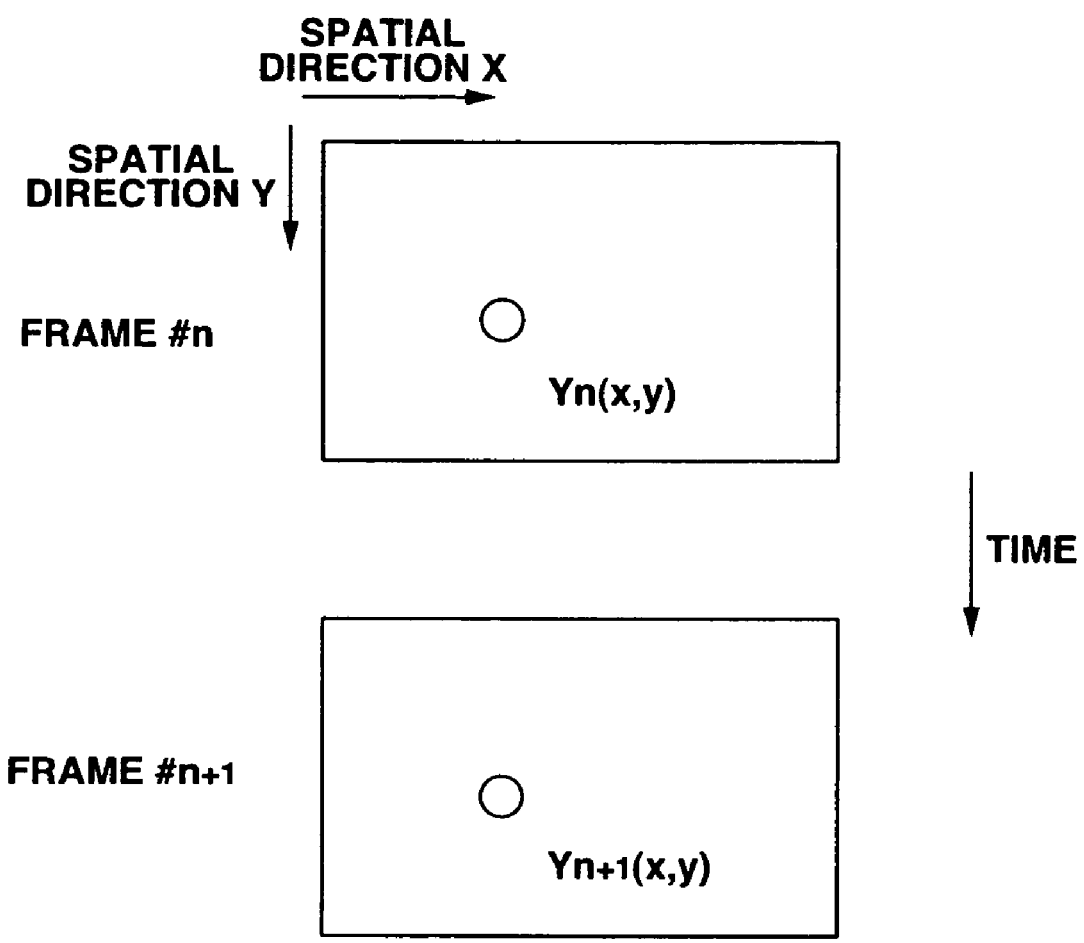
FIG. 29 illustrates a picture as an object corresponding to the foreground is being moved.

When an object corresponding to the foreground is moving, the position of the picture corresponding to the object on the picture screen is changed from frame to frame. Referring to FIG. 29, a picture corresponding to an object at a position Yn(x, y) in a frame #n is positioned at Yn+1(x,y) at the next frame #n+1.

Figure 30:
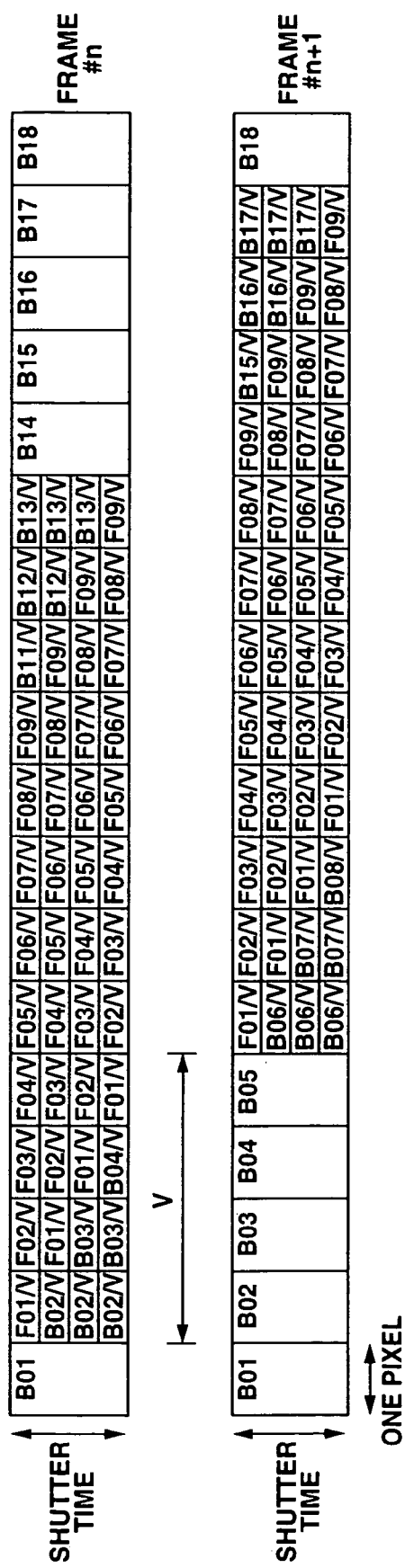
FIG. 30 is a diagrammatic view showing pixel values developed in the time axis direction and showing the time period corresponding to the shutter period shown split.

FIG. 30 diagrammatically shows a model of pixel values of a row of pixels neighboring to one another along the moving direction of the picture corresponding to the foreground. For example, if the movement direction of the picture corresponding to the foreground is horizontal relative to the picture screen, the diagrammatic view of FIG. 30 shows a model in which pixel values of pixels neighboring to one another on one line are developed in the time axis direction.

In FIG. 30, the line in the frame #n is the same as one in the frame #n+1.

The components of the foreground corresponding to the object contained in the second to the thirteenth pixels as counted from left in the frame #n are included in the sixth to seventeenth pixels as counted from the left of the frame #n+1.

The pixels belonging to the covered background area in the frame #n are the eleventh to thirteenth pixels as counted from left, whilst the pixels belonging to the uncovered background area are the second to fourth pixels as counted from left. The pixels belonging to the covered background area in the frame #n+1 are the fifteenth to seventeenth pixels as counted from left, whilst the pixels belonging to the uncovered background area are the sixth to eighth pixels as counted from left.

In the example shown in FIG. 30, since the foreground component in the frame #n are moved by four pixels in the frame #n+1, the movement quantity v is 4. The number of times of the virtual splitting corresponds to the movement quantity and is equal to 4.

The change in the pixel values of pixels belonging to the mixed area ahead and at back of the frame being considered is explained.

Figure 31:
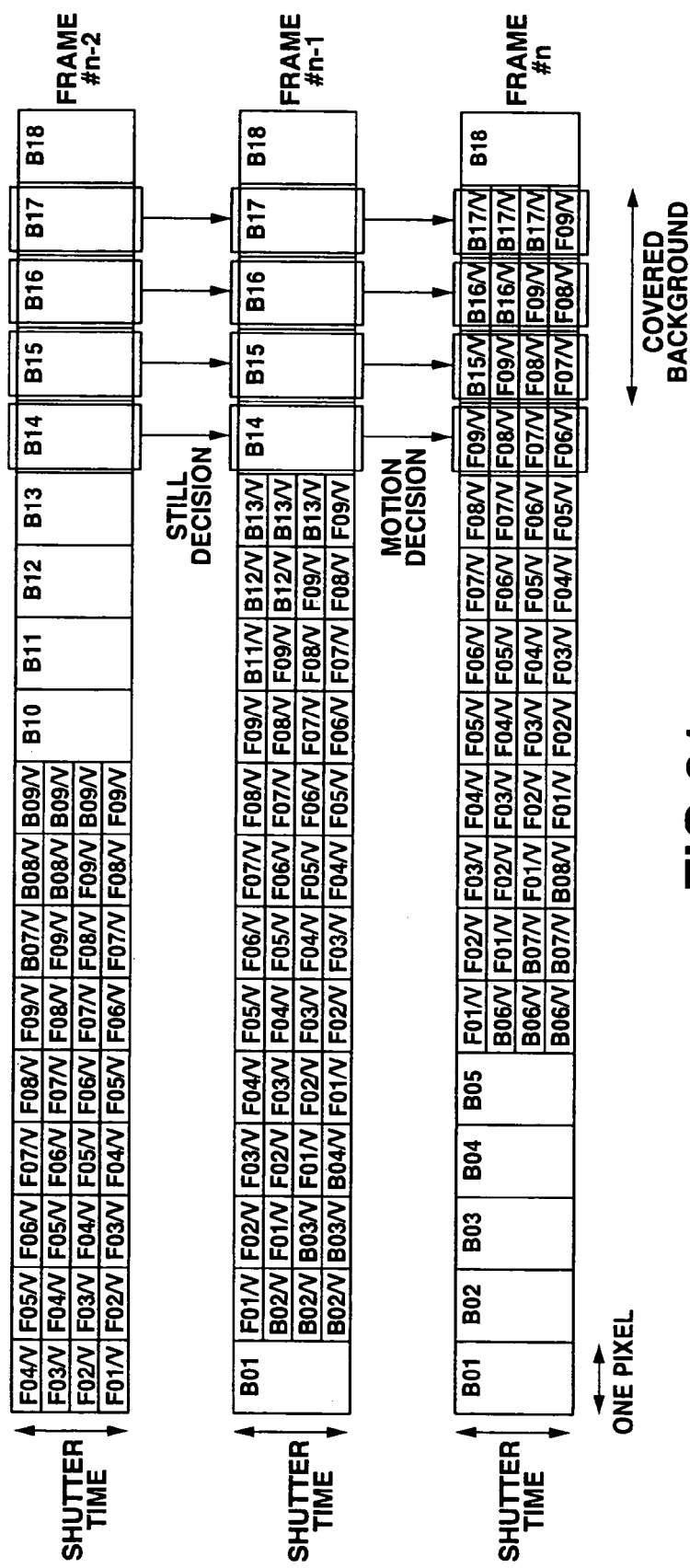
FIG. 31 is a diagrammatic view showing pixel values developed in the time axis direction and showing the time period corresponding to the shutter period shown split.
Figure 32:
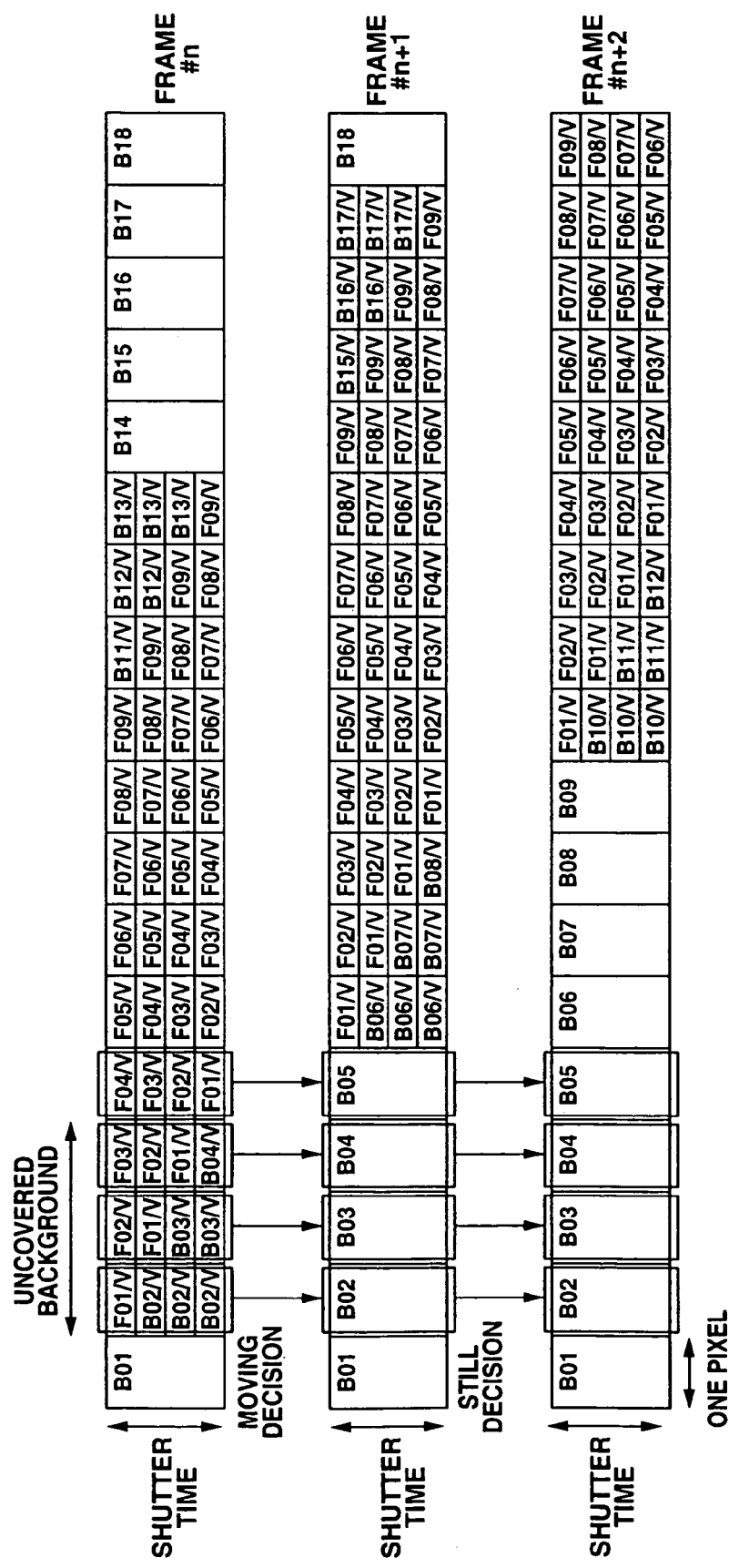
FIG. 32 is a diagrammatic view showing pixel values developed in the time axis direction and showing the time period corresponding to the shutter period shown split.

In the frame #n shown in FIG. 31, in which the background is still and the movement quantity of the foreground v is 4, pixels belonging to the covered background area are fifteenth to seventeenth pixels from left. Since the movement quantity v is 4, the fifteenth to seventeenth pixels from left in the directly previous frame #n·1 contain only the background components and belong to the background. The fifteenth to seventeenth pixels from left in the further previous frame #n·2 contain only the background components and belong to the background area.

Since the object corresponding to the background is still, the pixel value of the fifteenth pixel from the left of the frame #n·1 is not changed from the pixel value of the fifteenth pixel from the left of the frame #n·2. Similarly, the pixel value of the sixteenth pixel from the left of the frame #n·1 is not changed from the pixel value of the sixteenth pixel from the left of the frame #n·2, whilst the pixel value of the seventeenth pixel from the left of the frame #n·1 is not changed from the pixel value of the seventeenth pixel from the left of the frame #n·2.

That is, the pixels of the frame #n·1 and the frame #n·2 corresponding to the pixels belonging to the covered background area in the frame #n are comprised only of the background components and are not changed, so that the absolute value of the difference is substantially 0. So, the still/movement decision on the pixels of the frame #n·1 and frame #n·2 corresponding to the mixed area in the frame #n is made as being still by the still/moving discriminating unit 122-4.

Since the pixels belonging to the covered background area in the frame #n contain the foreground components, the corresponding pixel values differ from those in which the pixels are comprised only of background components in the frame #n·1. Therefore, the pixels belonging to the mixed area in the frame #n and the corresponding pixels of the frame #n·1 are verified to be moving pixels by the still/moving discriminating unit 122-3.

When fed with the result of still/movement decision indicating the movement from the still/moving discriminating unit 122-3 and with the result of still/movement decision indicating the still from the still/moving discriminating unit 122-4, the area decision unit 123-3 decides that the pixel in question belongs to the covered background area.

The pixels contained in the uncovered background area in the frame #n in which the background is still and the movement quantity v of the foreground is 4 are second to fourth pixels as counted from left. Since the movement quantity v is 4, the second to fourth pixels from left in the next frame #n+1 contain only the background components and belong to the background area. In the second next frame #n+2, the second to fourth pixels from left contain only the background components and belong to the background area.

Since the object corresponding to the background is still, the pixel value of the second pixel from: left of the frame #n+2 is not changed from the pixel value of the second pixel from left of the frame #n+1. Similarly, the pixel value of the second pixel from left of the frame #n+2 is not changed from the pixel value of the second pixel from left of the frame #n+1, whilst the pixel value of the third pixel from left of the frame #n+2 is not changed from the pixel value of the fourth pixel from left of the frame #n+1.

That is, the pixels of the frame #n+1 and frame #n+2 corresponding to the pixels belonging to the uncovered background area in the frame #n are composed only of background components and are not changed in the pixel values. So, the absolute value of the difference is approximately zero. Therefore, the pixels of the frame #n+1 and frame #n+2 corresponding to the pixels belonging to the mixed area in the frame #n are decided by the still/moving discriminating unit 122-1 to be still pixels.

The pixels belonging to the uncovered background area in the frame #n contain the foreground components and hence differ in pixel values from the pixels in the frame #n+1 composed only of the background components. So, the pixels belonging to the mixed area in the frame #n and those of the corresponding frame #n·1 are decided by the still/moving discriminating unit 122-2 to be moving pixels.

The area decision unit 123-1 is fed in this manner with the result indicating movement from the still/moving discriminating unit 122-2. If fed with the result indicating still from the still/moving discriminating unit 122-1, the area decision unit 123-1 decides that the corresponding pixel belongs to the uncovered background area.

FIG. 33 shows decision conditions of the area specifying unit 103 in the frame #n. When the pixel of the frame #n·2 at the same position as the position on the picture of the pixel of the frame #n being verified and the pixel of the frame #n·1 at the same position as the position on the picture of the pixel of the frame #n being verified, are decided to be still, whilst the pixel of the frame #n·1 at the same position as the position on the picture of the pixel of the frame #n being verified and the pixel of the frame #n are decided to be moving, the area specifying unit 103 decides that the pixel of the frame #n being verified belongs to the covered background area.

When the pixel of the frame #n·1 at the same position as the position on the picture of the pixel of the frame #n being verified and the pixel of the frame #n are decided to be still, whilst the pixel of the frame #n and the pixel of the frame #n+1 at the same position as the position on the picture of the pixel of the frame #n being verified are decided to be still, the area specifying unit 103 decides that the pixel of the frame #n being verified belongs to the still area.

When the pixel of the frame #n·1 at the same position as the position on the picture of the pixel of the frame #n being verified and the pixel of the frame #n are decided to be moving, whilst the pixel of the frame #n and the pixel of the frame #n+1 at the same position as the position on the picture of the pixel of the frame #n being verified are decided to be still, the area specifying unit 103 decides that the pixel of the frame #n being verified belongs to the moving area.

When the pixel of the frame #n and the pixel of the frame #n+1 at the same position as the position on the picture of the pixel of the frame #n being verified are decided to be moving and when the pixel of the frame #n+1 at the same position as the position on the picture of the pixel of the frame #n being verified and the pixel of the frame #n+1 at the same position as the position on the picture of the pixel of the frame #n being verified and the pixel of the frame #n+2 at the same position as the position on the picture of the pixel of the frame #n being verified are decided to be still, the area specifying unit 103 decides that the pixel of the frame #n being verified belongs to the uncovered background area.

FIG. 34 shows an example of the area decision by the area specifying unit 103. In FIG. 34A, a pixel decided to belong to the covered background area is shown in white. In FIG. 34B, a pixel decided to belong to the uncovered background area is shown in white.

Figure 34A:
FIGS. 34A, 34B, 34C and 34D illustrate the results of identification of areas of the area specifying unit 103.
Figure 34B:
Figure 34C:
Figure 34D:
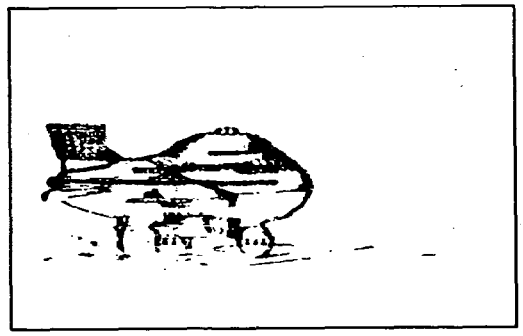

In FIG. 34C, a pixel decided to belong to the moving area is shown in white. In FIG. 34D, a pixel decided to belong to the still area is shown in white.

Figure 35:
FIG. 35 illustrates the results of identification of areas of the area specifying unit 103.

FIG. 35 shows the area information representing the mixed area, among the area information output by the decision flag storage frame memory 126, as picture. In FIG. 35, the pixel decided to belong to the covered background area or the uncovered background area, that is to the mixed area, is shown in white. The area information indicating the mixed area, output by the decision flag storage frame memory 126, indicates a textured portion surrounded by an untextured portion in the foreground area and the mixed area.

Figure 36:
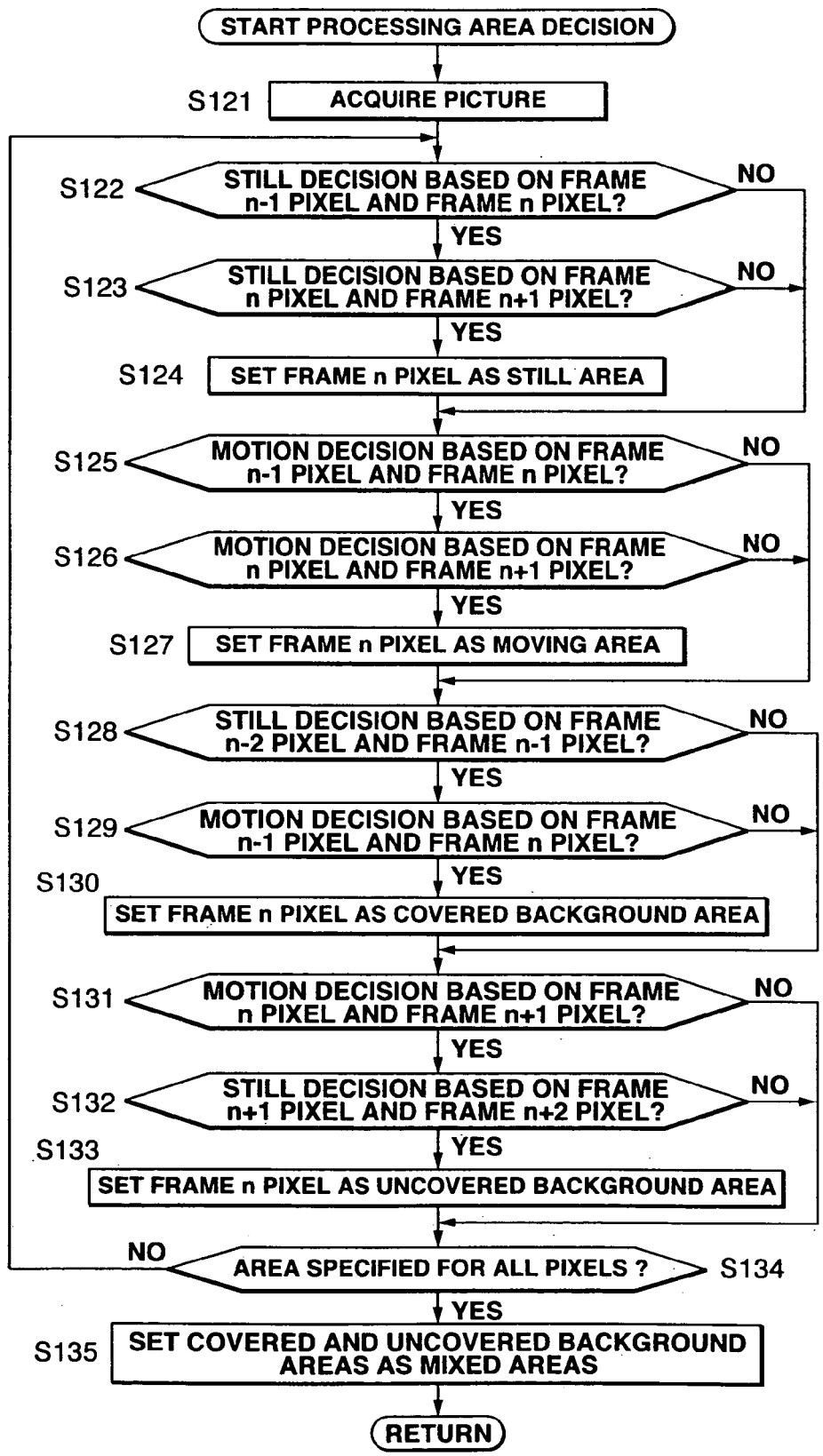
FIG. 36 is a flowchart for illustrating the processing for areal identification.

Referring to the flowchart of FIG. 36, the processing for area identification by the area specifying unit 103 is explained. At step S121, the frame memory 121 acquires pictures of the frame #n-2 to frame #n+2, inclusive the frame #n.

At step S122, the still/moving discriminating unit 122-3 checks whether or not the pixels at the same position of the frame #n-1 and the frame #n are still. If the pixels are decided to be still, the program moves to step S123 where the still/moving discriminating unit 122-2 checks whether or not the pixels at the same position of the frame #n and the frame #n+1 are still.

If, at step S123, the pixels at the same position of the frame #n and the pixel of the frame #n+1 are decided to be still, the program moves to step S124 where the area decision unit 123-2 sets "1" in the still area decision flag corresponding to the pixel of the area being verified for indicating that the pixel belongs to the still area. The area decision unit 123-2 sends the still area decision flag to the decision flag storage memory 124. The program then moves to step S125.

If at step S122 the pixels at the same position of the frame #n-1 and the frame #n are decided to be moving or if at step S123 the pixels at the same position of the frame #n and the frame #n+1. are decided to be moving, the pixel of the frame #n does not belong to the still area, so the processing at step S124 is skipped and the program moves to step S125.

At step S125, the still/moving discriminating unit 122-3 checks whether or not the pixels at the same position of the frame #n-1 and the frame #n are moving. If the pixels are decided to be moving, the program moves to step S126 where the still/moving discriminating unit 122-2 decides whether or not the pixels at the same position of the frame #n and the frame #n+1 are moving.

If, at step S126, the pixels at the same position of the frame #n and the pixel of the frame #n+1 are decided to be moving, the program moves to step S127 where the area decision unit 123-2 sets "1" in the moving area decision flag corresponding to the pixel of the area being verified for indicating that the pixel belongs to the moving area. The area decision unit 123-2 sends the moving area decision flag to the decision flag storage memory 124. The program then moves to step S128.

If at step S125 the pixels at the same position of the frame #n-1 and the frame #n are decided to be still or if at step S126 the pixels at the same position of the frame #n and the frame #n+1 are decided to be still, the pixel of the frame #n does not belong to the moving area, so the processing at step S127 is skipped and the program moves to step S128.

At step S128, the still/moving discriminating unit 122-4 checks whether or not the pixels at the same position of the frame #n-2 and the frame #n-1 are still. If the pixels are decided to be still, the program moves to step S129 where the still/moving discriminating unit 122-3 decides whether or not the pixels at the same position of the frame #n-1 and the frame #n are moving.

If, at step S129, the pixels at the same position of the frame #n-1 and the pixel of the frame #n are decided to be moving, the program moves to step S130 where the area decision unit 123-3 sets "1" in the covered background area decision flag corresponding to the pixel of the area being verified for indicating that the pixel belongs to the covered background area. The area decision unit 123-3 sends the covered background area decision flag to the decision flag storage memory 124. The program then moves to step S131.

If at step S128 the pixels at the same position of the frame #n-2 and the frame #n-2 are decided to be moving or if at step S129 the pixels at the same position of the frame #n-1 and the frame #n are decided to be still, the pixel of the frame #n does not belong to the covered background area, so the processing at step S130 is skipped and the program moves to step S131.

At step S131, the still/moving discriminating unit 122-2 checks whether or not the pixels at the same position of the frame #n and the frame #n+1 are still. If the pixels are decided to be moving, the program moves to step S132 where the still/moving discriminating unit 122-1 decides whether or not the pixels at the same position of the frame #n+1 and the frame #n+2 are moving.

If, at step S132, the pixels at the same position of the frame #n+1 and the pixel of the frame #n+2 are decided to be still, the program moves to step S133 where the area decision unit 123-1 sets "1" in the uncovered background area decision flag corresponding to the pixel of the area being verified for indicating that the pixel belongs to the uncovered background area. The area decision unit 123-1 sends the uncovered background area decision flag to the decision flag storage memory 124. The program then moves to step S134.

If at step S131 the pixels at the same position of the frame #n and the frame #n+1 are decided to be still or if at step S132 the pixels at the same position of the frame #n+1 and the frame #n+2 are decided to be moving, the pixel of the frame #n does not belong to the uncovered background area, so the processing at step S133 is skipped and the program moves to step S134.

At step S134, the area specifying unit 103 checks whether or not the area has been specified for the totality of the pixels of the frame #n. If it is decided that the area has not been specified for the totality of the pixels of the frame #n, the program reverts to step S122 to repeat the area specifying processing for the remaining pixels.

If it is decided at step S134 that the area has been specified for the totality of the pixels of the frame #n, the program moves to step S135 where the synthesis unit 125 generates the area information indicating the mixed area based on the uncovered background area decision flag and the covered background area decision flag, stored in the decision flag storage memory 124, while also generating the area information indicating to which of the uncovered background area, still area, moving area and the uncovered background area belongs each pixel. The synthesis unit 125 sets the generated area information in the decision flag storage frame memory 126 to finish the processing.

In this manner, the area specifying unit 103 is able to generate the area information, for each of pixels comprehended in a frame, indicating that the pixel in question belongs to the movement area, still area, covered background area or to the uncovered background area.

It is also possible for the area specifying unit 103 to apply logical sum to area information corresponding to the uncovered background area and the covered background area to generate the area information comprising a flag indicating that a given pixel contained in the frame belongs to the movement area, still area or to the mixed area, for each pixel contained in the frame.

If the object associated with the foreground includes a texture, the area specifying unit 103 is able to specify the movement area more accurately.

The area specifying unit 103 is able to output the area information indicating the movement area as the area information indicating the foreground area, or the area information indicating the still area as the area information indicating the background area.

In the foregoing, it is assumed that the object corresponding to the background is still. However, the above-described area specifying processing can be applied even if the picture associated with the background area contains motion. For example, if the picture corresponding to the background area is moving uniformly, the area specifying unit 103 shifts the entire picture in association with the movement to perform the processing in the same way as when the object corresponding to the background is still. If the picture associated with the background area contains different movements from one location to another, the area specifying unit 103 selects the pixels corresponding to the movement to perform the above processing.

Figure 37:
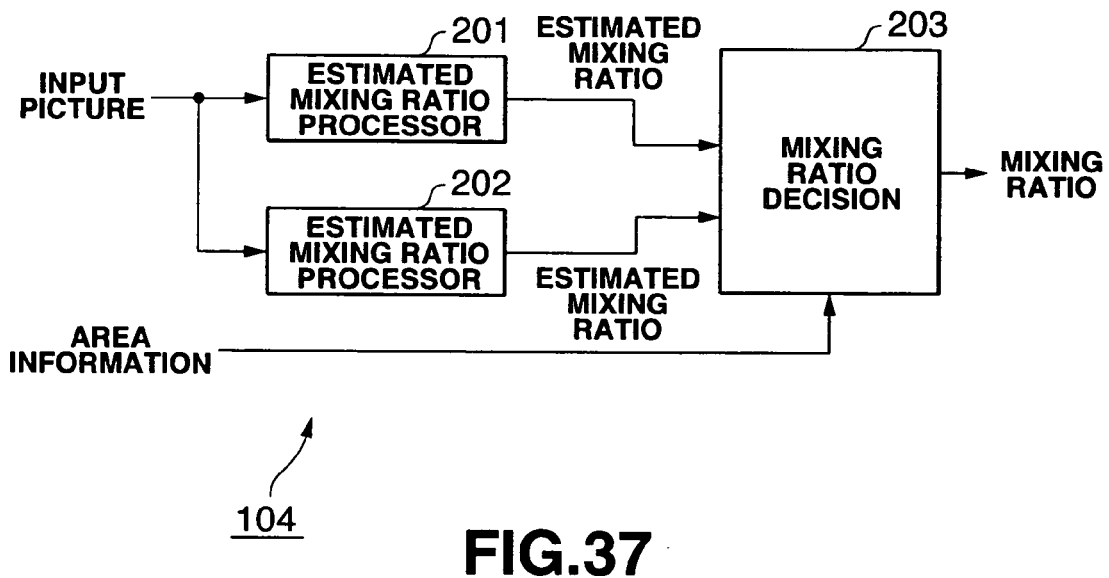
FIG. 37 is a block diagram showing an illustrative structure of a mixing ratio calculating unit 104.

FIG. 37 shows a block diagram showing an illustrative structure of the mixing ratio calculating unit 104. The estimated mixing ratio processor 201 calculates the estimated mixing ratio, from one pixel to another, by calculations corresponding to the model of the covered background area, based on the input picture, to route the calculated estimated mixing ratio to a mixing ratio decision unit 203.

An estimated mixing ratio processing unit 202 calculates the estimated mixing ratio, from pixel to pixel, by calculations corresponding to the model of the uncovered background area, based on the input picture, to route the calculated mixing ratio to the mixing ratio decision unit 203.

Since the object corresponding to the foreground may be assumed to be moving at an equal speed within the shutter time, the mixing ratio α of a pixel belonging to the mixed area has the following properties: That is, the mixing ratio α is changed linearly relative to changes in the pixel positions. If the changes of the pixel positions are one-dimensional, the changes in the mixing ratio α can be represented as a plane.

Since the one-frame period is short, it may be assumed that the object corresponding to the foreground is a rigid member and is moving at an equal speed.

Meanwhile, the tilt of the mixing ratio α is inversely proportionate to the movement quantity v of the foreground within the shutter time.

Figure 38:
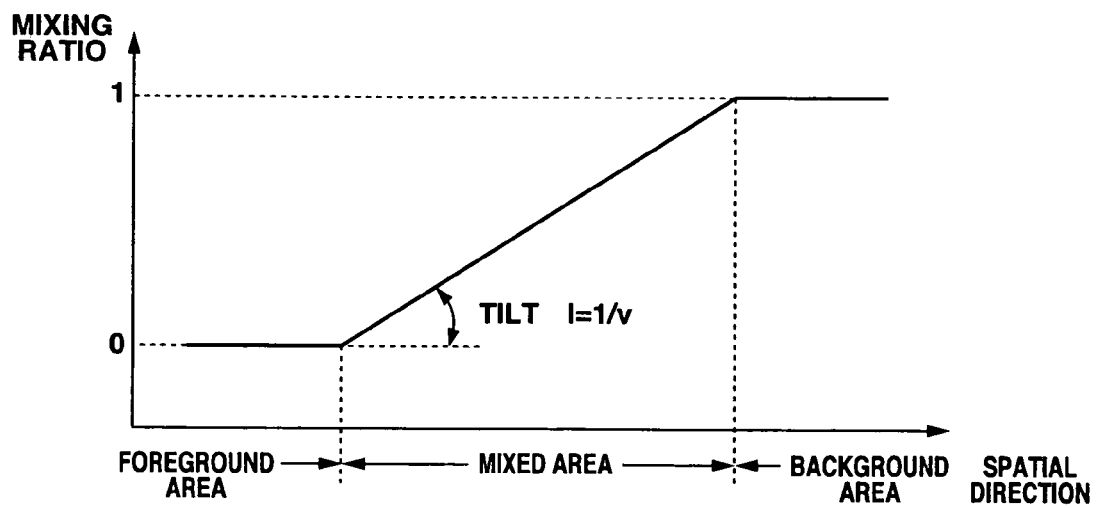
FIG. 38 shows a typical ideal mixing ratio $\alpha$.

FIG. 38 shows an example of an ideal mixing ratio α. The tilt 1 in the mixing area with an ideal mixing ratio α can be represented as a reciprocal of the movement quantity v.

Figure 39:
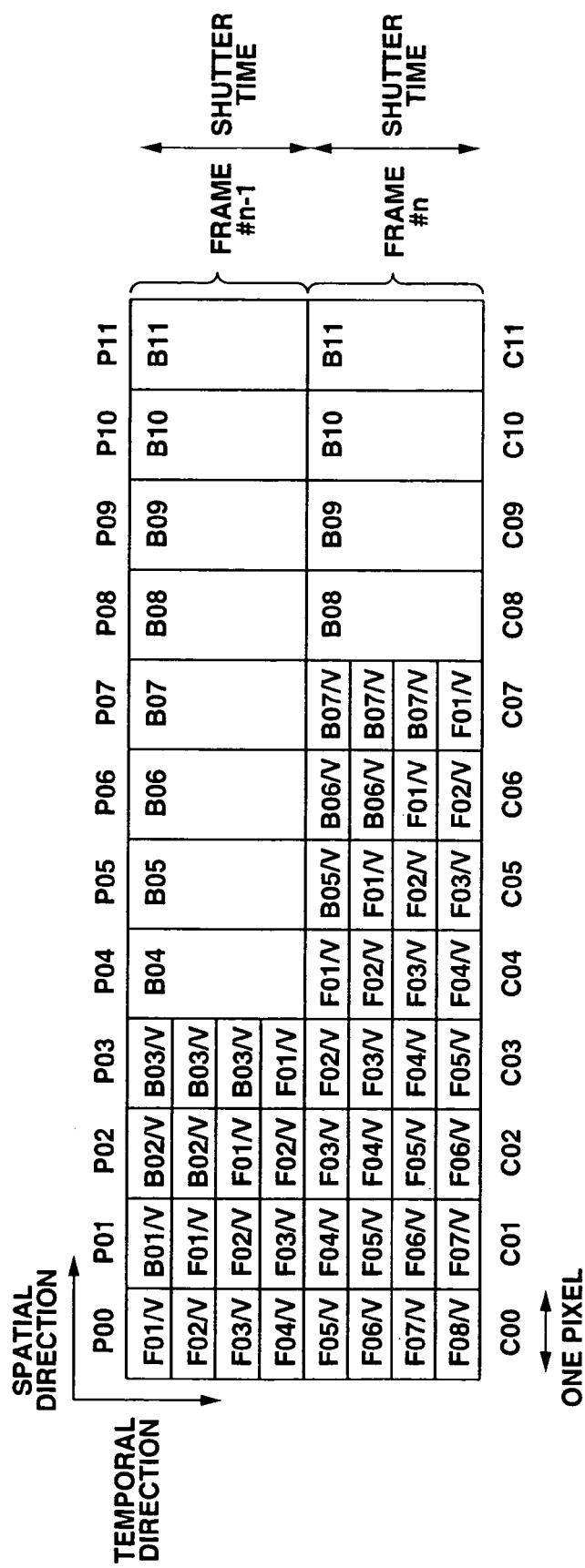
FIG. 39 is a diagrammatic view showing pixel values developed in the time axis direction and showing the time period corresponding to the shutter period shown split.

In the embodiment of FIG. 39, the pixel value C06 of the seventh pixel from left of the frame #n can be represented, using the pixel value P06 of the seventh pixel from left of the frame #n·1, by the equation (14):

$$C06 = B06/v + B06/v + F01/v + F02/v \qquad (14)$$
$$= P06/v + P06/v + F01/v + F02/v$$
$$= 2/v \cdot P06 + \sum_{i=1}^{2} F_i/v$$

In the equation (14), the pixel value C06 is expressed as a pixel value M of the pixel of the mixed area, whilst the pixel value P06 is expressed as a pixel value B of the pixel of the background area. That is, the pixel value M of the mixed area and the pixel value B of the background may be represented by the equations (15) and (16), respectively:

$$M = C06 \qquad (15)$$

$$C = \alpha \cdot P + f \qquad (16).$$

In the equation (14), 2/v corresponds to the mixing ratio α. Since the movement quantity v is 4, the mixing ratio α of the seventh pixel from left of the frame #n is 0.5.

By assuming that the pixel value C of the frame #n under consideration and the pixel value P of the frame #n·1 directly previous to the frame #n as being the pixel value of the mixed area and the pixel value of the background, respectively, the equation (13) indicating the mixing ratio α can be rewritten to the following equation (17):

$$C = \alpha \cdot P + f \qquad (17)$$

where f denotes the sum Σ$_i$F$_i$/v of the foreground components contained in the considered pixel. There are two variables in the equation (17), namely the mixing ratio α and the sum f of the foreground components.

Figure 40:
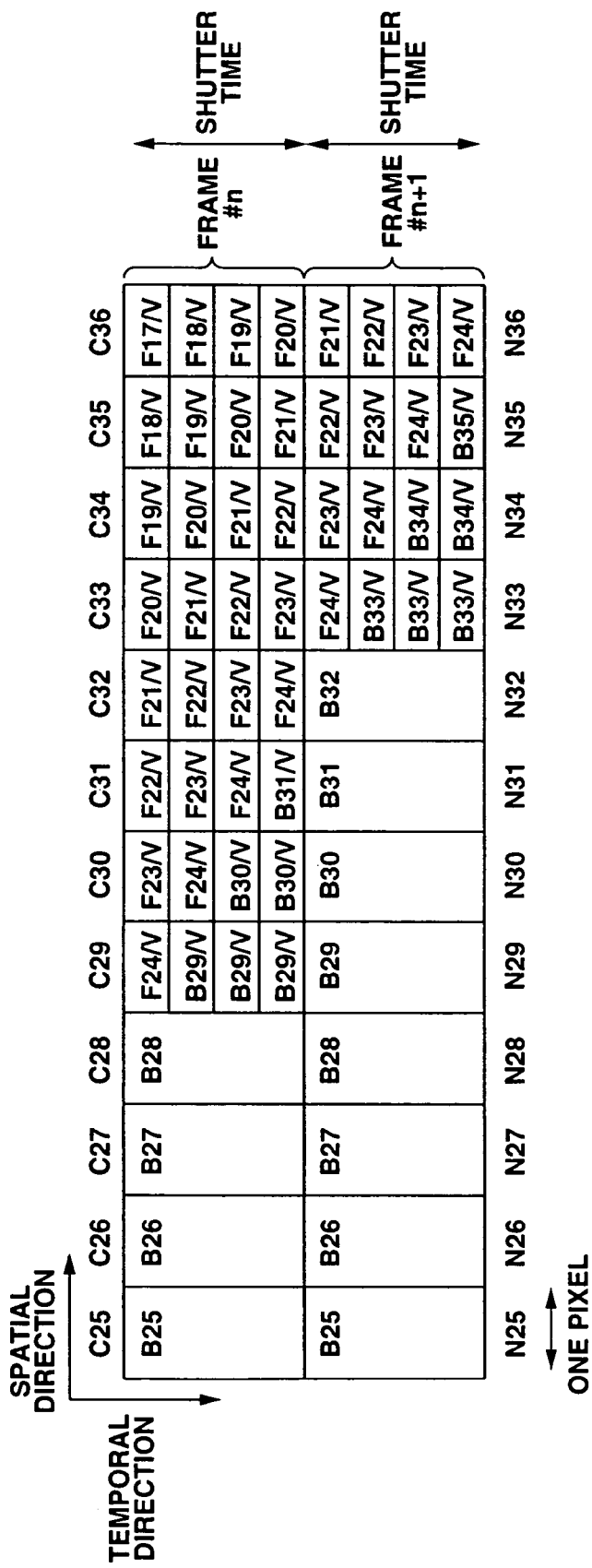
FIG. 40 is a diagrammatic view showing pixel values developed in the time axis direction and showing the time period corresponding to the shutter period shown split.

FIG. 40 shows a model in which the movement quantity v in the uncovered background area is 4 and the number of times of the virtual splitting along the time axis is 4, with the pixels being shown developed along the time axis direction.

By assuming, in the uncovered background area, that the pixel value C of the frame #n under consideration and the pixel value P of the frame #n+1 next to the frame #n as being the pixel value of the mixed area and the pixel value of the background, respectively, as in the covered background area, discussed above, the equation (13) indicating the mixing ratio α can be represented as in the following equation (18):

$$C = \alpha \cdot N + f \qquad (18).$$

Although the background object is assumed to be still in the foregoing description, the equations (14) to (18) may be applied by exploiting the pixel values of the pixels associated with the background movement quantity v even if the background object is moving. For example, if, when the movement quantity v of the object corresponding to the background is 2 and the number of times of the virtual splitting is 2, the object corresponding to the background is moving towards right in the drawing, the pixel value B of the pixel of the background area in the equation (16) is the pixel value P04.

Since the equation (17) and (18) each contain two variables, the mixing area α cannot be found directly. It should be noted that, since the picture in general exhibits strong spatial correlation, the pixels proximate to each other are of approximately the same pixel values.

Since the foreground components exhibits strong spatial correlation, the equation is modified so that the mixing area α by the sum of the foreground components will be derived from the previous frame or the subsequent frames.

Figure 41:
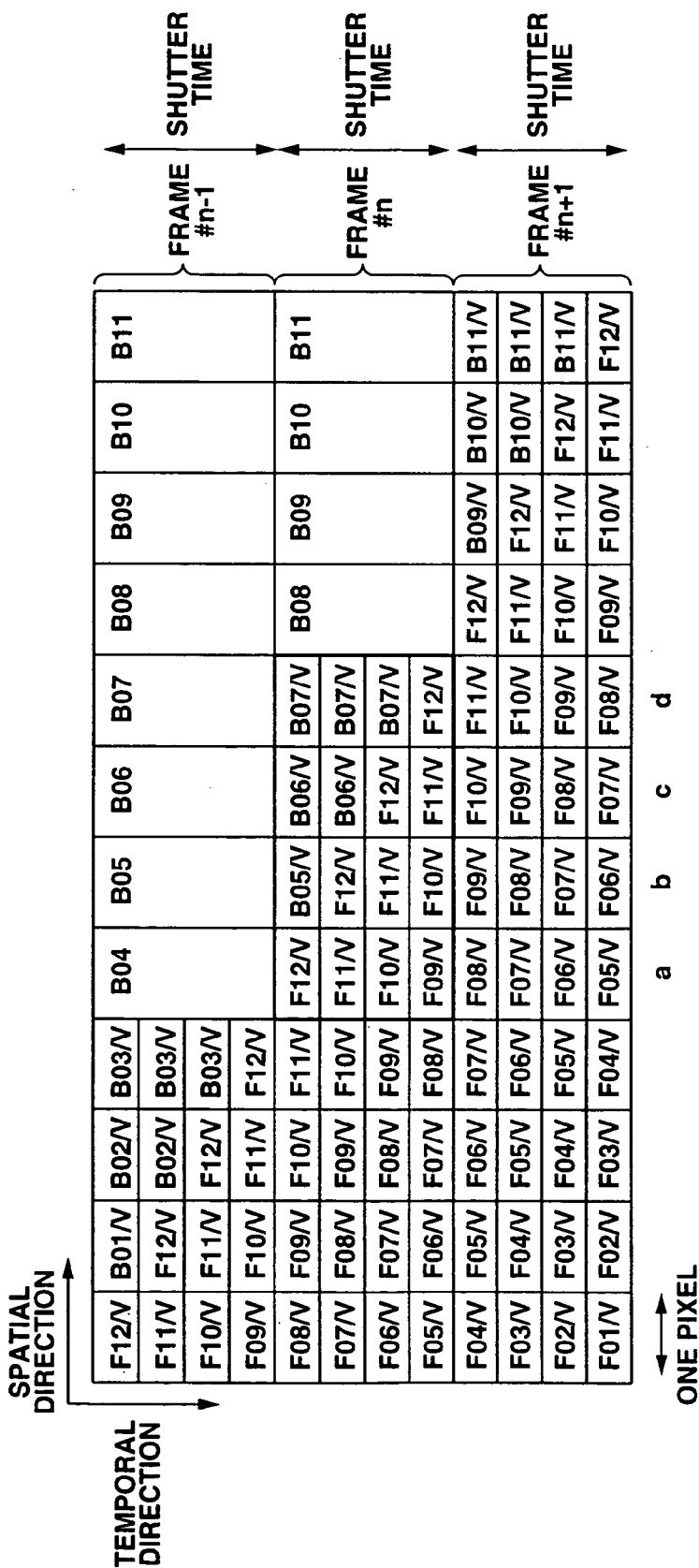
FIG. 41 illustrates the approximation exploiting the correlation of the foreground components.

The pixel value Mc of the seventh pixel from left of the frame #n of FIG. 41 can be represented by the following equation (19):

$$M_c = \frac{2}{v} \cdot B06 + \sum_{i=11}^{12} Fi/v \tag{19}$$

where 2/v of the first term of the right side corresponds to the mixing ratio α. By exploiting the pixel value of the subsequent frame #n+1, the second term of the right side of the equation (19) may be represented by the equation (20):

$$\sum_{i=11}^{12} Fi/v = \beta \cdot \sum_{i=7}^{110} Fi/v. \tag{20}$$

It is here assumed, by exploiting the spatial correlation of the foreground components, the following equation (21) holds:

$$F=F05=F06=F07=F08=F09=F10=F11=F12 \tag{21}$$

which may be used to rewrite the equation (20) to $$\sum_{i=11}^{12} Fi/v = \frac{2}{v} \cdot F$$

$$= \beta \cdot \frac{4}{v} \cdot F. \tag{22}$$

As a result, β can be represented by the following equation (23)

$$\beta = 2 2/4 \tag{23}.$$

In general, if it is assumed that the foreground components relevant to the mixed area are equal, as shown by the equation (21), the following equation (24):

$$\beta = 1 \cdot \alpha \tag{24}$$

holds, by the ratio of the internal division, for the totality of pixels of the mixed area.

If the equation (24) holds, the equation (17) can be expanded as in the equation (25):

$$C = \alpha \cdot P + f \tag{25}$$

$$= \alpha \cdot P + (1-\alpha) \cdot \sum_{i=\gamma}^{\gamma+V-1} Fi/v$$

$$= \alpha \cdot P + (1-\alpha) \cdot N.$$

Similarly, if the equation (24) holds, the equation (18) can be expanded as in the equation (26):

$$C = \alpha \cdot N + f \tag{26}$$

$$= \alpha \cdot N + (1-\alpha) \cdot \sum_{i=\gamma}^{\gamma+V-1} Fi/v$$

$$= \alpha \cdot N + (1-\alpha) \cdot P.$$

Figure 42:
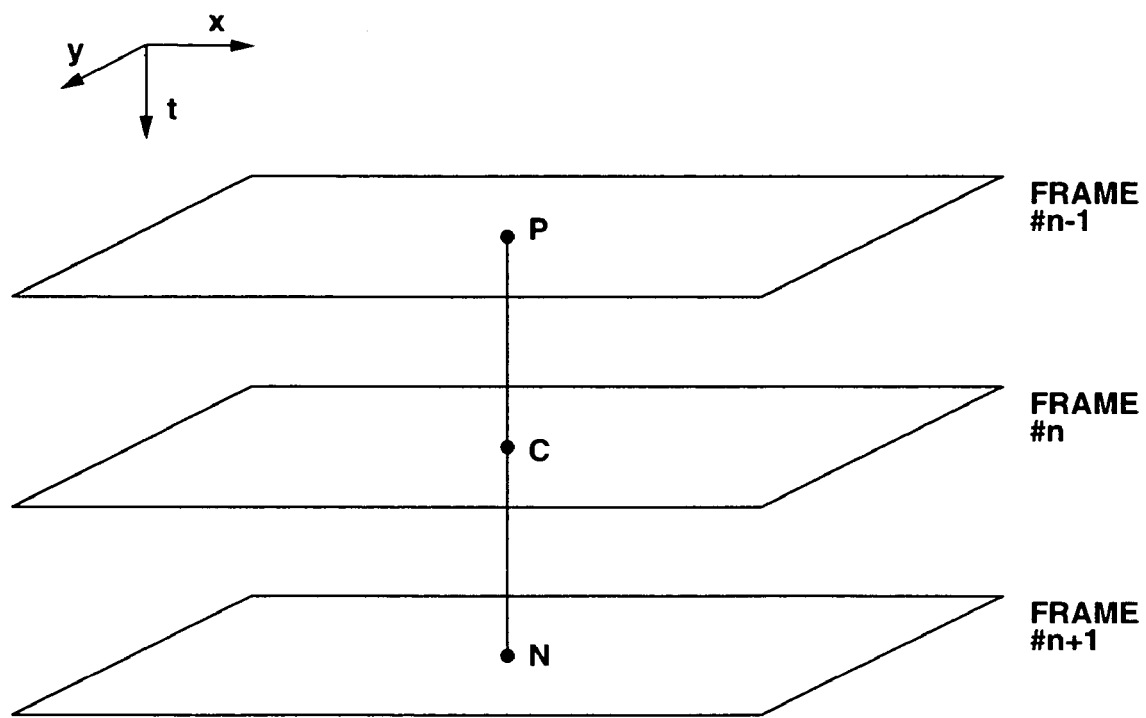
FIG. 42 illustrates the relation between C, N and P.

In the equations (25) and (26), since C, N and P are known pixel values, the there is only one variable contained in the equations (25) and (26), that is the mixing ratio α. The relation among C, N and P in the equations (25) and (26) is shown in FIG. 42. It is noted that C, N and P are a pixel value of a pixel of the frame #n under consideration, a pixel value of a pixel of the frame #n+1, the position of which in the spatial direction is in register with that of the considered pixel, and a pixel value of the pixel of the frame #n+1, the position of which in the spatial direction is in register with that of the considered pixel, respectively.

Thus, each one variable is contained in each of the equations (25) and (26), so the mixing ratio α can be calculated by exploiting the pixel values of the pixels of the three frames. The condition for the correct mixing ratio α to be calculated by solving the equations (25) and (26) is that the foreground components relevant to the mixed area are equal, that is that the pixel values of a number of the consecutive pixels twice the movement quantity x, which pixels are in the picture object of the foreground imaged in a standstill state, and which are positioned at a boundary of the picture object in association with the moving direction of the foreground are constant.

The mixing ratio α of the pixels belonging to the covered background area is calculated by the equation (27), whilst the mixing ratio α of the pixel belonging to the uncovered background area is calculated by the following equations (27) and (28):

$$\alpha=(C\cdot N)/(P\cdot N) \tag{27}$$

$$\alpha=(C\cdot P)/(N\cdot P) \tag{28}.$$

Figure 43:
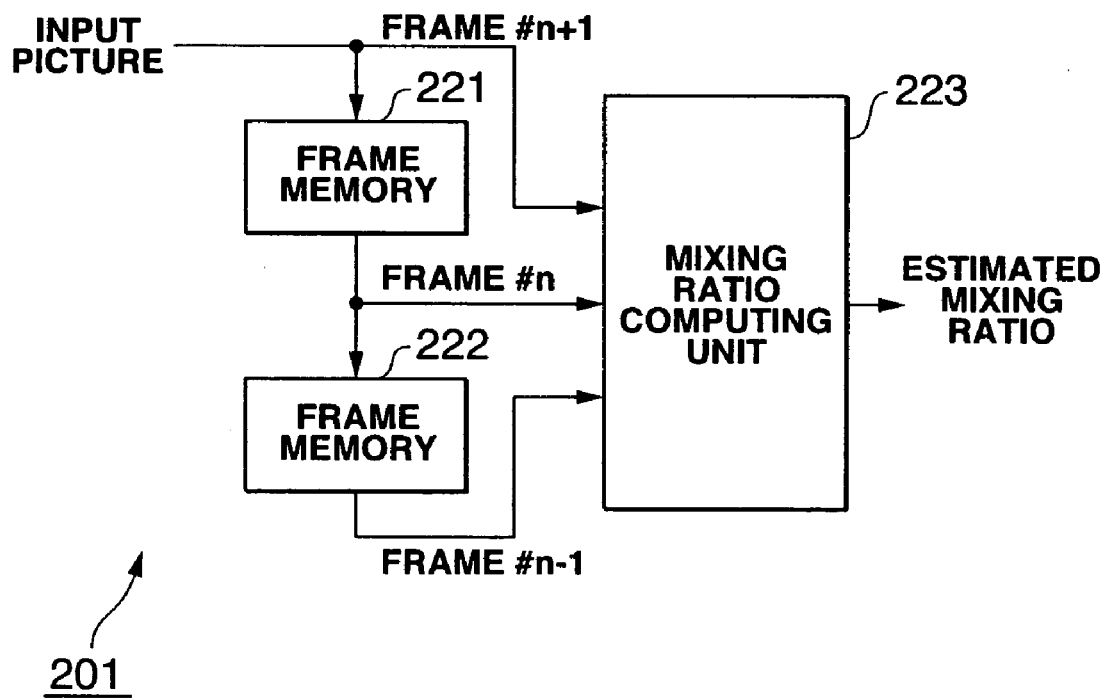
FIG. 43 is a block diagram showing the structure of an estimated mixing ratio processor 201.

In FIG. 43, which is a block diagram showing the structure of the estimated mixing ratio processor 201, a frame memory 221 stores the input pictures on the frame basis, and feeds a frame, next to the frame being input as an input picture, to a frame memory 222 and to a mixing ratio calculating unit 223.

The frame memory 222 stores the input pictures on the frame basis and routes a frame next following the frame being supplied from the frame memory 221 to the mixing ratio calculating unit 223.

So, if the frame #n+1 is being input as an input picture to the mixing ratio calculating unit 223, the frame memory 221 routes the frame #n to the mixing ratio calculating unit 223, whilst the frame memory 222 routes the frame #n·1 to the mixing ratio calculating unit 223.

The mixing ratio calculating unit 223 calculates an estimated mixing ratio of the considered pixel, by calculations of the equation (27) on the pixel value C of the pixel of the frame #n under consideration, the pixel value of the pixel of the frame #n+1, the spatial position of which is in registration with that of the considered pixel, and the pixel value of the pixel of the frame #n·1, the spatial position of which is in registration with that of the considered pixel, and outputs the so-calculated estimated mixing ratio. For example, if the background is at a standstill, the mixing ratio calculating unit 223 calculates the estimated mixing ratio of the considered pixel, from the pixel value C of the pixel of the frame #n under consideration, the pixel value N of the pixel of the frame #n+1, the position of which in the frame is the same as that of the considered pixel, and the pixel value P of the pixel of the frame #n-1, the position of which in the frame is the same as that of the considered pixel, and outputs the so-calculated estimated mixing ratio.

In this manner, the estimated mixing ratio processor 201 calculates the estimated mixing ratio, based on the input picture, to route the so-calculated estimated mixing ratio to the mixing ratio decision unit 203.

The estimated mixing ratio processor 202 is similar to the estimated mixing ratio processor 201 except that the estimated mixing ratio processor 201 calculates the estimated mixing ratio of the considered pixel in accordance with the equation (27), whilst the estimated mixing ratio processor 202 calculates the estimated mixing ratio of the considered pixel in accordance with the equation (28), and hence the corresponding description is omitted for clarity.

Figure 44:
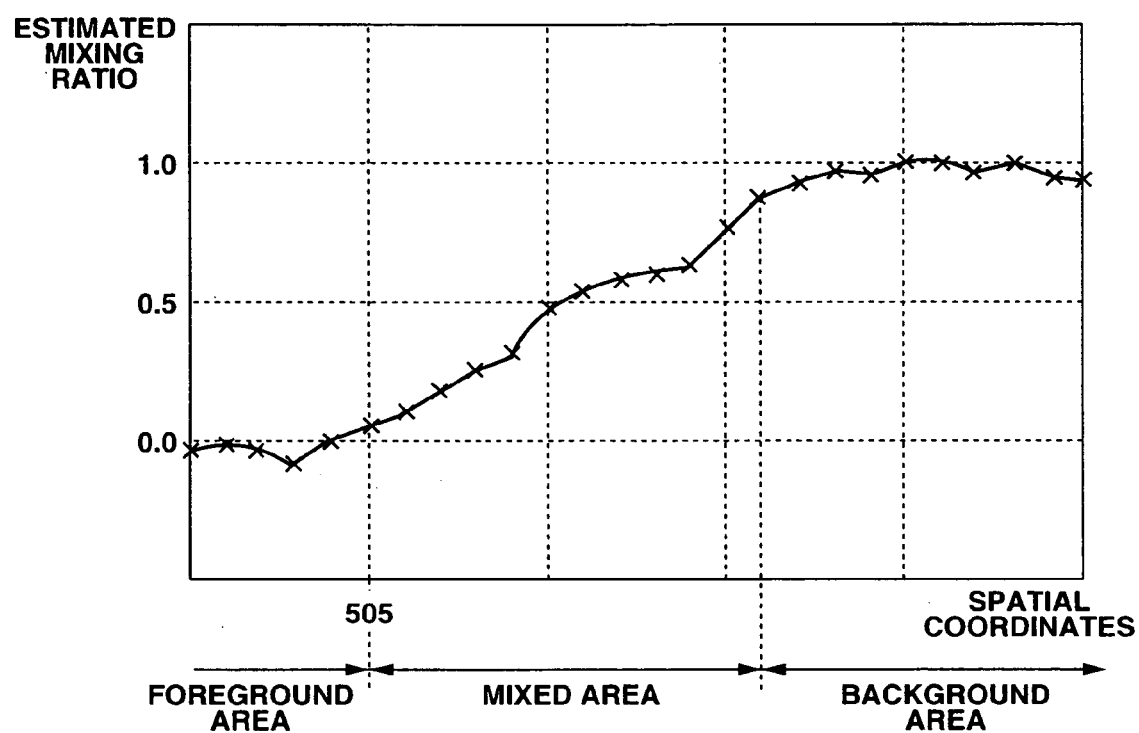
FIG. 44 shows a typical estimated mixing ratio.

FIG. 44 shows an example of the estimated mixing ratio calculated by the estimated mixing ratio processor 201. FIG. 44 shows the estimated mixing ratio for the movement quantity v of the foreground corresponding to an object moving at a constant speed equal to 11 for one line.

It is seen that the estimated mixing ratio is changing in the mixed area substantially linearly as shown in FIG. 38.

Reverting to FIG. 37, the mixing ratio decision unit 203 sets the mixing ratio α based on the area information from the area specifying unit 103 indicating to which of the foreground area, background area, covered background area and the uncovered background area belongs the pixel supplied from the area specifying unit 103 as basis for calculation of the mixing ratio α. The mixing ratio decision unit 203 sets 0 or 1 as the mixing ratio if the pixel as a basis for calculation belongs to the foreground area or to the background area, respectively. On the other hand, the mixing ratio decision unit 203 sets the estimated mixing ratio supplied from the estimated mixing ratio processor 201 as the mixing ratio α if the pixel as a basis for calculation belongs to the covered background area, while setting the estimated mixing ratio supplied from the estimated mixing ratio processor 202 as the mixing ratio α if the pixel as a basis for calculation belongs to the uncovered background area. The e203 outputs the mixing ratio α as set based on the area information.

Figure 45:
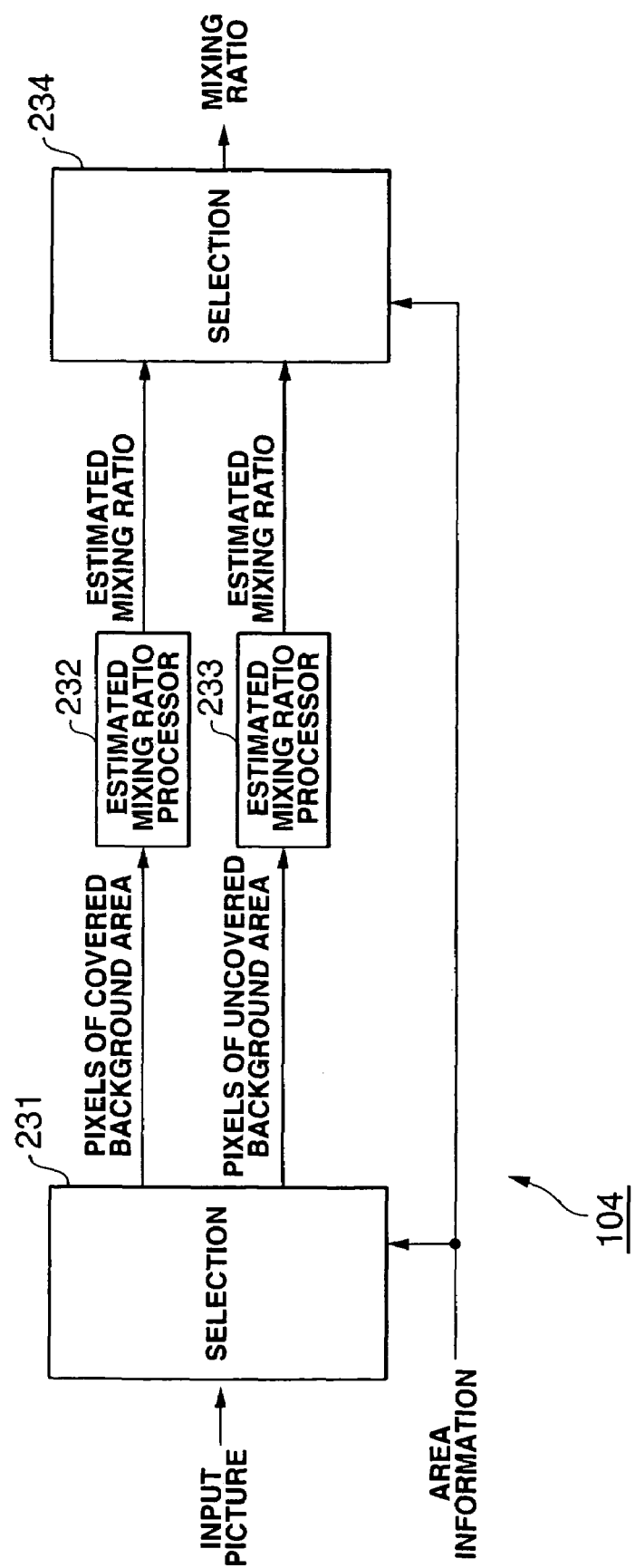
FIG. 45 is a block diagram showing a modified structure of the mixing ratio calculating unit 104.

In FIG. 45, which is a block diagram showing an alternative structure of the mixing ratio calculating unit 104, a selection unit 231 routes the pixel belonging to the covered background area and pixels of the associated previous and subsequent frames to an estimated mixing ratio processor 232, based on the area information supplied from the area specifying unit 103. The selection unit 231 routes the pixels belonging to the uncovered background area and pixels of the associated previous and subsequent frames to an estimated mixing ratio processor 233, based on the area information supplied from the area specifying unit 103.

The estimated mixing ratio processor 232 calculates the estimated mixing ratio of the considered pixel belonging to the covered background area, by calculations in accordance with the equation (27), based on the pixel values input from the selection unit 231, to route the so-calculated estimated mixing ratio to a selection unit 234.

The estimated mixing ratio processor 233 calculates the estimated mixing ratio of the considered pixel belonging to the uncovered background area, by calculations in accordance with the equation (28), based on the pixel values input from the selection unit 231, to route the so-calculated estimated mixing ratio to a selection unit 234.

The selection unit 234 sets the mixing ratio α based on the area information from the area specifying unit 103 indicating to which of the foreground area, background area, covered background area and the uncovered background area belongs the pixel supplied from the area specifying unit 103 as basis for calculation of the mixing ratio α. The mixing ratio decision unit 203 sets 0 or 1 as the mixing ratio if the pixel as a basis for calculation belongs to the foreground area or to the background area, respectively. On the other hand, the selection unit 234 sets the estimated mixing ratio supplied from the estimated mixing ratio processor 232 as the mixing ratio α if the pixel as a basis for calculation belongs to the covered background area, while setting the estimated mixing ratio supplied from the estimated mixing ratio processor 233 as the mixing ratio α if the pixel as a basis for calculation belongs to the uncovered background area. The selection unit 234 outputs the mixing ratio α selected and set based on the area information.

The mixing ratio calculating unit 104, having a modified structure shown in FIG. 45, calculates the mixing ratio α, from one pixel of the picture to another, to output the calculated mixing ratio α.

Figure 46:
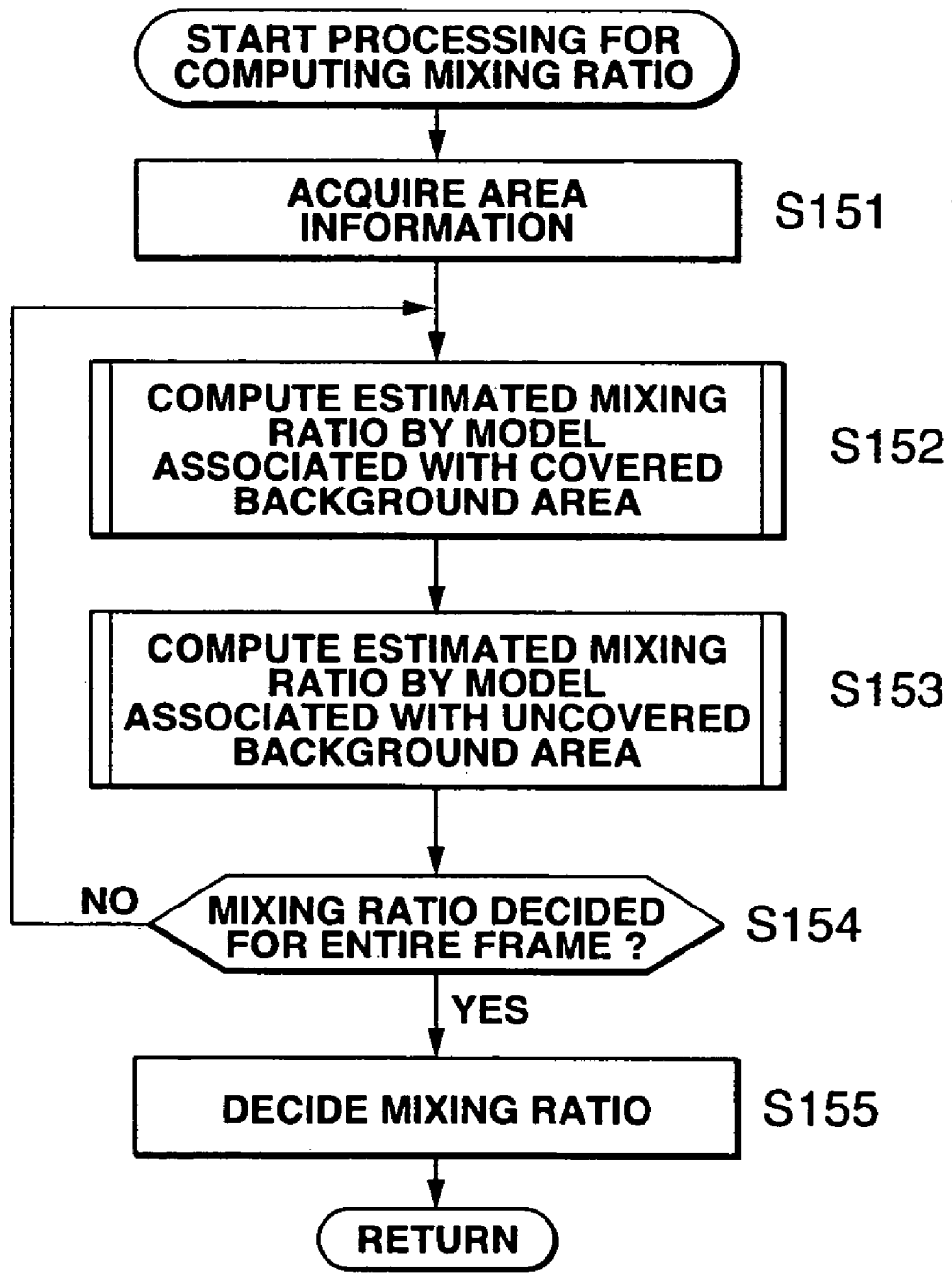
FIG. 46 is a flowchart for illustrating the processing for calculating the estimated mixing ratio.

Referring to the flowchart of FIG. 46, the processing for calculating the mixing ratio α of the mixing ratio calculating unit 104, the configuration of which is shown in FIG. 37, is explained. At step S151, the mixing ratio calculating unit 104 acquires the area information supplied from the area specifying unit 103. At step S151, the mixing ratio calculating unit 104 acquires the area information supplied from the area specifying unit 103. At step S152, the estimated mixing ratio processor 201 calculates the estimated mixing ratio by a model corresponding to the covered background area to route the so-calculated estimated mixing ratio to the mixing ratio decision unit 203. The processing for calculating the estimated mixing ratio will be explained subsequently in detail by referring to flowchart of FIG. 47.

At step S153, the estimated mixing ratio processor 202 calculates the estimated mixing ratio by a model corresponding to the covered background area to route the so-calculated estimated mixing ratio to the mixing ratio decision unit 203.

At step S154, the mixing ratio calculating unit 104 checks whether or not the mixing ratio α has been estimated for the entire frame. If it is found that the mixing ratio α has not been estimated for the entire frame, the program reverts to step S152 to execute the processing of estimating the mixing ratio α for the next pixel.

If it is decided at step S154 that the mixing ratio α has been estimated for the entire frame, the program reverts to step S155 where the mixing ratio decision unit 203 sets the mixing ratio α based on the area information supplied from the area specifying unit 103 and which indicates to which of the foreground area, background area, covered background area or the uncovered background area belongs the pixel. The mixing ratio decision unit 203 sets 0 or 1 as the mixing ratio if the pixel as a basis for calculation belongs to the foreground area or to the background area, respectively. On the other hand, the mixing ratio decision unit 203 sets the estimated mixing ratio supplied from the estimated mixing ratio processor 201 as the mixing ratio α if the pixel as a basis for calculation belongs to the covered background area, while setting the estimated mixing ratio supplied from the estimated mixing ratio processor 202 as the mixing ratio α if the pixel as a basis for calculation belongs to the uncovered background area. The processing then is finished.

In this manner, the mixing ratio calculating unit 104 is able to calculate the mixing ratio α, as a characteristic value for each pixel, based on the area information supplied from the area specifying unit 103 and on the input picture.

The processing for calculating the mixing ratio α by the mixing ratio calculating unit 104 shown in FIG. 45 is similar to that explained by referring to the flowchart of FIG. 46 and hence is not explained specifically.

Figure 47:
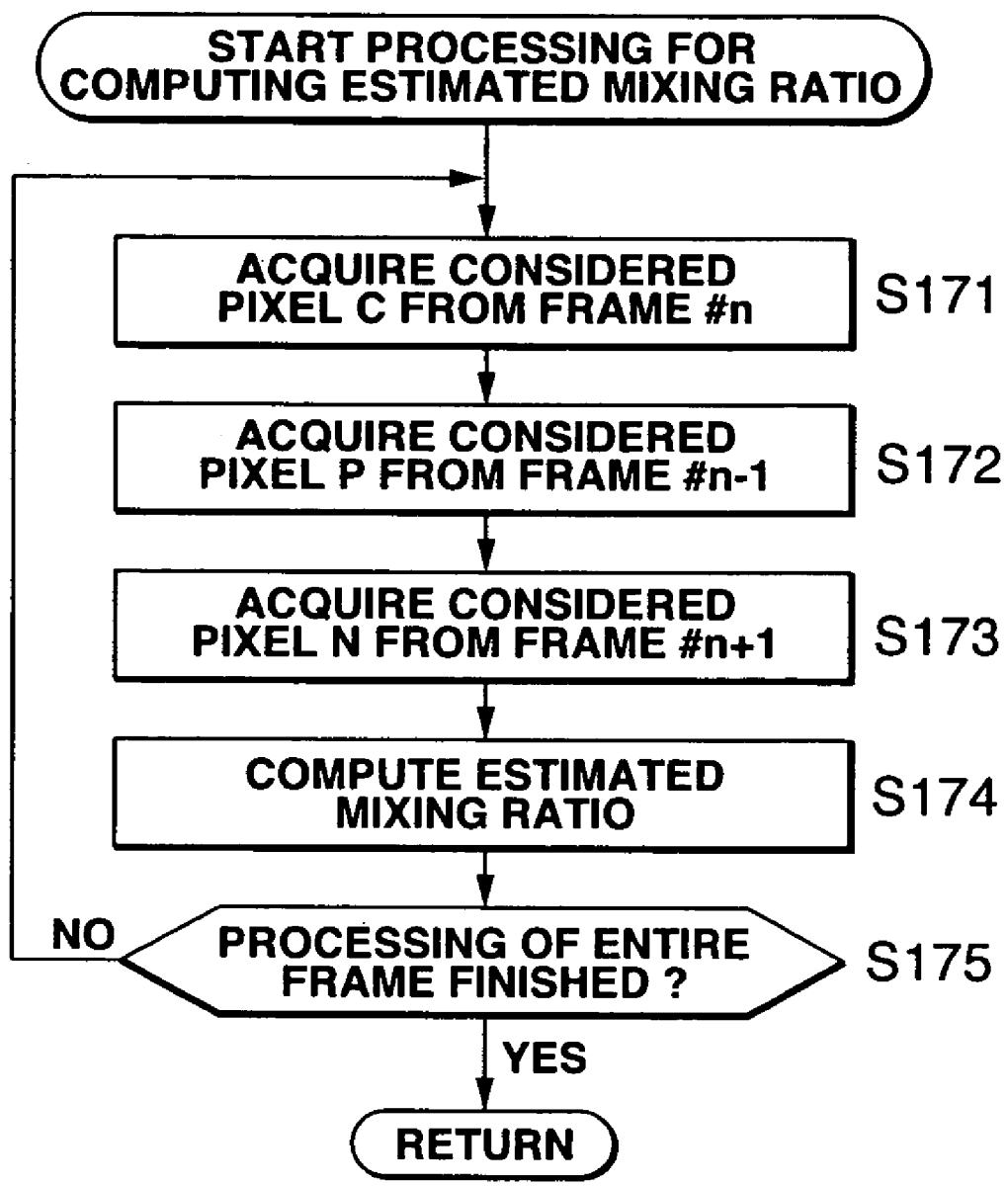
FIG. 47 is a flowchart for illustrating the processing for the operation of the estimated mixing ratio.

Referring to the flowchart of FIG. 47, the processing similar to step S152 of FIG. 46 for estimating the mixing ratio by a model corresponding to the covered background area is explained.

At step S171, the mixing ratio calculating unit 223 acquires the pixel value C of the considered pixel of the frame #n from the frame memory 221.

At step S172, the mixing ratio calculating unit 223 acquires the pixel value C of the considered pixel of the frame #n·1 from the frame memory 222.

At step S173, the mixing ratio calculating unit 223 acquires the pixel value N of the frame #n+1, corresponding to the considered pixel contained in the input picture.

At step S174, the mixing ratio calculating unit 223 calculates the estimated mixing ratio based on the pixel value C of the considered pixel of the frame #n, pixel value P of the pixel of the frame #n·1 and on the pixel value N of the pixel of the frame #n+1.

At step S175, the mixing ratio calculating unit 223 checks whether or not the processing for calculating the estimated mixing ratio has been finished for the entire frame. If it is decided that the processing for calculating the estimated mixing ratio has not been finished for the entire frame, the program reverts to step S171 to repeat the processing of calculating the estimated mixing ratio for the next pixel.

If it is verified at step S175 that the processing for calculating the estimated mixing ratio has been finished for the entire frame, the processing is finished.

In this manner, the estimated mixing ratio processor 201 is able to calculate the estimated mixing ratio based on the input picture.

The processing for estimating the mixing ratio by the model corresponding to the uncovered background area at step S153 of FIG. 46 is similar to the processing exploiting the equation corresponding to the model of the uncovered background area, as shown in the flowchart of FIG. 47, and hence is not explained specifically.

Meanwhile, since the estimated mixing ratio processor 232 and the estimated mixing ratio processor 233, shown in FIG. 45, calculates the estimated mixing ratio by executing the processing similar to the processing of the flowchart of FIG. 47, the corresponding operation is omitted for simplicity.

In the foregoing explanation, it is assumed that the object corresponding to the background is at a standstill. However, the processing for finding the mixing ratio α can also be applied to a case in which a picture corresponding to the background contains the movement. For example, if a picture corresponding to the background area is moving uniformly, the estimated mixing ratio processor 201 shifts the entire picture in keeping with the movement of the background to perform the processing as if the object corresponding to the background is at a standstill. On the other hand, if the picture corresponding to the background area contains movements of the background which differ from one location to another, the estimated mixing ratio processor 201 selects the pixel associated with the background movement, as the pixel corresponding to the pixel belonging to the mixed area, to execute the above-described processing.

The structure of the mixing ratio calculating unit 104 shown in FIG. 37 or 45 is merely illustrative.

It is also possible for the mixing ratio calculating unit 104 to execute only the processing for estimating the mixing ratio by the model corresponding to the covered background area to output the so-calculated estimated mixing ratio as the mixing ratio α. In this case, the mixing ratio α indicates the proportion of the foreground and the background for a pixel belonging to the covered background area and for a pixel belonging to the uncovered background area, respectively. If the absolute value of the difference between the so-calculated mixing ratio α and 1 is calculated to set the so-calculated absolute value as the mixing ratio α, the signal processor 12 is able to find the mixing ratio α indicating the proportion of the background component for the pixel belonging to the uncovered background area.

It is also possible to execute only the processing for mixing ratio estimation by a model corresponding to the uncovered background area for the totality of the pixels to output the so-calculated estimated mixing ratio as the mixing ratio α.

Figure 48:
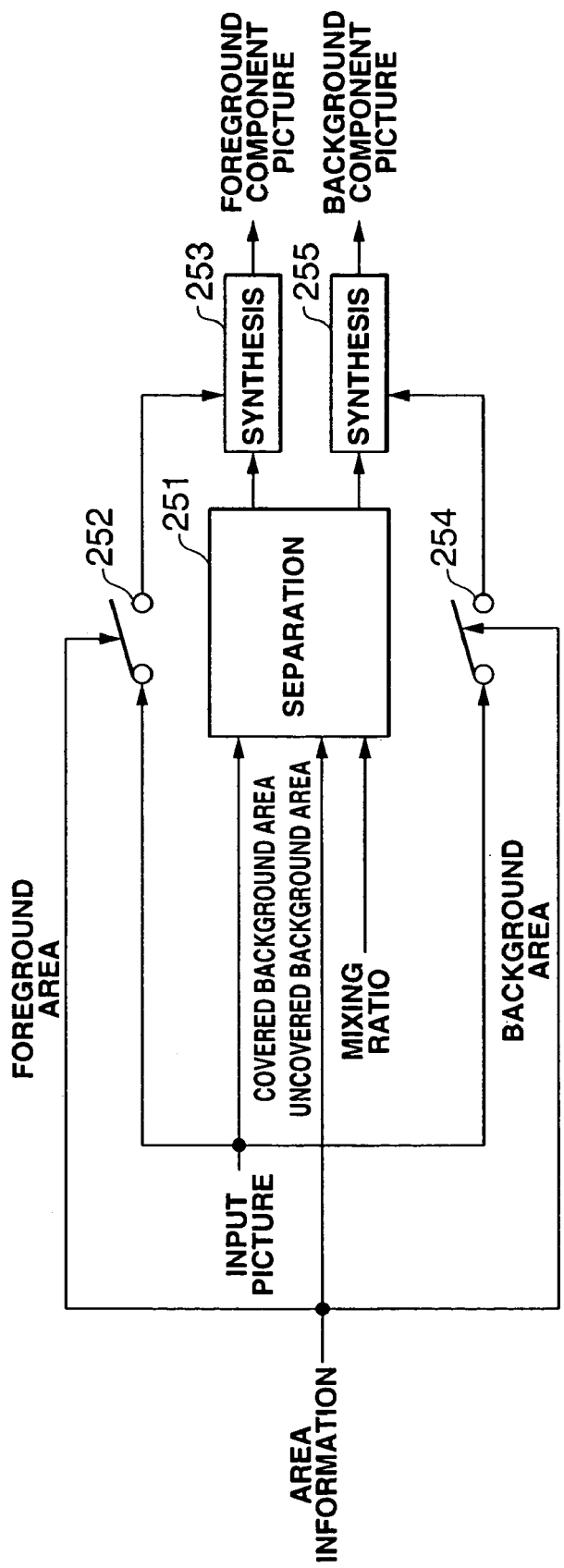
FIG. 48 is a block diagram showing an illustrative structure of a foreground/background separating unit 105.

The foreground/background separating unit 105 is now explained. In FIG. 48 which is a block diagram showing the illustrative structure of the foreground/background separating unit 105, an input picture, fed to the foreground/background separating unit 105, is supplied to a separating unit 251, a switch 252 and to a switch 254. The area information from the area specifying unit 103, specifying the information indicating the covered background area information and the information indicating the uncovered background area information, is fed to the separating unit 251, whilst the area information indicating the foreground information and the area information indicating the background area are routed to the switches 252, 254, respectively.

The mixing ratio α supplied from the mixing ratio calculating unit 104 is sent to the separating unit 251.

The separating unit 251 separates the foreground component from the input picture, based on the area information indicating the covered background area information, the area information indicating the uncovered background area information and the mixing ratio α, and supplies the so-separated foreground component to a synthesis unit 253, while separating the background component from the input picture to route the so-separated background component to the synthesis unit 255.

When a pixel corresponding to the foreground is input, the switch 252 is closed, based on the area information indicating the foreground area, to route only the pixels corresponding to the foreground contained in the input picture to the synthesis unit 253.

When a pixel corresponding to the background is input, the switch 254 is closed, based on the area information indicating the background area, to route only the pixel corresponding to the background contained in the input picture to the synthesis unit 255.

The synthesis unit 253 synthesizes a foreground component picture, based on the component from the separating unit 251, corresponding to the foreground, and on the pixel from the switch 252, corresponding to the foreground, to output the synthesized foreground component picture. Since the foreground area and the mixed area are not overlapped, the synthesis unit 253 applies the processing of logical sum to the component corresponding to the foreground and to the pixel corresponding to the foreground to synthesize the foreground component picture.

In the initializing processing, executed first in the processing for synthesizing the foreground component picture, the synthesis unit 253 stores a picture with all zero pixel values in an internal frame memory to store (overwrite) the foreground component picture in the processing for synthesizing the foreground component picture. Thus, in the pixels corresponding to the background area, in the foreground component picture output by the synthesis unit 253, 0s are stored as pixel values.

The synthesis unit 255 synthesizes the background component picture, based on the components from the separating unit 251 and on the pixels from the switch 254 corresponding to the background, to output the synthesized background component picture. Since the background area and the mixed area are not overlapped, the synthesis unit 255 applies the processing of logical sum to the component corresponding to the background and to the pixel corresponding to the background to synthesize the background component picture.

In the initializing processing, executed first in the processing for synthesizing the background component picture, the synthesis unit 255 stores a picture with all zero pixel values in an internal frame memory to store (overwrite) the background component picture in the processing for synthesizing the background component picture. Thus, in the pixels corresponding to the foreground area, in the background component picture output by the synthesis unit 255, 0s are stored as pixel values.

Figure 49:
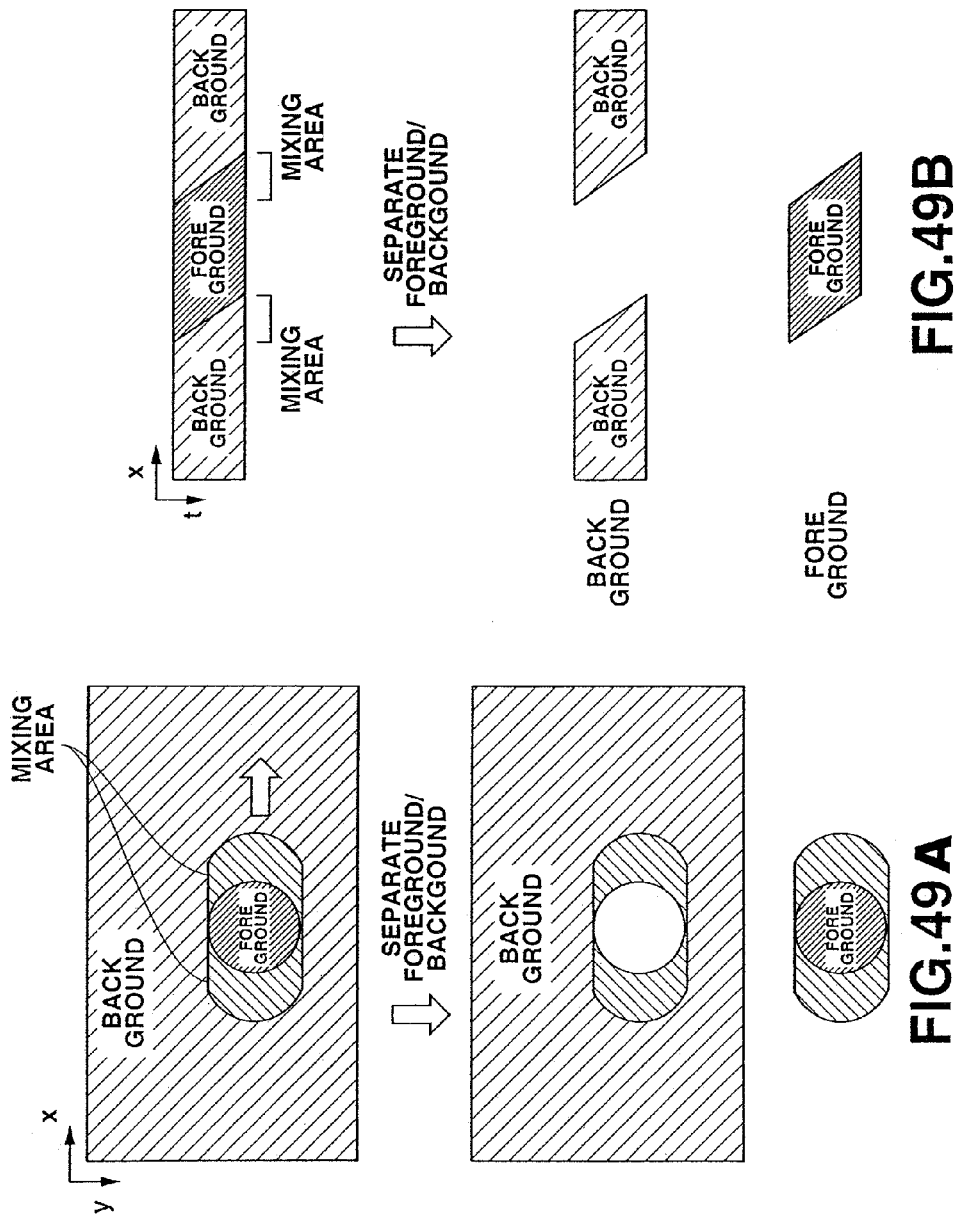
FIGS. 49A and 49B show an input picture, a foreground component picture and a background component picture.

FIG. 49 shows an input picture, fed to the foreground/background separating unit 105, and the foreground component picture and the background component picture, output from the foreground/background separating unit 105.

FIG. 49A schematically shows the displayed picture, while FIG. 49B diagrammatically shows a model obtained on developing one-line pixels comprised of pixels belonging to the foreground area, pixels belonging to the background area and the pixels in the mixed area, along the time axis.

Referring to FIGS. 49A and 49B, the background component picture, output from the foreground/background separating unit 105, is comprised of a background component contained in the pixels belonging to the background area and pixels belonging to the mixed area.

Referring to FIGS. 49A and 49B, the foreground component picture, output from the foreground/background separating unit 105, is comprised of a foreground component contained in the pixels belonging to the foreground area and pixels belonging to the mixed area.

The pixel values of the pixels of the mixed area are separated by the foreground/background separating unit 105 into the background component and the foreground' component. The background component, thus separated, makes up the background component picture along with the pixels belonging to the background area. The foreground component separated makes up the foreground component picture along with the pixels belonging to the foreground area.

In this manner, the pixel values of the pixels of the foreground component picture, associated with the background area, are set to 0, while meaningful pixel values are set in the pixels corresponding to the foreground area and to the pixels corresponding to the mixed area. Similarly, the pixel values of the pixels of the background component picture, associated with the foreground area, are set to 0, while meaningful pixel values are set in the pixels corresponding to the background area and to the pixels corresponding to the mixed area.

The processing executed by the separating unit 251 in separating the foreground and background components from the pixels belonging to the mixed area is explained.

Figure 50:
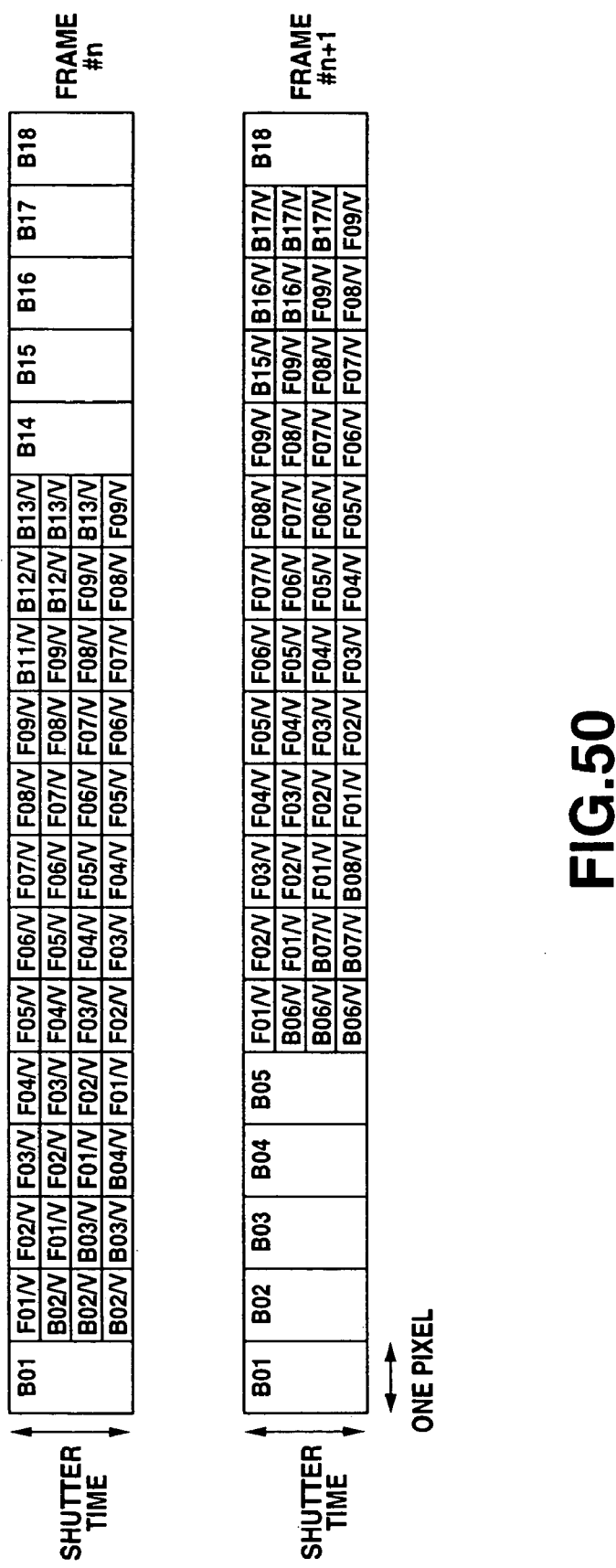
FIG. 50 is a diagrammatic view showing pixel values developed in the time axis direction and showing the time period corresponding to the shutter period shown split.

FIG. 50 diagrammatically shows a model of a picture showing foreground and background components of two frames including the foreground corresponding to an object moving from left to right in the drawing. In the picture model of FIG. 50, the movement quantity v of the foreground is 4, with the number of times of the virtual splitting being 4.

In the frame #n, the leftmost pixel and fourteenth to eighteenth pixels from left are composed only of the background components and belong to the background area. In the frame #n, the second to fourth pixels from left include background and foreground components and belong to the uncovered background area. In the frame #n, the eleventh to thirteenth pixels from left include background and foreground components and belong to the covered background area. In the frame #n, the fifth to tenth pixels from left include only foreground components and belong to the covered foreground area.

In the frame #n+1, the first to fifth pixels and the eighteenth pixel from left are composed only of the background component and belong to the background area. In the frame #n+1, the sixth to eighth pixels from left include background and foreground components and belong to the uncovered background area. In the frame #n+1, the fifteenth to seventeenth pixels from left include background and foreground components and belong to the covered background area. In the frame #n+1, the ninth to fourteenth pixels from left include only foreground components and belong to the covered foreground area.

Figure 51:
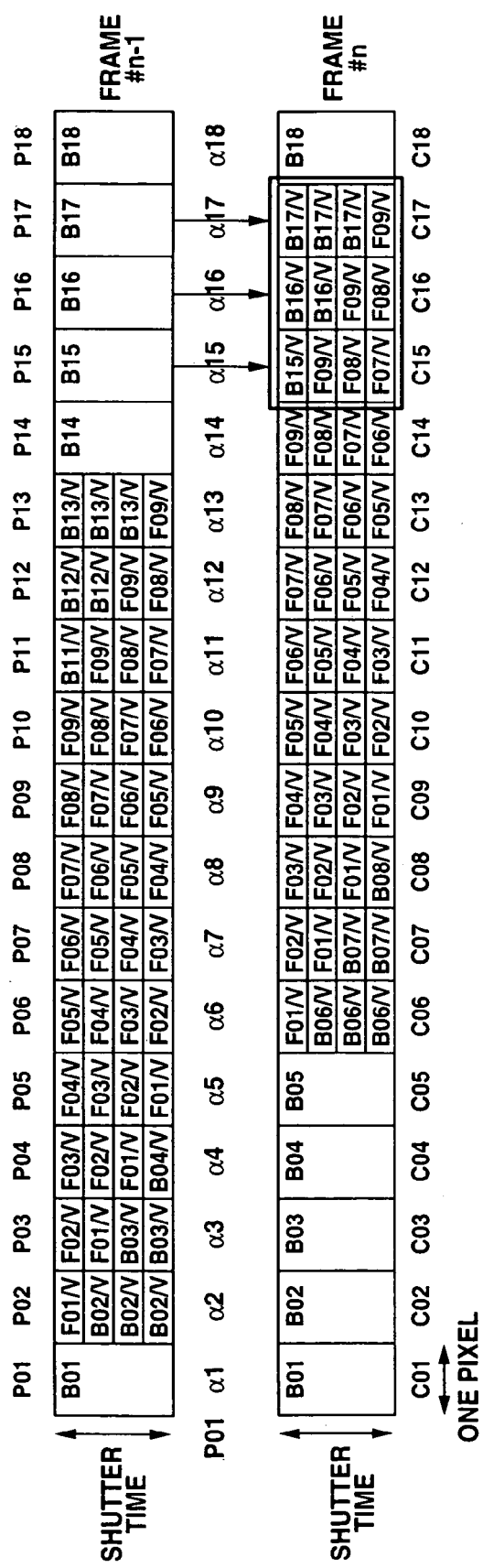
FIG. 51 is a diagrammatic view showing pixel values developed in the time axis direction and showing the time period corresponding to the shutter period shown split.

FIG. 51 illustrates the processing for separating the foreground component from the pixels belonging to the covered background area. In FIG. 51, $\alpha 1$ to $\alpha 18$ represent the mixing ratio values associated with respective pixels of the frame #n. In FIG. 51, the fifteenth to seventeenth pixels from left belong to the covered background area.

The pixel value C15 which is the fifteenth pixel from left of the frame #n is represented by the following equation (29):

$$C15 = B15/v + F09/v + F08/v + F07/v \qquad (29)$$
$$= \alpha 15 \cdot B15 + F09/v + F08/v + F07/v$$
$$= \alpha 15 \cdot P15 + F09/v + F08/v + F07/v$$

where $\alpha 15$ is the mixing ratio of the fifteenth pixel from left of the frame #n and P 15 is the pixel value of the fifteenth pixel from left of the frame #n·1.

Based on the equation (29), the sum f15 of the foreground components of the fifteenth pixel of the frame #n is represented by the equation (30):

$$f15 = F09/v + F08/v + F07/v \qquad (30)$$
$$= C15 \cdot \alpha 15 \cdot P15.$$

Similarly, the sum f16 of the foreground components of the sixteenth pixel of the frame #n and the sum first wiring pattern 17 of the foreground components of the seventeenth pixel of the frame #n are represented by the equations (31) and (32):

$$f16 = C16 \cdot \alpha 16 \cdot P16 \qquad (31)$$

and $$f17 = C17 \cdot \alpha 17 \cdot P17 \qquad (32)$$

respectively.

In this manner, the foreground components fc, contained in the pixel value C of the pixel belonging to the covered background area, may be calculated by the equation (33):

$$fc = C \cdot \alpha \cdot P \qquad (33).$$

Figure 52:
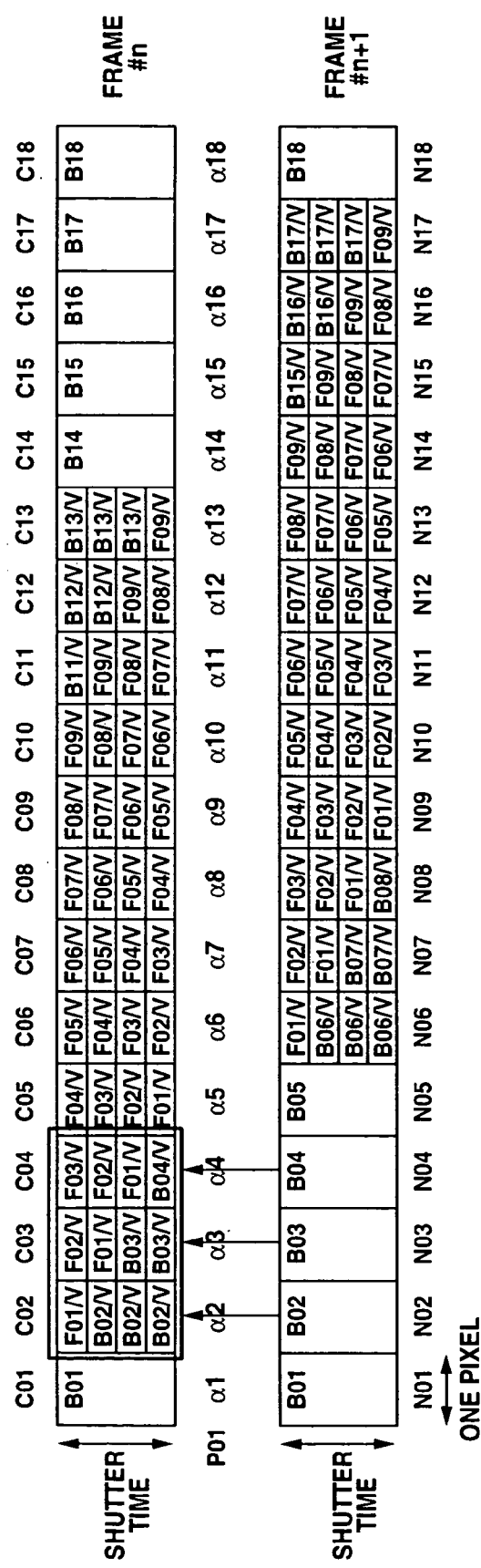
FIG. 52 is a diagrammatic view showing pixel values developed in the time axis direction and showing the time period corresponding to the shutter period shown split.

FIG. 52 illustrates the processing for separating the foreground components from the pixels belonging to the uncovered background area. In FIG. 52, $\alpha 1$ to $\alpha 18$ represent the values of the mixing ratio for respective pixels of the frame #n. In FIG. 52, the second to fourth pixels from left belong to the uncovered background area.

The pixel values C02 of the second pixel from left of the frame #n are represented by the equation (34):

$$C02 = B02/v + B02/v + B02/v + F01/v \quad (34)$$
$$= \alpha 2 \cdot B02 + F01/v$$
$$= \alpha 2 \cdot N02 + F01/v$$

where $\alpha 2$ is a mixing ratio of the second pixel from left of the frame #n and N02 is a pixel value of the second pixel from left of the frame #n+1.

Based on the equation (34), the sum f02 of the foreground component of the second pixel from left of the frame #n is represented by the equation (35):

$$f02 = F01/v = C02 - \alpha 2 \cdot N02 \quad (35)$$

Similarly, the sum f03 of the foreground components of the third pixel from left of the frame #n and the sum f04 of the foreground components of the fourth pixel from left of the frame #n are represented by the following equations (36) and (37):

$$f03 = C03 - \alpha 3 \cdot N03 \quad (36)$$

and $$f04 = C04 - \alpha 4 \cdot N04 \quad (37)$$

respectively.

The foreground component fu included in the pixel value C of the pixel belonging to the uncovered background area is calculated by the following equation (38):

$$fu = C - \alpha \cdot N \quad (38)$$

where N is a pixel value of a corresponding pixel of the next frame.

In this manner, the separating unit 251 is able to separate the foreground components and the background components from the pixels belonging to the mixed area, based on the information indicating the covered background area and on the information indicating the covered background area, contained in the area information, and on the pixel-based mixing ratio $\alpha$.

Figure 53:
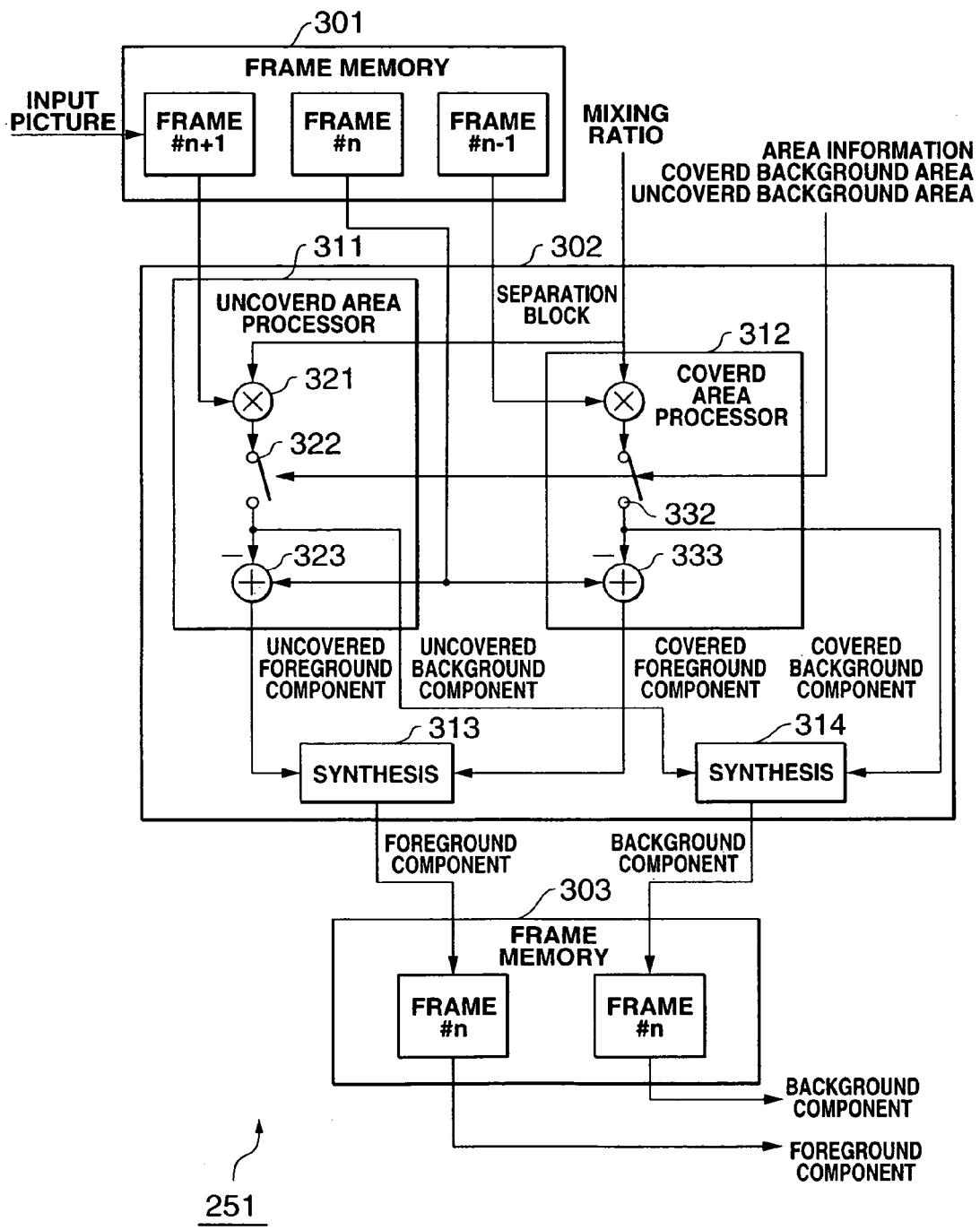
FIG. 53 is a block diagram showing an illustrative structure of a separator 251.

In FIG. 53, which is a block diagram showing an illustrative structure of the separating unit 251 adapted for executing the above-described processing, a picture input to the separating unit 251 is input to the frame memory 301, whilst the area information indicating the covered background area and the uncovered background area, and the mixing ratio $\alpha$, are input to a separating processing block 302.

The frame memory 301 stores the input pictures on the frame basis. If the object of processing is the frame #n, the frame memory 301 stores the frame #n·1, directly previous to the frame #n, frame #n and the frame #n+1 next to the frame #n.

The frame memory 301 routes the corresponding pixels of the frame #n·1, frame #n and the frame #n+1, to a separating processing block 302.

Based on the area information indicating the covered background area information and the uncovered background area information, and on the mixing ratio $\alpha$, the separating processing block 302 performs calculations, explained with reference to FIGS. 51 and 52, on the pixel values of the corresponding pixels of the frame #n·1, frame #n and the frame #n+1, supplied from the frame memory 301, to separate the foreground and background components from the pixels belonging to the mixed area of the frame #n to route the separated components to a frame memory 303.

The separating processing block 302 is made up of an uncovered area processor 311, a covered area processor 312, a synthesis unit 313 and a synthesis unit 314.

The uncovered area processor 311 includes a multiplier 321 which multiplies the pixel value of the pixel of the frame #n+1 supplied from the frame memory 301 with the mixing ratio $\alpha$ to route the resulting product to the switch 322, which is closed when the pixel of the frame #n (corresponding to the pixel of the frame #n+1) supplied from the frame memory 301 is in the uncovered background area, to route the pixel value multiplied with the mixing ratio $\alpha$ sent from the multiplier 321 to an operating unit 322 and to the synthesis unit 314. The pixel value of the pixel of the frame #n+1 from the switch 322, multiplied by the mixing ratio $\alpha$, is equal to the background component of the pixel value of the corresponding pixel of the frame #n.

An operating unit 323 subtracts the background component supplied from the switch 322 from the pixel value of the pixel of the frame #n supplied from the frame memory 301 to find the foreground component. The operating unit 323 routes the foreground component of the pixel of the frame #n, belonging to the uncovered background area, to the synthesis unit 313.

The covered area processor 312 includes a multiplier 331 which multiplies the pixel value of the pixel of the frame #n·1 supplied from the frame memory 301 with the mixing ratio $\alpha$ to route the resulting product to the switch 322, which is closed when the pixel of the frame #n (corresponding to the pixel of the frame #n·1) supplied from the frame memory 301 is in the covered background area, to route the pixel value multiplied with the mixing ratio $\alpha$ sent from the multiplier 331 to an operating unit 333 and to the synthesis unit 314. The pixel value of the pixel of the frame #n·1 from the switch 332, multiplied by the mixing ratio $\alpha$, is equal to the background component of the pixel value of the corresponding pixel of the frame #n.

An operating unit 333 subtracts the background component supplied from the switch 332 from the pixel value of the pixel of the frame #n supplied from the frame memory 301 to find the foreground component. The operating unit 333 routes the foreground component of the pixel of the frame #n, belonging to the covered background area, to the synthesis unit 313.

The synthesis unit 313 synthesizes the foreground component of the pixel from the operating unit 323, belonging to the uncovered background area, to the foreground component of the pixel belonging to the covered background area, to route the resulting sum to the frame memory 303.

The synthesis unit 314 synthesizes the background component of the pixel from the operating unit 323, belonging to the uncovered background area, to the background component of the pixel from the switch 332 belonging to the covered background area, to route the resulting sum to the frame memory 303.

The frame memory 303 stores the foreground and background components of the pixels of the mixed area of the frame #n, supplied from the separating processing block 302.

The frame memory 303 outputs the stored foreground component of the pixels of the mixed area of the frame #n and the stored background component of the pixels of the mixed area of the frame #n.

By exploiting the mixing ratio α as a characteristic value, the foreground and background components contained in the pixel value can be separated completely from each other.

The synthesis unit 253 synthesizes the foreground component of the pixels of the mixed area of the frame #n, output by the separating unit 251, and the pixels belonging to the foreground area, to each other, to generate a foreground component picture. The synthesis unit 255 synthesizes the background component of the pixels of the mixed area of the frame #n, output by the separating unit 251, and the pixels belonging to the background area, to each other, to generate a background component picture.

FIG. 54 shows an example of a foreground component picture and an example of the background component picture corresponding to the frame #n of FIG. 50.

Figures 54A, 54B:
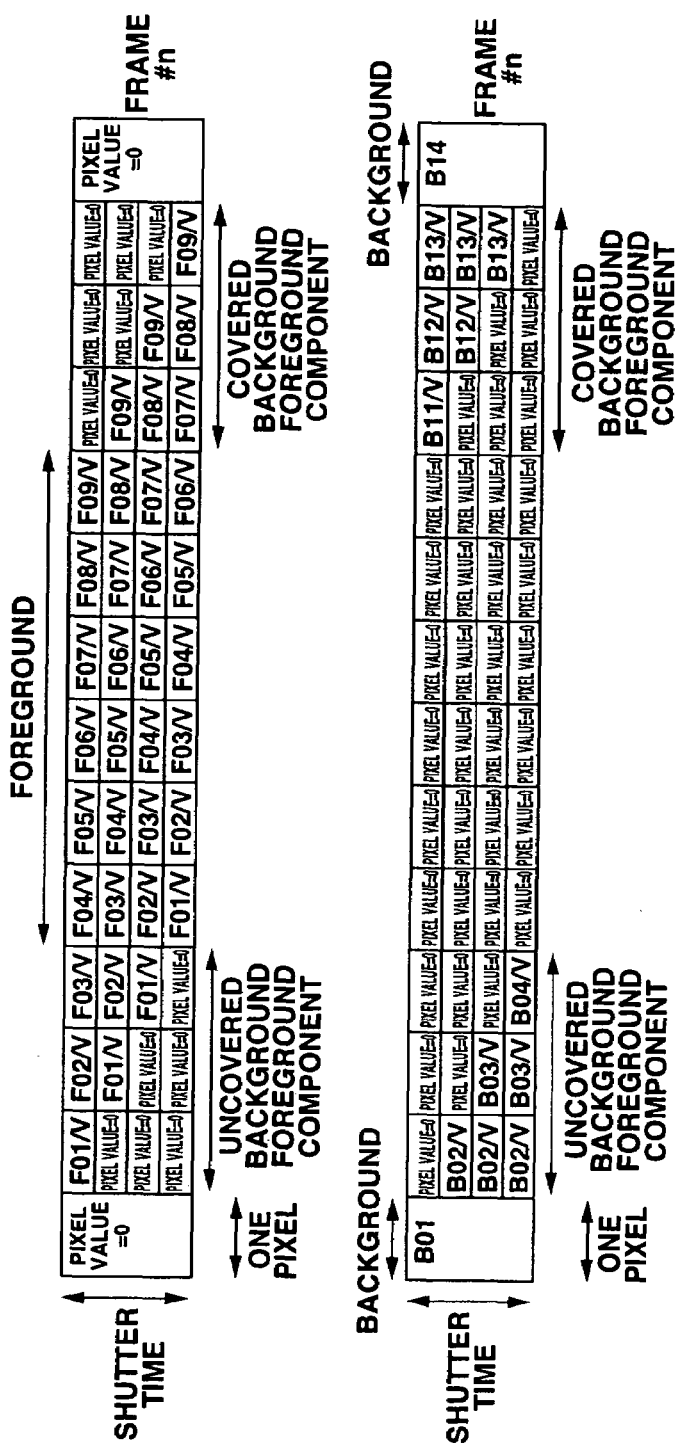
FIGS. 54A and 54B illustrate typical examples of a foreground component picture and a background component picture as separated from each other.

FIG. 54A shows an example of the foreground component picture corresponding to the frame #n of FIG. 50. The pixel values of the leftmost pixel and the fourteenth pixel from left were composed only of the background component before foreground/background separation, and hence are equal to 0.

The second to fourth pixels from left belonged to the uncovered background area before foreground/background separation, with the background component being 0 and with the foreground component being left intact. The eleventh to thirteenth pixels from left belonged to the covered background area before foreground/background separation, with the background component being 0 and with the foreground component being left intact. The fifth to tenth pixels from left are left intact because these pixels are composed only of the background components.

FIG. 54B shows an example of a background component picture corresponding to the frame #n of FIG. 50. The leftmost pixel and the fourteenth pixel from left are composed only of the background component before foreground/background separation, and hence are left intact.

The second to fourth pixels from left belonged to the uncovered background area before foreground/background separation, with the foreground component being 0 and with the background component being left intact. The eleventh to thirteenth pixels from left belonged to the covered background area before foreground/background separation, with the background component being 0 and with the foreground component being left intact. The pixel values of the fifth to tenth pixels from left are set to zero because these pixels are composed only of the foreground components.

Figure 55:
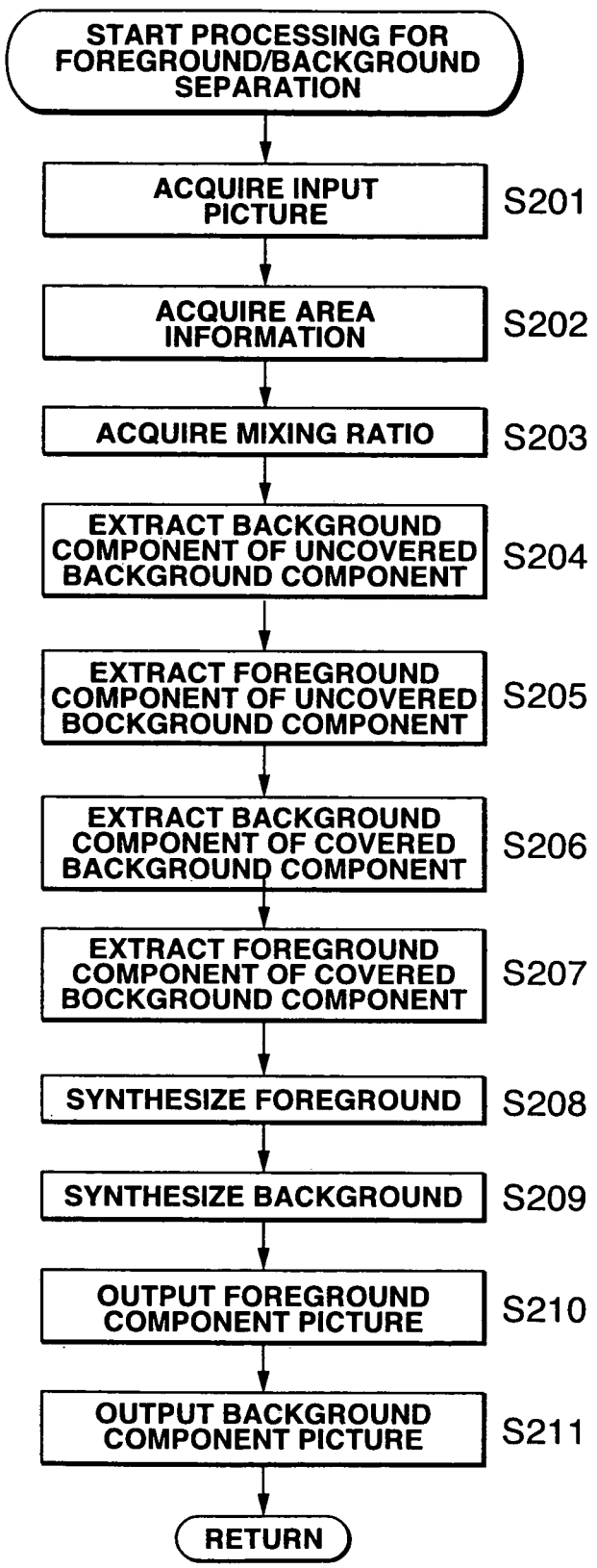
FIG. 55 is a flowchart for illustrating the processing for separating the foreground and the background from each other.

Referring to the flowchart of FIG. 55, the processing for foreground/background separation by the foreground/background separating unit 105 is explained. At step S201, the frame memory 301 of the separating unit 251 acquires an input picture and stores the frame #n, to be processed for foreground/background separation, along with the previous frame #n-1 and the subsequent frame #n+1.

At step S202, the separating processing block 302 of the separating unit 251 acquires the area information supplied from the mixing ratio calculating unit 104. At step S203, the separating processing block 302 of the separating unit 251 acquires the mixing ratio α routed from the mixing ratio calculating unit 104.

At step S204, the uncovered area processor 311 extracts the background component, based on the area information and the mixing ratio α, the pixel values of pixels belonging to the uncovered background area, supplied from the frame memory 301.

At step S205, the uncovered area processor 311 extracts the foreground component, based on the area information and the mixing ratio α, the pixel values of pixels belonging to the uncovered background area, supplied from the frame memory 301.

At step S206, the covered area processor 312 extracts the background component, based on the area information and the mixing ratio α, the pixel values of pixels belonging to the covered background area, supplied from the frame memory 301.

At step S207, the covered area processor 312 extracts the foreground component, based on the area information and the mixing ratio α, the pixel values of pixels belonging to the covered background area, supplied from the frame memory 301.

At step S208, the synthesis unit 313 synthesizes the foreground component, belonging to the uncovered background area, extracted by the processing of step S205, and the foreground component, belonging to the covered background area, extracted by the processing of step S207. The synthesized foreground component is routed to the synthesis unit 253, which then synthesizes the pixels belonging to the foreground area supplied via switch 252 and the foreground component supplied form the separating unit 251 to generate a foreground component picture.

At step S209, the synthesis unit 314 synthesizes the background component, belonging to the uncovered background area, extracted by the processing of step S204, and the background component, belonging to the covered background area, extracted by the processing of step S206. The synthesized foreground component is routed to the synthesis unit 255, which then synthesizes the pixels belonging to the foreground area supplied via switch 254 and the background component supplied form the separating unit 251 to generate a background component picture.

At step S210, the synthesis unit 253 outputs the foreground component picture. At step S211, the synthesis unit 255 outputs the background component picture to terminate the processing.

In this manner, the foreground/background separating unit 105 is able to separate the foreground component and the background component from the input picture, based on the area information and the mixing ratio α, to output a foreground component picture, made up only of the foreground components, and the background component picture, made up only of the background components.

The adjustment of the quantity of the motion blurring from the foreground component picture is explained.

Figure 56:
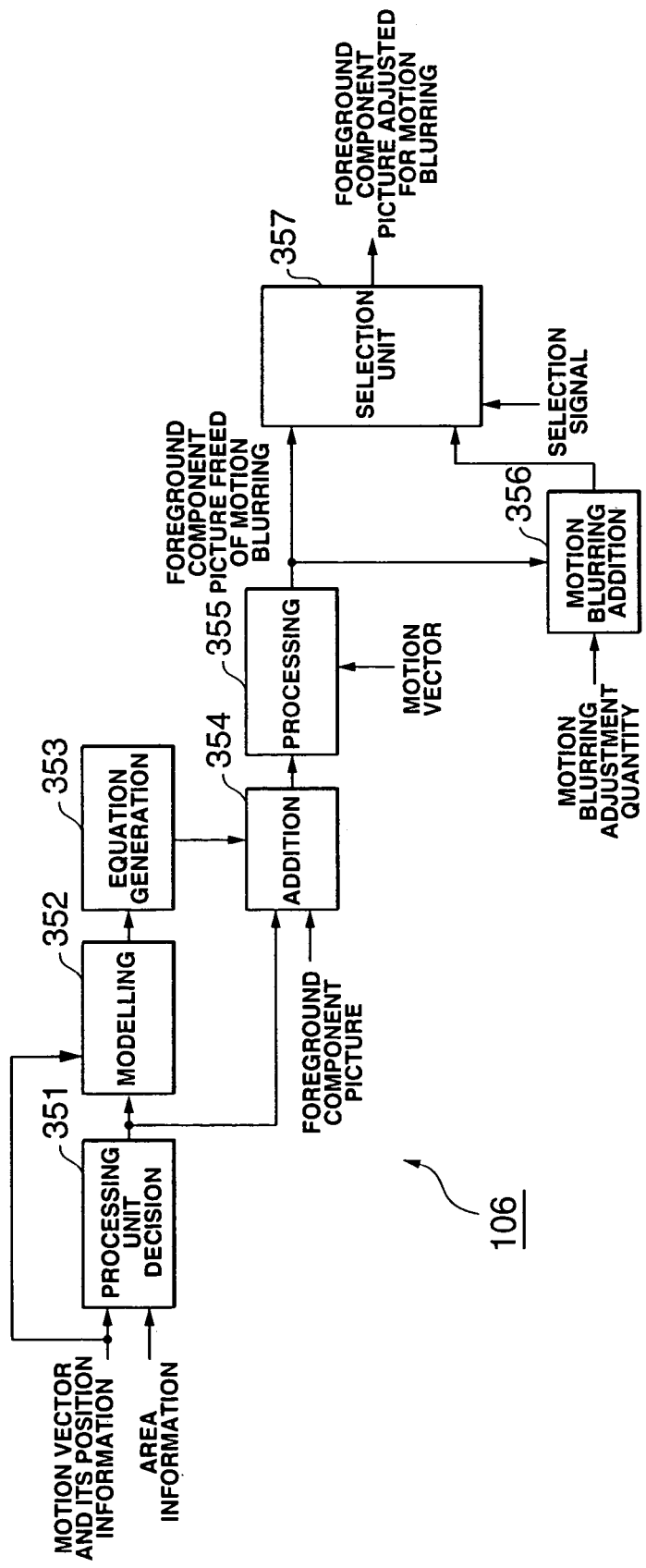
FIG. 56 is a block diagram showing an illustrative structure of a motion blurring adjustment unit 106.

In FIG. 56, which is a block diagram showing an illustrative structure of the motion blurring adjustment unit 106, the motion vector supplied from the motion detection unit 102, the corresponding position information and the area information supplied from the area specifying unit 103 are routed to a processing unit decision unit 351 and to a modelling unit 352. The foreground component picture supplied from the foreground/background separating unit 105 is sent to an addition unit 354.

The processing unit decision unit 351 routes the generated processing unit to the modelling unit 352, along with the motion vector, based on the motion vector, the corresponding position information and the area information.

Figure 57:
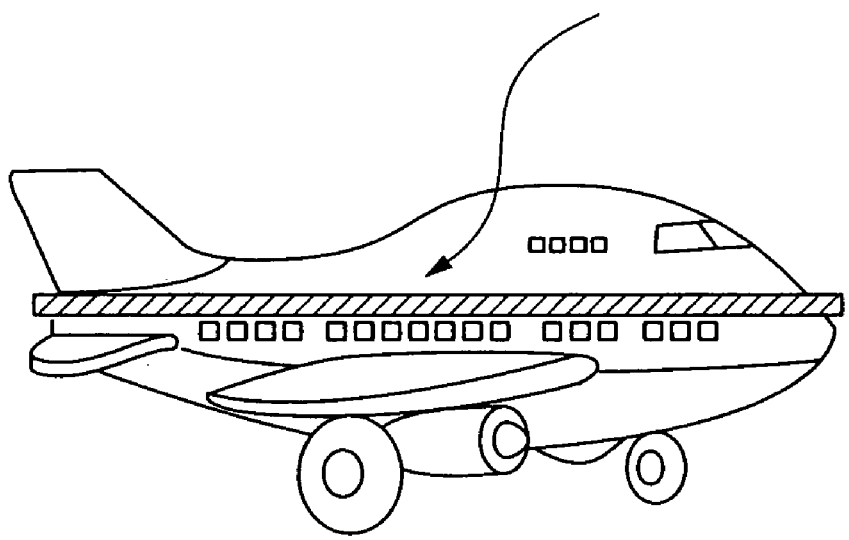
FIG. 57 illustrating a processing unit.

The processing unit, generated by the processing unit decision unit 351, represents consecutive pixels, beginning from a pixel corresponding to the covered background area of the foreground component picture and extending up to a pixel corresponding to the uncovered background area, along the movement direction, or consecutive pixels, beginning from a pixel corresponding to the uncovered background area and extending up to a pixel corresponding to the covered background area, along the movement direction, as shown for example in FIG. 57. The processing unit is made up e.g., of an upper left point and a lower right point. The upper left point is the position of a pixel specified by the processing unit and lying at the leftmost or uppermost point on a picture.

Figure 58:
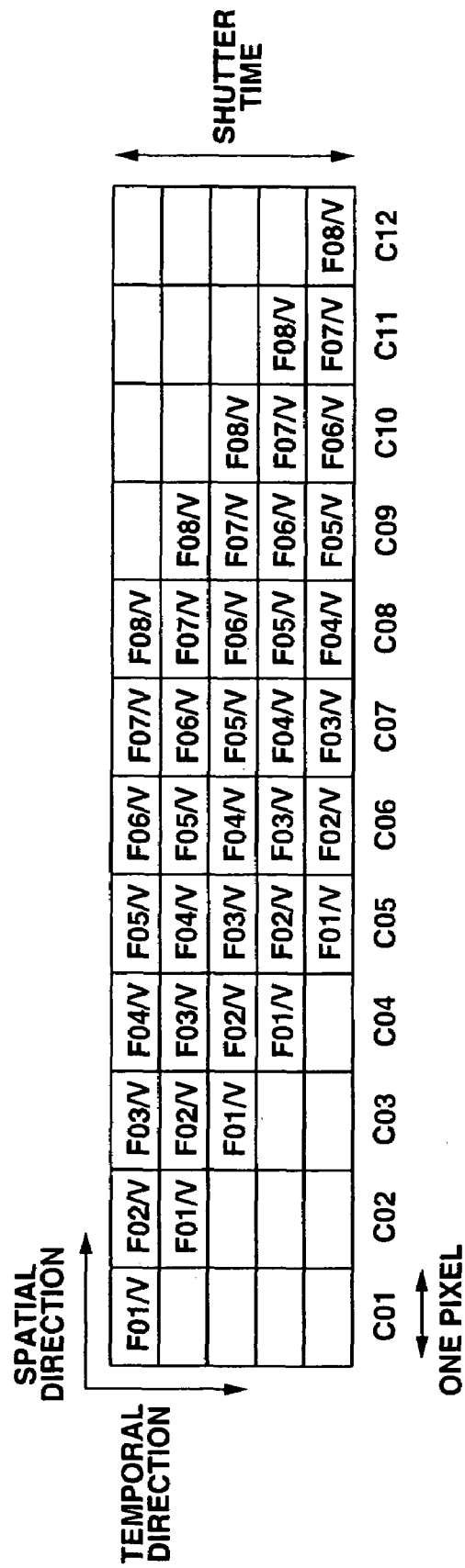
FIG. 58 is a diagrammatic view showing pixel values of a foreground component picture developed in the time axis direction and showing the time period corresponding to the shutter period shown split.

The modelling unit 352 executes the modelling based on the motion vector and on the input processing unit. More specifically, the modelling unit 352 may hold at the outset plural models corresponding to the number of pixels contained in the processing unit, the number of times of the virtual splitting of the pixel values in the time axis direction and the number of the pixel-based foreground components to select a model specifying the correspondence between the pixel values and the foreground components, based on the processing unit and on the number of times of the virtual splitting of pixel values in the time axis direction, as shown in FIG. 58.

For example, with the number of pixels corresponding to a processing unit being 12 and with the movement quantity v in the shutter time being 5, the modelling unit 352 selects a sum total of eight foreground components, with the leftmost pixel including one foreground component, the second left pixel including two foreground components, the third left pixel including three foreground components, the fourth left pixel including four foreground components, the second left pixel including two foreground components, the third left pixel including three foreground components, the fourth left pixel including four foreground components, the fifth left pixel including five foreground components, the sixth left pixel including five foreground components, the seventh left pixel including five foreground components, the eighth left pixel including five foreground components, the ninth left pixel including four foreground components, the tenth left pixel including three foreground components, the eleventh left pixel including two foreground components, and the twelfth left pixel including one foreground component.

Instead of selecting from the pre-stored model, the modelling unit 352 may generate the model based on the motion vector and on the processing unit, when the motion vector and the processing unit are supplied thereto.

The modelling unit 352 sends a selected model to an equation generating unit 353.

The equation generating unit 353 generates an equation based on the model supplied from the modelling unit 352. Referring to the model of the foreground component picture, shown in FIG. 58, an equation generated by the equation generating unit 353 when the number of the foreground components is 8, the number of pixels corresponding to the processing unit is 12, the movement quantity v is 5, and the number of times of the virtual splitting is 5 is explained.

When the foreground components corresponding to the shutter time/v contained in the foreground component picture are $F01/v$ to $F08/v$, the relation between the foreground components $F01/v$ to $F08/v$ and the pixel values $C01$ to $C12$ is represented by the equations (39) to (50):

$$C01 = F01/v \tag{39}$$

$$C02 = F02/v + F01/v \tag{40}$$

$$C03 = F03/v + F02/v + F01/v \tag{41}$$

$$C04 = F04/v + F03/v + F02/v + F01/v \tag{42}$$

$$C05 = F05/v + F04/v + F03/v + F02/v + F01/v \tag{43}$$

$$C06 = F06/v + F05/v + F04/v + F03/v + F02/v \tag{44}$$

$$C07 = F07/v + F06/v + F05/v + F04/v + F03/v \tag{45}$$

$$C08 = F08/v + F07/v + F06/v + F05/v + F04/v \tag{46}$$

$$C09 = F08/v + F07/v + F06/v + F05/v \tag{47}$$

$$C10 = F08/v + F07/v + F06/v \tag{48}$$

$$C11 = F08/v + F07/v \tag{49}$$

$$C12 = F08/v \tag{50}$$

The equation generating unit 353 modifies the generated equations to generate equations. The equations generated by the equation generating unit 353 are indicated by the equations (51) to (62):

$$C01 = 1 \cdot F01/v + 0 \cdot F02/v + 0 \cdot F03/v + 0 \cdot F04/v + 0 \cdot F05/v + 0 \cdot F06/v + 0 \cdot F07/v + 0 \cdot F08/v \tag{51}$$

$$C02 = 1 \cdot F01/v + 1 \cdot F02/v + 0 \cdot F03/v + 0 \cdot F04/v + 0 \cdot F05/v + 0 \cdot F06/v + 0 \cdot F07/v + 0 \cdot F08/v \tag{52}$$

$$C03 = 1 \cdot F01/v + 1 \cdot F02/v + 1 \cdot F03/v + 0 \cdot F04/v + 0 \cdot F05/v + 0 \cdot F06/v + 0 \cdot F07/v + 0 \cdot F08/v \tag{53}$$

$$C04 = 1 \cdot F01/v + 1 \cdot F02/v + 1 \cdot F03/v + 1 \cdot F04/v + 0 \cdot F05/v + 0 \cdot F06/v + 0 \cdot F07/v + 0 \cdot F08/v \tag{54}$$

$$C05 = 1 \cdot F01/v + 1 \cdot F02/v + 1 \cdot F03/v + 1 \cdot F04/v + 1 \cdot F05/v + 0 \cdot F06/v + 0 \cdot F07/v + 0 \cdot F08/v \tag{55}$$

$$C06 = 0 \cdot F01/v + 1 \cdot F02/v + 1 \cdot F03/v + 1 \cdot F04/v + 1 \cdot F05/v + 1 \cdot F06/v + 0 \cdot F07/v + 0 \cdot F08/v \tag{56}$$

$$C07 = 0 \cdot F01/v + 0 \cdot F02/v + 1 \cdot F03/v + 1 \cdot F04/v + 1 \cdot F05/v + 1 \cdot F06/v + 1 \cdot F07/v + 0 \cdot F08/v \tag{57}$$

$$C08 = 0 \cdot F01/v + 0 \cdot F02/v + 0 \cdot F03/v + 1 \cdot F04/v + 1 \cdot F05/v + 0 \cdot F06/v + 1 \cdot F07/v + 1 \cdot F08/v \tag{58}$$

$$C09 = 0 \cdot F01/v + 0 \cdot F02/v + 0 \cdot F03/v + 0 \cdot F04/v + 1 \cdot F05/v + 1 \cdot F06/v + 1 \cdot F07/v + 1 \cdot F08/v \tag{59}$$

$$C10 = 0 \cdot F01/v + 0 \cdot F02/v + 0 \cdot F03/v + 0 \cdot F04/v + 0 \cdot F05/v + 1 \cdot F06/v + 1 \cdot F07/v + 1 \cdot F08/v \tag{60}$$

$$C11 = 0 \cdot F01/v + 0 \cdot F02/v + 0 \cdot F03/v + 0 \cdot F04/v + 0 \cdot F05/v + 0 \cdot F06/v + 0 \cdot F07/v + 1 \cdot F08/v \tag{61}$$

$$C12 = 0 \cdot F01/v + 0 \cdot F02/v + 0 \cdot F03/v + 0 \cdot F04/v + 1 \cdot F05/v + 0 \cdot F06/v + 1 \cdot F07/v + 1 \cdot F08/v \tag{62}$$

The equations (51) to (62) may also be represented by the equation (63):

$$Cj = \sum_{i=01}^{08} \alpha ij \cdot Fi/v \tag{63}$$

where j indicates the pixel position. In this case, j assumes one of values of 1 to 12. On the other hand, i denotes the position of the foreground value, and assumes one of values of 1 to 8.

Aij has values of 0 or 1 in association with the values of i and j.

If an error is taken into account, the equation (63) may be represented by the equation (64):

$$Cj = \sum_{i=01}^{08} \alpha ij \cdot Fi/v + ej \qquad (64)$$

where ej is an error contained in a considered pixel $C_j$.

The equation (64) may be rewritten to the equation (65):

$$ej = Cj - \sum_{i=01}^{08} \alpha ij \cdot Fi/v. \qquad (65)$$

In order to apply the least square sum, a square sum of errors E is defined as indicated by the equation (66):

$$E = \sum_{j=01}^{12} ej^2. \qquad (66)$$

In order to minimize the error, it suffices if the value of the partial differentiation by a variable FK with respect to the error square sum E is 0. Fk is found to satisfy the equation (67):

$$\frac{\delta E}{\delta Fk} = 2 \cdot \sum_{i=01}^{12} ej \cdot \frac{\delta ej}{\delta Fk} \qquad (67)$$

$$= 2 \cdot \sum_{j=01}^{12} \left\{ \left( Cj - \sum_{i=01}^{08} \alpha ij \cdot Fi/v \right) \cdot (-\alpha kj/v) \right\} = 0.$$

Since the movement quantity v in the equation (67) is constant, the equation (68):

$$\sum_{j=01}^{12} \alpha kj \cdot \left( Cj - \sum_{i=01}^{08} \alpha ij \cdot Fi/v \right) = 0 \qquad (68)$$

can be derived.

Developing the equation (68) and shifting the term, we obtain the equation (69):

$$\sum_{j=01}^{12} \left( \alpha kj \cdot \sum_{i=01}^{08} \alpha ij \cdot Fi \right) = v \cdot \sum_{j=01}^{12} \alpha kj \cdot Cj. \qquad (69)$$

The equation (69) is expanded into eight equations by substituting one of integers of 1 to 8. The resulting eight equations can be represented by matrix by a sole equation termed a normal equation.

An example of the normal equation, generated by the equation generating unit 353 based on the minimum square method, is the following equation (70):

$$\begin{bmatrix} 54321000 \\ 45432100 \\ 34543210 \\ 23454321 \\ 12345432 \\ 01234543 \\ 00123454 \\ 00012345 \end{bmatrix} \begin{bmatrix} F01 \\ F02 \\ F03 \\ F04 \\ F05 \\ F06 \\ F07 \\ F08 \end{bmatrix} = v \cdot \begin{bmatrix} \sum_{i=08}^{12} Ci \\ \sum_{i=07}^{11} Ci \\ \sum_{i=06}^{10} Ci \\ \sum_{i=05}^{09} Ci \\ \sum_{i=04}^{08} Ci \\ \sum_{i=03}^{07} Ci \\ \sum_{i=02}^{06} Ci \\ \sum_{i=01}^{05} Ci \end{bmatrix} \qquad (70)$$

If the equation (70) is expressed as A·F=v·C, C, A and v are known, while F is unknown. On the other hand, A and v are known at the modelling stage, C becomes known on inputting a pixel value in the adding operation.

By calculating the foreground component by the normal equation which is based on the least square method, it is possible to effect scattering of errors contained in the pixel C.

The equation generating unit 353 sends the so-generated normal equation to an addition unit 354.

Based on the processing unit, supplied from the processing unit decision unit 351, the addition unit 354 sets the pixel value C, contained in the foreground component picture, in the matrix equation supplied from the equation generating unit 353. The addition unit 354 sends the matrix, having set the pixel value C set therein, to an operating unit 355.

The operating unit 355 calculates the foreground component freed of motion blurring Fi/v, by the processing which is based on the solution method, such as Gauss•JordAn erasure method, to find Fi corresponding to one of integers 0 to 8 of i as pixel values of the foreground freed of the motion blurring to output the foreground component picture composed of pixel values freed of motion blurring Fi to a motion blurring adding unit 356 and to a selection unit 357.

Figure 59:
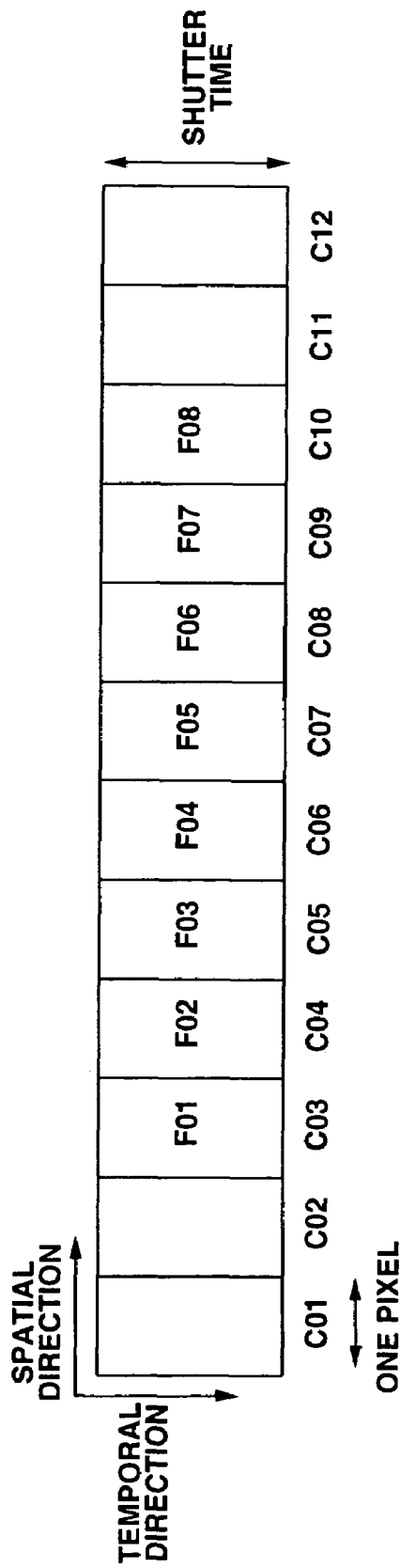
FIG. 59 is a diagrammatic view showing pixel values of a foreground component picture developed in the time axis direction and showing the time period corresponding to the shutter period shown split.

Meanwhile, F01 to F08 are set to C03 to C10, in the foreground component picture freed of the motion blurring, shown in FIG. 59, in order to produce no changes in the position of the foreground component picture relative to the picture screen. An arbitrary position can be set.

Figure 60:
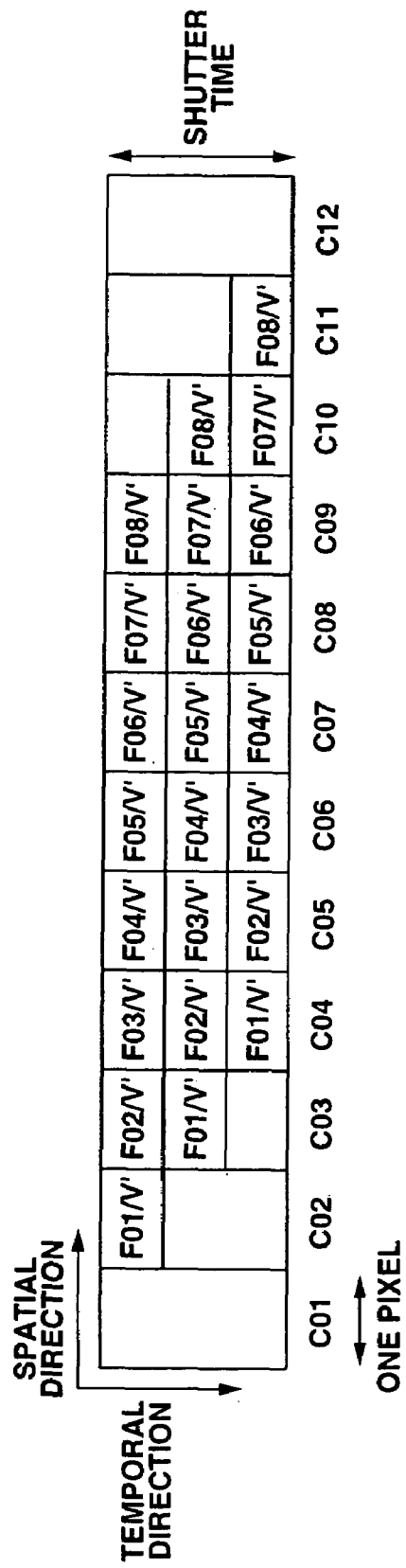
FIG. 60 is a diagrammatic view showing pixel values of a foreground component picture developed in the time axis direction and showing the time period corresponding to the shutter period shown split.

The motion blurring adding unit 356 is able to adjust the quantity of the motion blurring by imparting the motion blurring adjustment quantity v' different from the movement quantity v, for example, the motion blurring adjustment quantity v' equal to one-half the movement quantity v, or the motion blurring adjustment quantity v' irrelevant to the movement quantity v, to adjust the value of the motion blurring quantity. For example, the motion blurring adding unit 356 divides the pixel value Fi of the foreground freed of the motion blurring by the motion blurring adjustment value v' to calculate the foreground component Fi/v' and sums the foreground components Fi/v' to generate a pixel value adjusted for the motion blurring quantity, as shown in FIG. 60. For example, if the motion blurring adjustment quantity v' is 3, the pixel value C02 is (F01/v'), the pixel value C03 is (F01+F02)/v', the pixel value C04 is (F01+F02+F03)/v' and the pixel value C05 is (F02+F03+F04)/v'.

The motion blurring adding unit 356 sends the foreground component picture, adjusted for the motion blurring quantity, to the selection unit 357.

Based on the selection signal corresponding to the user's selection, the selection unit 357 selects one of the foreground component picture freed of the motion blurring, sent from the operating unit 355 and the foreground component picture from the motion blurring adding unit 356 adjusted for the motion blurring quantity to output the selected foreground component picture.

The motion blurring adjustment unit 106 thus is able to adjust the motion blurring quantity based on the selection signals and the motion blurring adjustment quantity v'.

Figure 61:
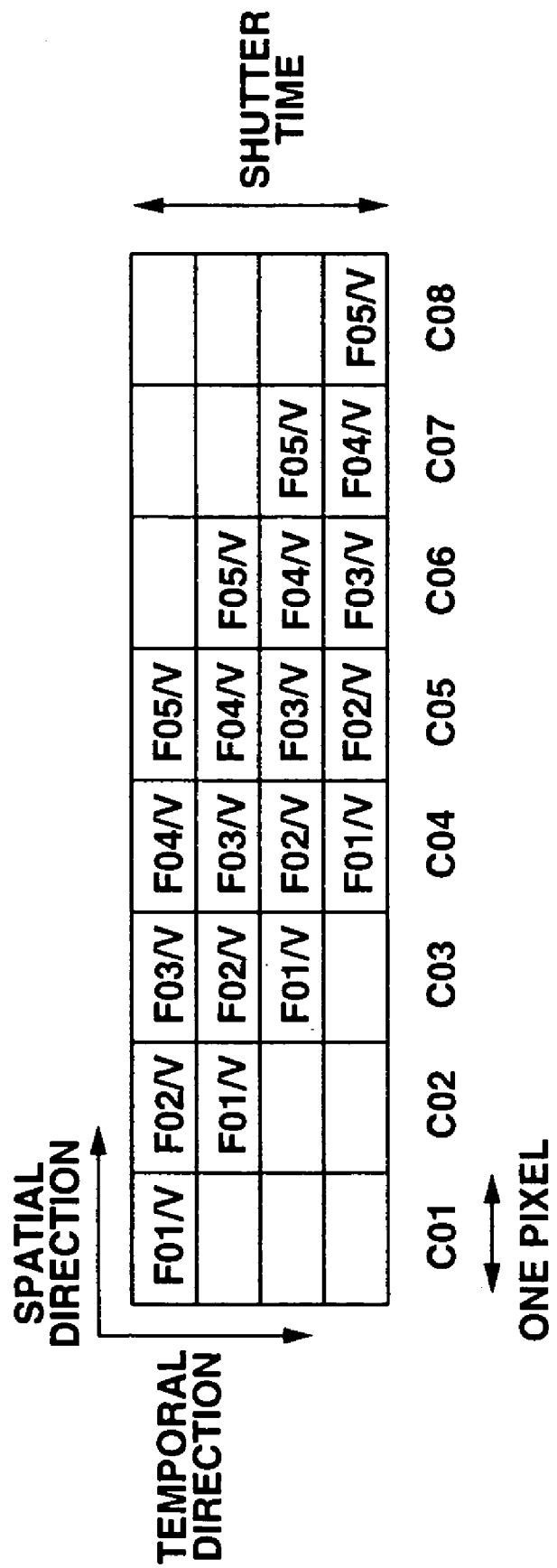
FIG. 61 is a diagrammatic view showing pixel values of a foreground component picture developed in the time axis direction and showing the time period corresponding to the shutter period shown split.

For example, if the number of pixels associated with the selection signal is eight and the movement quantity v is four, as shown in FIG. 61, the motion blurring adjustment unit 106 is able to generate the matrix equation (71):

$$\begin{bmatrix} 43210 \\ 34321 \\ 23432 \\ 12343 \\ 01234 \end{bmatrix} \begin{bmatrix} F01 \\ F02 \\ F03 \\ F04 \\ F05 \end{bmatrix} = v \cdot \begin{bmatrix} \sum_{i=05}^{08} Ci \\ \sum_{i=04}^{07} Ci \\ \sum_{i=03}^{06} Ci \\ \sum_{i=02}^{05} Ci \\ \sum_{i=01}^{04} Ci \end{bmatrix}. \quad (71)$$

The motion blurring adjustment unit 106 thus establishes a number of equations corresponding to the length of the processing unit to calculate the pixel value Fi adjusted for the motion blurring quantity. In similar manner, if the number of pixels contained in a processing unit is 100, the motion blurring adjustment unit 106 generates 100 equations in association with the 100 pixels to calculate Fi.

Figure 62:
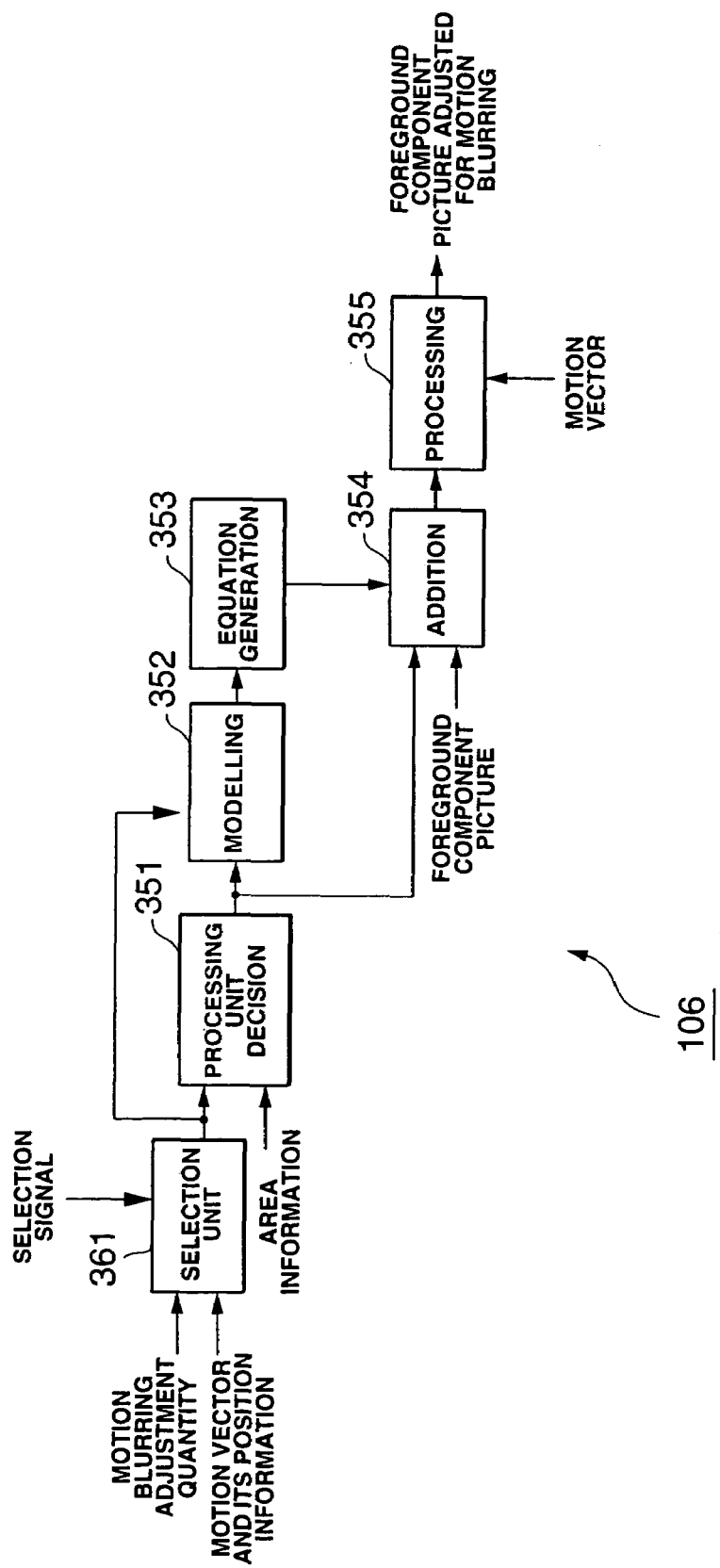
FIG. 62 shows a modified structure of the motion blurring adjustment unit 106.

In FIG. 62, showing another configuration of the motion blurring adjustment unit 106, the parts or components similar to those shown in FIG. 56 are indicated by the same reference numerals and are not explained specifically.

A selection unit 361 routes the input motion vector and the corresponding position signal directly to the processing unit decision unit 351 and to the modelling unit 352. Alternatively, the selection unit 361 substitutes the motion blurring adjustment quantity v' for the magnitude of the motion vector to route the motion vector, the magnitude of has been replaced by the motion blurring adjustment quantity v' and the corresponding position signal directly to the processing unit decision unit 351 and to the modelling unit 352.

By so doing, the processing unit decision units 351 to 355 of the motion blurring adjustment unit 106 of FIG. 62 are able to adjust the motion blurring quantity in association with the movement quantity v and with the motion blurring adjustment quantity v'. For example, if the movement quantity v is 5 and the motion blurring adjustment quantity v' is 3, the processing unit decision units 351 to 355 of the motion blurring adjustment unit 106 of FIG. 62 executes the processing on the foreground component picture, with the movement quantity v of FIG. 58 equal to 5, in accordance with the model shown in FIG. 60 corresponding to the motion blurring adjustment quantity v' equal to 3, to calculate a picture containing the motion blurring corresponding to the movement quantity v of (movement quantity v)/(motion blurring adjustment quantity v')=5/3, that is approximately 1.7. Since the calculated picture is free of the motion blurring corresponding to the movement quantity v equal to 3, attention is to be directed to the fact that the relation between the movement quantity v and the motion blurring adjustment quantity v' has a different meaning from the results of the motion blurring adding unit 356.

The motion blurring adjustment unit 106 generates an equation in association with the movement quantity v and the processing unit and sets the pixel values of the foreground component picture in the generated equation to calculate the foreground component picture adjusted for the motion blurring quantity.

Figure 63:
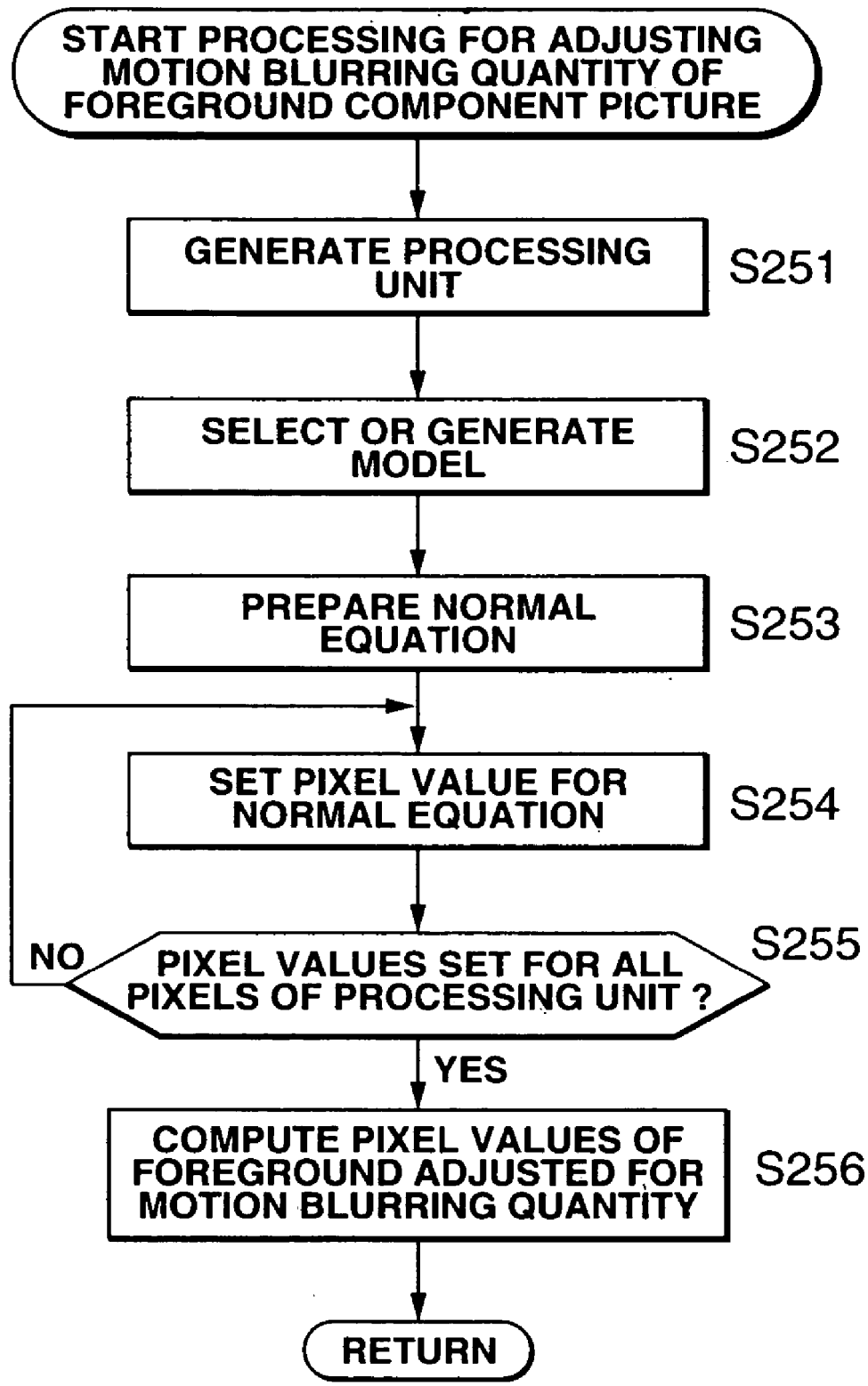
FIG. 63 is a flowchart for illustrating the processing for adjusting the amount of motion blurring contained in the foreground component picture

Referring to the flowchart of FIG. 63, the processing for adjusting the motion blurring quantity in the foreground component picture by the motion blurring adjustment unit 106 is explained.

At step S251, the processing unit decision unit 351 of the motion blurring adjustment unit 106 generates a processing unit, based on the motion vector and the area information, to send the generated processing unit to the modelling unit 352.

At step S252, the modelling unit 352 of the motion blurring adjustment unit 106 selects and generates a model in association with the movement quantity v and the processing unit. At step S253, the equation generating unit 353 generates the normal equation, based on the selected model.

At step S254, the addition unit 354 sets pixel values of the foreground component picture in the so-generated normal equation. At step S255, the addition unit 354 verifies whether or not the pixel values of the totality of pixels of the processing unit have been set. If it is verified that the pixel values of the totality of pixels corresponding to the processing unit have not been set, the program reverts to step S254 to repeat the processing of setting pixel values in the normal equation.

If it is decided at step S255 that the pixel values of the totality of pixels corresponding to the processing unit have been set, the program reverts to step S256 where the operating unit 355 calculates the pixel values of the foreground, adjusted for the motion blurring quantity, based on the normal equation from the addition unit 354, in which the pixel values have been set, to terminate the processing.

In this manner, the motion blurring adjustment unit 106 is able to adjust the motion blurring quantity based on the motion vector and the area information, from the foreground component picture containing the motion blurring.

That is, the motion blurring adjustment unit 106 is able to adjust the motion blurring quantity in the pixel values as sampling data.

Meanwhile, the structure of the motion blurring adjustment unit 106, shown in FIG. 56, is merely exemplary and is not intended to limit the present invention.

The signal processor 12, the configuration of which is shown in FIG. 10, is able to adjust the quantity of the motion blurring contained in the input picture. The signal processor 12, the configuration of which is shown in FIG. 10, is able to calculate the mixing ratio α as the buried information to output the so-calculated mixing ratio α.

Figure 64:
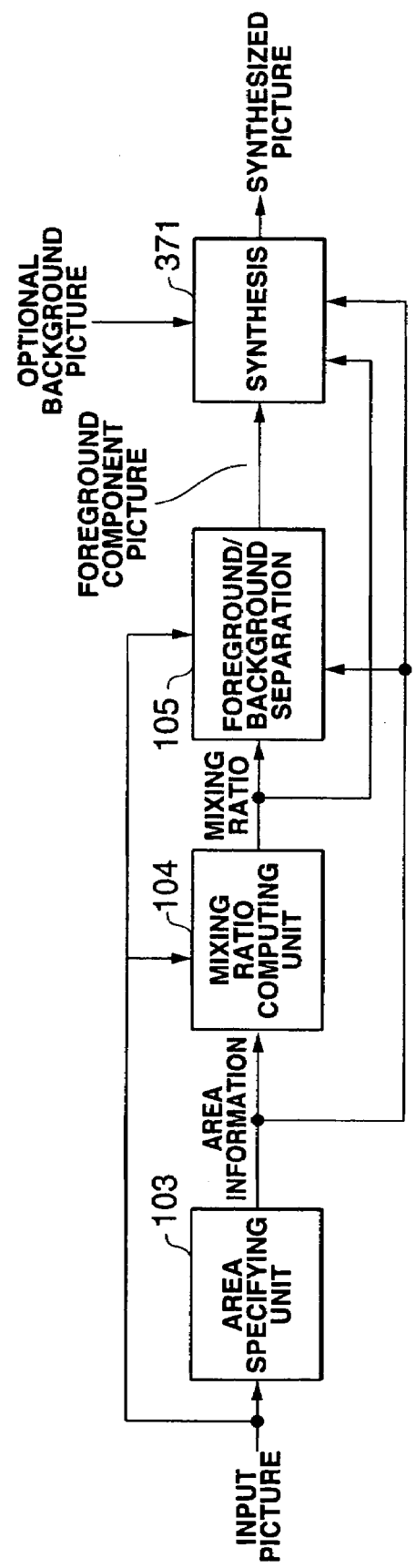
FIG. 64 is a block diagram showing a modified structure of the function of a signal processor 12.

FIG. 64 is a block diagram showing a modified configuration of the functions of the signal processor 12.

The parts or components similar to those of FIG. 10 are indicated by the same reference numerals and are not explained specifically.

The area specifying unit 103 sends the area information to the mixing ratio calculating unit 104 and to the synthesis unit 371.

The mixing ratio calculating unit 104 sends the area information to the foreground/background separating unit 105 and to the synthesis unit 371.

The foreground/background separating unit 105 sends the foreground component picture to the synthesis unit 371.

Based on the mixing ratio α supplied from the mixing ratio calculating unit 104 and on the area information supplied from the area specifying unit 103, the synthesis unit 371 synthesizes an optional background picture and the foreground component picture supplied from the foreground/background separating unit 105 to output a picture synthesized from the optional background picture and the foreground component picture.

Figure 65:
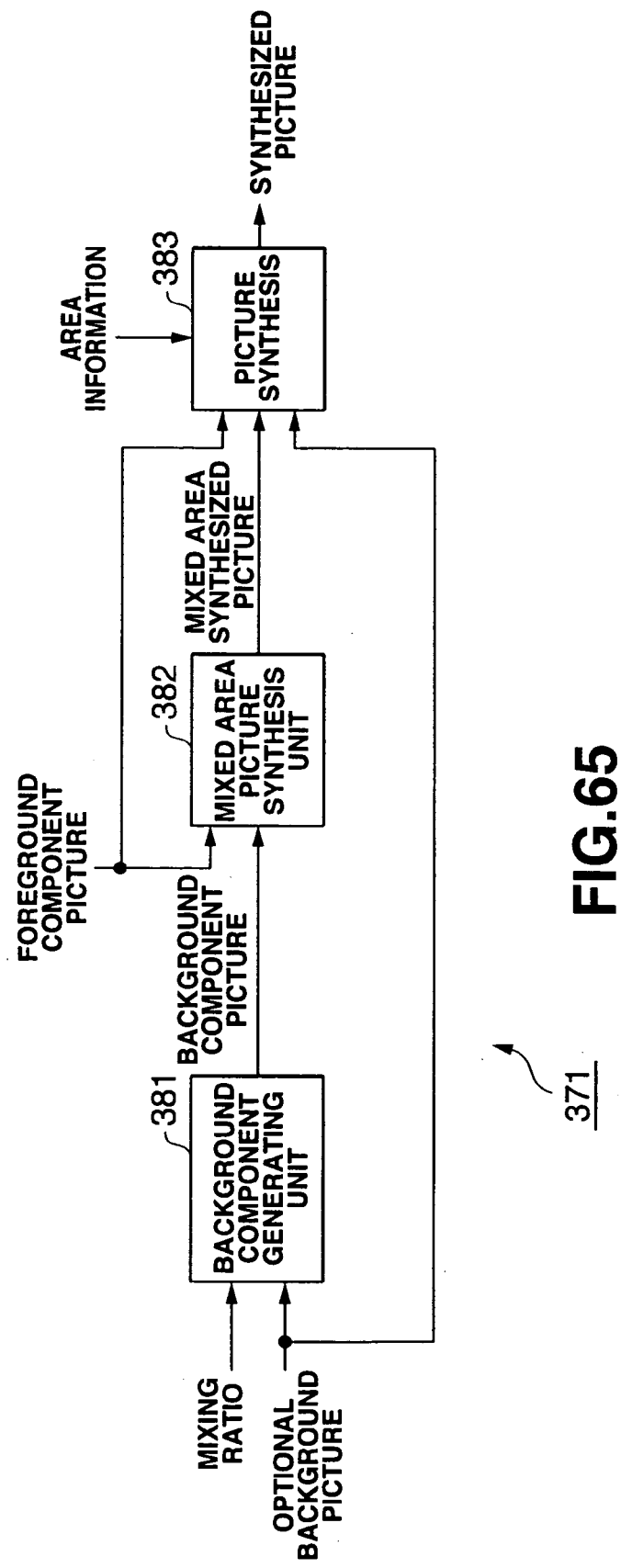
FIG. 65 shows the structure of a synthesis unit 371.

FIG. 65 shows the configuration of the synthesis unit 371. A background component generating unit 381 generates a background component picture, based on the mixing ratio α and on an optional background picture, to route the so-generated background component picture to a mixed area picture synthesis unit 382.

The mixed area picture synthesis unit 382 synthesizes the background component picture supplied from the supplied from the background component generating unit 381 and the foreground component picture to generate a mixed area synthesized picture which is routed to a picture synthesis unit 383.

Based on the area information, the picture synthesis unit 383 synthesizes the foreground component picture, mixed area synthesized picture supplied from the mixed area picture synthesis unit 382 and an optional background picture to generate and output a synthesized picture.

In this manner, the synthesis unit 371 is able to synthesize the foreground component picture to an optional background picture.

The picture obtained on synthesis of a foreground component picture with an optional background picture, based on the mixing ratio α, as a characteristic value, is more spontaneous than a picture obtained on simply synthesizing the pixels.

Figure 66:
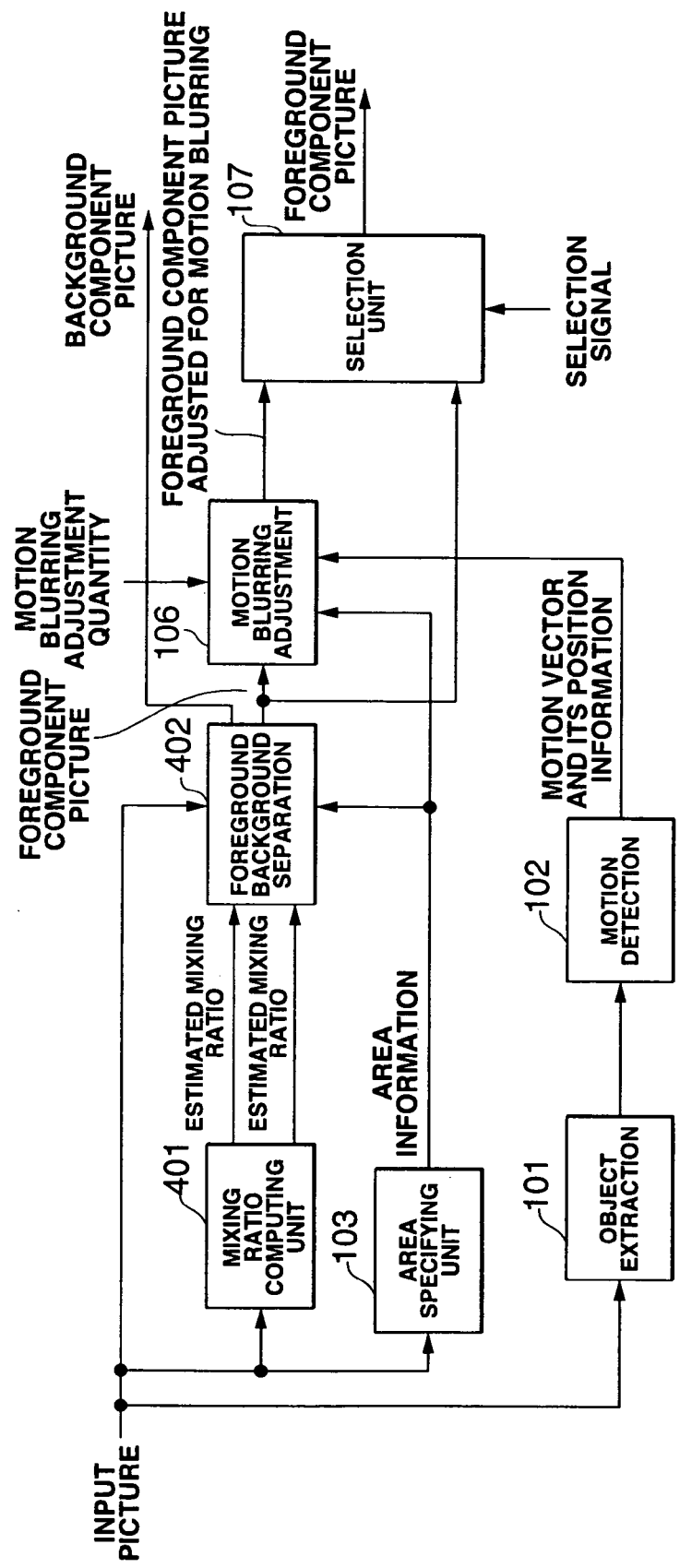
FIG. 66 is a block diagram showing another modified structure of the function of the signal processor 12.

FIG. 66 shows, in a block diagram, a further configuration of the function of the signal processor 12 adapted for adjusting the motion blurring quantity. The signal processor 12 shown in FIG. 10 calculates the mixing ratio α and specifies the area sequentially, whereas the signal processor 12 shown in FIG. 66 specifies the area and calculates the mixing ratio α by parallel processing.

The functions similar to those shown in the block diagram of FIG. 10 are denoted by the same reference numerals and are not explained specifically.

The input picture is sent to a mixing ratio calculating unit 401, foreground/background separating unit 402, an area specifying unit 103 and to an object extraction unit 101.

Based on the input picture, the mixing ratio calculating unit 401 calculates, for each of the pixels contained in the input picture, the estimated mixing ratio in case the pixel is assumed to belong to the covered background area, and the estimated mixing ratio in case the pixel is assumed to belong to the uncovered background area, to supply the so-calculated estimated mixing ratio in case the pixel is assumed to belong to the covered background area and estimated mixing ratio in case the pixel is assumed to belong to the uncovered background area, to the foreground/background separating unit 402.

Figure 67:
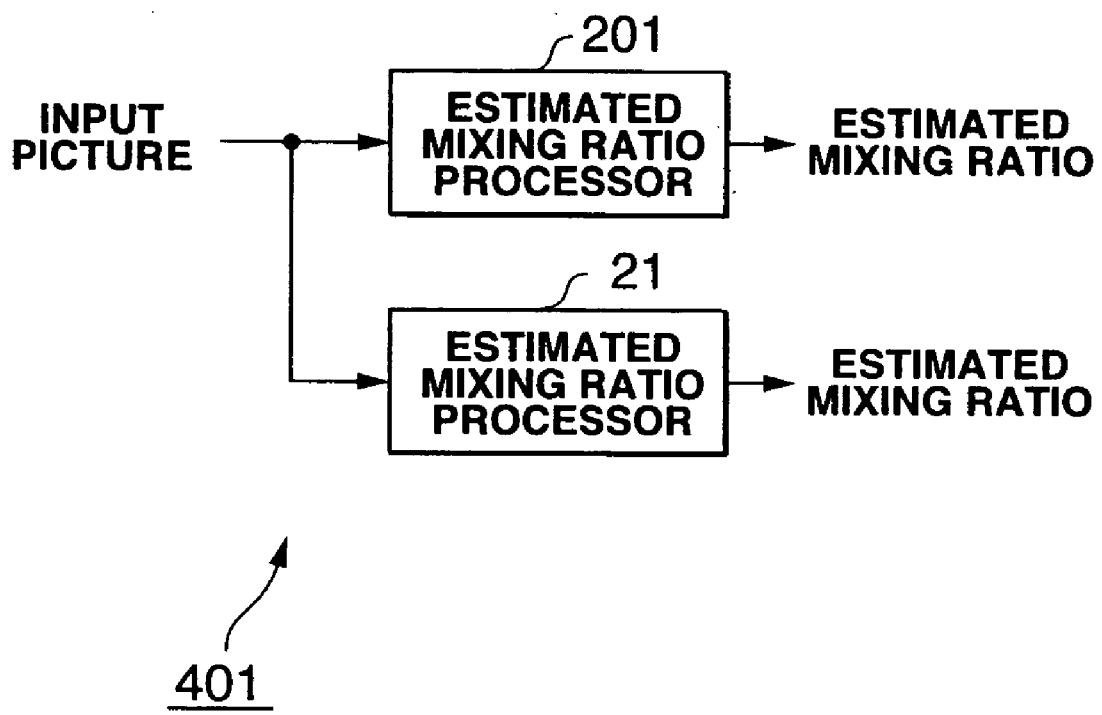
FIG. 67 is a block diagram showing the structure of a mixing ratio calculating unit 401.

FIG. 67 shows, in a block diagram an illustrative structure of the mixing ratio calculating unit 401.

The estimated mixing ratio processor 201, shown in FIG. 67, is similar to the estimated mixing ratio processor 201 shown in FIG. 37. The estimated mixing ratio processing unit 202, shown in FIG. 67, is the same as the estimated mixing ratio processing unit 202 shown in FIG. 37.

The estimated mixing ratio processor 201 calculates the estimated mixing ratio, from pixel to pixel, by calculations corresponding to the model of the covered background area, based on the input picture, to output the so-calculated estimated mixing ratio.

The estimated mixing ratio processor 202 calculates the estimated mixing ratio, from pixel to pixel, by calculations corresponding to the model of the uncovered background area, based on the input picture, to output the so-calculated estimated mixing ratio.

Based on the estimated mixing ratio in case the pixel is assumed to belong to the covered background area, and the estimated mixing ratio in case the pixel is assumed to belong to the uncovered background area, supplied from the mixing ratio calculating unit 401, and on the area information, supplied from the area specifying unit 103, the foreground/background separating unit 402 generates a foreground component picture from the input picture, to route the so-generated foreground component picture to the motion blurring adjustment unit 106 and to the selection unit 107.

Figure 68:
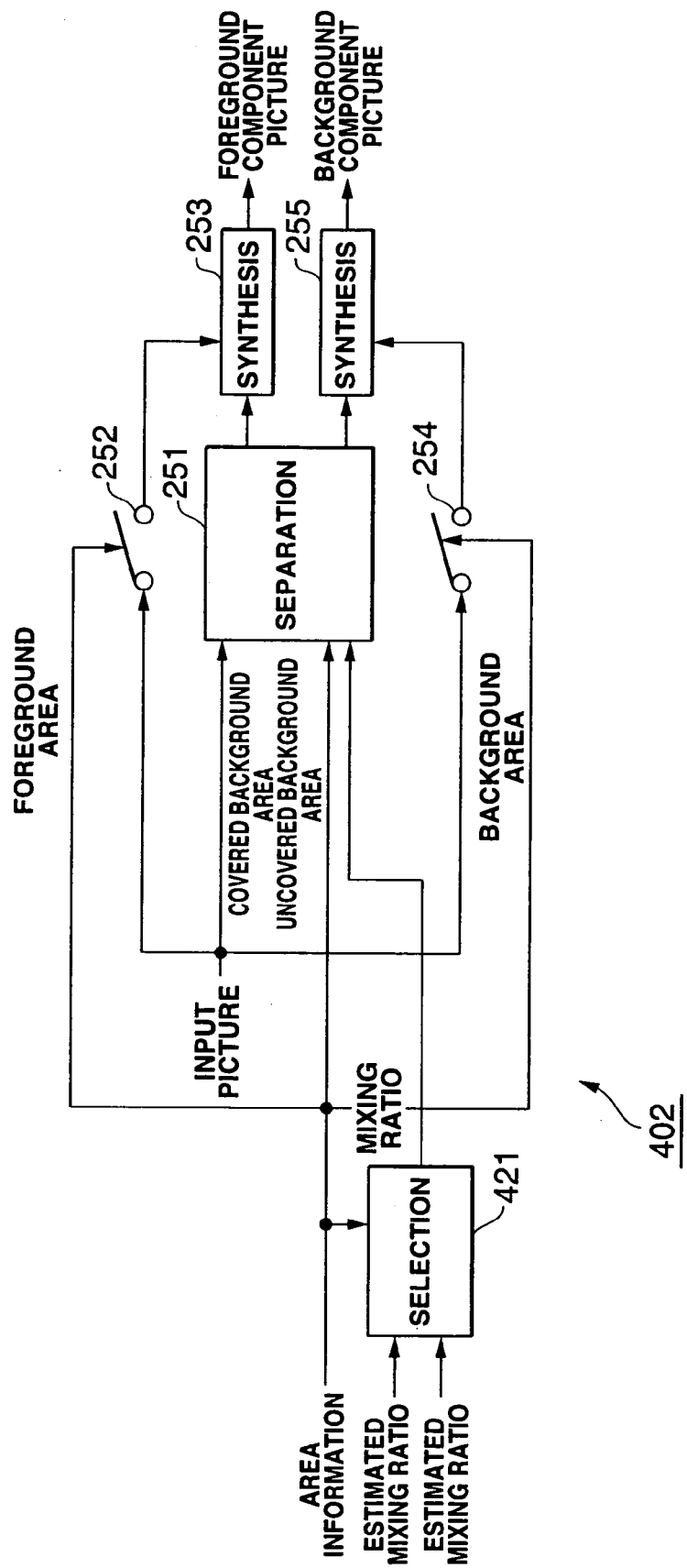
FIG. 68 is a block diagram showing the structure of a foreground/background separating unit 402.

FIG. 68 is a block diagram showing an illustrative structure of the foreground/background separating unit 402.

The parts or components similar to those of the foreground/background separating unit 105 shown in FIG. 48 are indicated by the same reference numerals and not explained specifically.

Based on the area information supplied from the area specifying unit 103, a selection unit 421 selects one of the estimated mixing ratio in case the pixel is assumed to belong to the covered background area, and the estimated mixing ratio in case the pixel is assumed to belong to the uncovered background area, supplied from the mixing ratio calculating unit 401, and routes the so-selected estimated mixing ratio as the mixing ratio α to the separating unit 251.

Based on the mixing ratio α and the area information, supplied from the selection unit 421, the separating unit 251 separates the foreground components and the background components from the pixel values of pixels belonging to the mixed area, to send the foreground components extracted to the synthesis unit 253, as well as to send the background components to the synthesis unit 255.

The separating unit 251 may be configured similarly to the structure shown in FIG. 53.

The synthesis unit 253 synthesizes and outputs the foreground component picture. The synthesis unit 255 synthesizes and outputs the background component picture.

The motion blurring adjustment unit 106, shown in FIG. 66, may be configured as in FIG. 10. Based on the area information and the motion vector, the motion blurring adjustment unit 106 adjusts the quantity of the motion blurring supplied from the foreground/background separating unit 402, to output the foreground component picture adjusted for the motion blurring quantity.

Based on the selection signal, corresponding to the selection by the user, the selection unit 107 selects one of the foreground component picture supplied from the foreground/background separating unit 402 and the foreground component picture from the motion blurring adjustment unit 106, adjusted for the motion blurring quantity, to output the selected foreground component picture.

In this manner, the signal processor 12, the configuration of which is shown in FIG. 66, is able to adjust a picture, corresponding to an object of the foreground object contained in the input picture, to output the resulting picture. The signal processor 12, the configuration of which is shown in FIG. 66, is able to calculate the mixing ratio α, as the buried information, as in the first embodiment, to output the so-calculated mixing ratio α.

Figure 69:
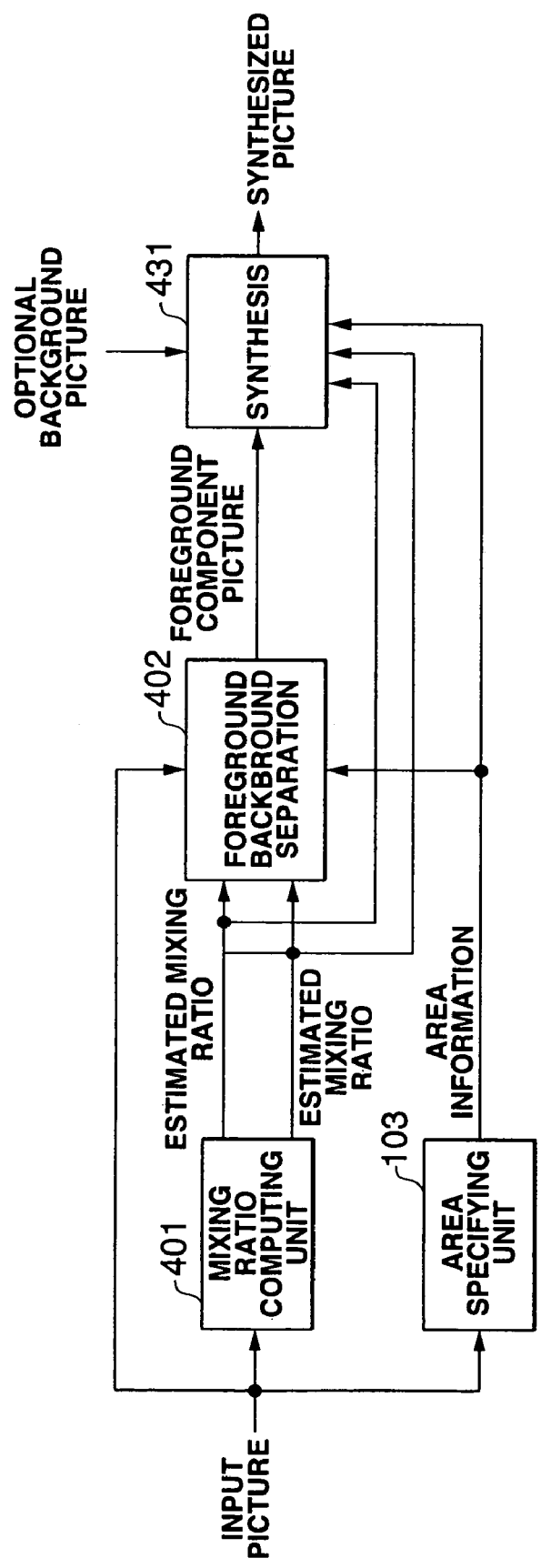
FIG. 69 is a block diagram showing a further modified structure of the function of the signal processor 12.

FIG. 69 is a block diagram showing a modification of the function of the signal processor 12 adapted for synthesizing the foreground component picture to an optional background picture. The signal processor 12, shown in FIG. 64, performs area identification and the calculation of the mixing ratio α in series, whereas the signal processor 12, shown in FIG. 69, performs area identification and the calculation of the mixing ratio α in parallel.

The functions similar to those shown in the block diagram of FIG. 66 are denoted by the same reference numerals and are not explained specifically.

Based on the input picture, the mixing ratio calculating unit 401, shown in FIG. 69, calculates the estimated mixing ratio for when the pixel is assumed to belong to the covered background area and the estimated mixing ratio for when the pixel is assumed to belong to the uncovered background area, for each of the pixels contained in the input picture, to route the estimated mixing ratio for when the pixel is assumed to belong to the covered background area and the estimated mixing ratio for when the pixel is assumed to belong to the uncovered background area, to the foreground/background separating unit 402 and to the synthesis unit 431.

Based on the estimated mixing ratio for when the pixel is assumed to belong to the covered background area, the estimated mixing ratio for when the pixel is assumed to belong to the uncovered background area, supplied from the mixing ratio calculating unit 401, and on the area information supplied from the area specifying unit 103, the foreground/background separating unit 402, shown in FIG. 69, generates the foreground component picture from the input picture to route the generated foreground component picture to the synthesis unit 431.

Based on the estimated mixing ratio for when the pixel is assumed to belong to the covered background area, the estimated mixing ratio for when the pixel is assumed to belong to the uncovered background area, supplied from the mixing ratio calculating unit 401, and on the area information supplied from the area specifying unit 103, the synthesis unit 431 synthesizes an optional background area and a foreground component picture supplied from the foreground/background separating unit 402, to output a picture synthesized from the optional background area and the foreground component picture.

Figure 70:
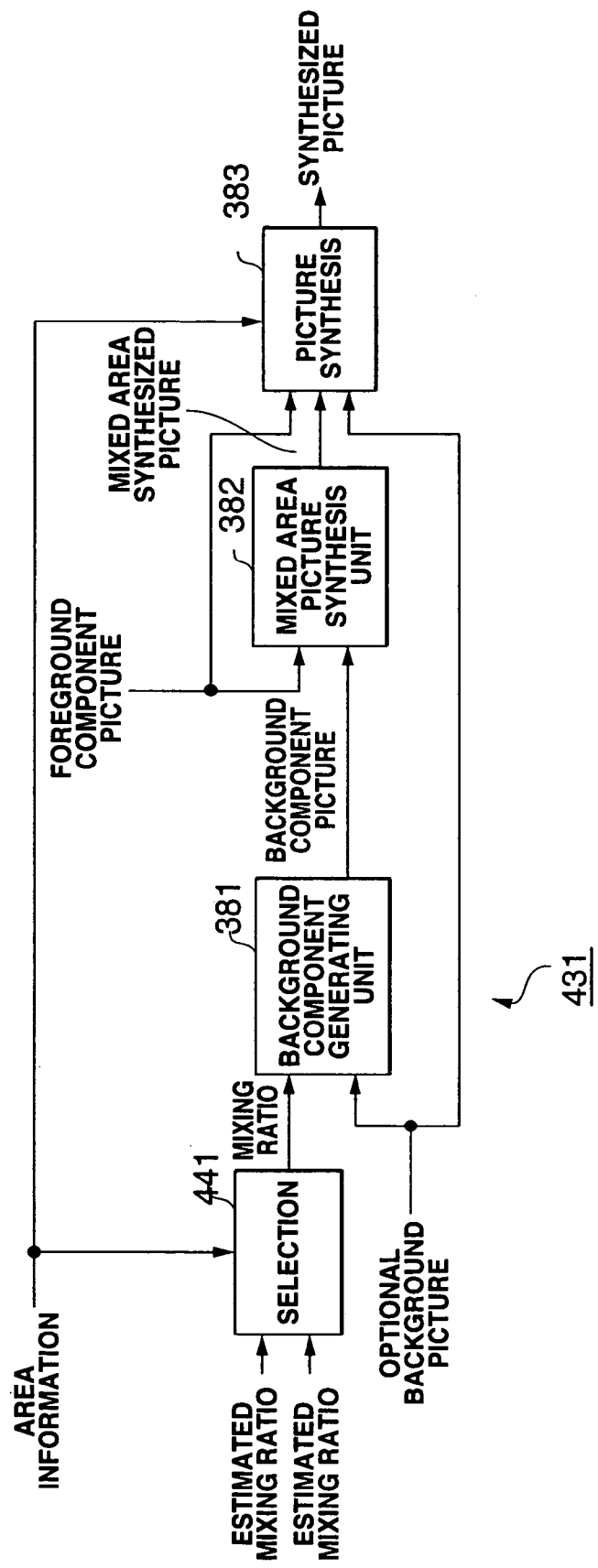
FIG. 70 illustrates the structure of a synthesis unit 431.

FIG. 70 shows the configuration of the synthesis unit 431. The functions similar to those shown in the block diagram of FIG. 65 are denoted by the same reference numerals and are not explained specifically.

Based on the area information, supplied from the area specifying unit 103, a selection unit 441 selects one of the estimated mixing ratio for when the pixel is assumed to belong to the covered background area and the estimated mixing ratio for when the pixel is assumed to belong to the uncovered background area, supplied from the mixing ratio calculating unit 401, to route the selected estimated mixing ratio as the mixing ratio α to the background component generating unit 381.

Based on the mixing ratio α supplied from the selection unit 441 and the optional background component picture, the background component generating unit 381, shown in FIG. 70, generates a background component picture, to route the generated picture to the mixed area picture synthesis unit 382.

The mixed area picture synthesis unit 382, shown in FIG. 70, synthesizes the background component picture, supplied from the background component generating unit 381, to the foreground component picture, to generate a mixed area synthesized picture, which is routed to the picture synthesis unit 383.

Based on the area information, the picture synthesis unit 383 synthesizes foreground component picture, the mixed area synthesized picture, supplied from the mixed area picture synthesis unit 382 and an optional background picture, to generate and output a synthesized picture.

In this manner, the synthesis unit 431 is able to synthesize the foreground component picture to an optional background picture.

Although the mixing ratio α has been explained as a proportion of the background component contained in the pixel value, it may also be a proportion of the foreground component contained in the pixel value.

Although the direction of movement of the object as the foreground has been explained as being from left to right, this direction is, of course, not limitative.

An embodiment in which the amount of the motion blurring quantity contained in temperature or pressure data by the similar processing as that performed by the signal processor 12 is explained.

Figure 71:
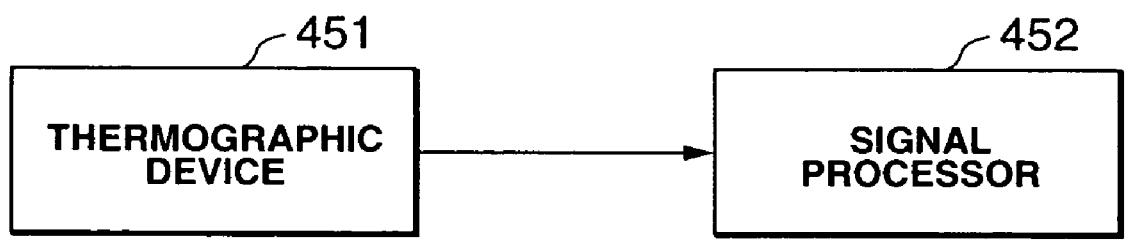
FIG. 71 shows another illustrative structure of a signal processing apparatus according to the present invention.

FIG. 71 shows an illustrative structure of a signal processing apparatus according to the present invention. A thermography device 451 detects IR rays, radiated from an object being measured from an enclosed IR sensor, such as an IR CCD, to generate a signal corresponding to the wavelength or intensity of the detected IR rays. The thermography device 451 analog/digital converts the generated signal to compare the converted signal to reference data corresponding to the reference temperature to generate temperature data indicating the temperature of various sites of the object to output the generated temperature data to the signal processor 452.

Similarly to the sensor 11, the thermography device 451 has integrating effects with respect to the space and time.

The temperature data the thermography device 451 routes to the signal processor 452 is configured similarly to the picture data of the moving picture, and is such data in which the values indicating the temperature of respective sites of the object being measured (corresponding to the pixel values of the picture data) are arrayed two-dimensionally along the spatial direction in association with the picture data frames and also are arrayed along the temporal direction.

The signal processor 452 adjusts the distortion contained in the input temperature data and which has been generated as a result of movement of the object being measured. For example, the signal processor 452 extracts a more accurate temperature of the desired site of the object being measured.

Figure 72:
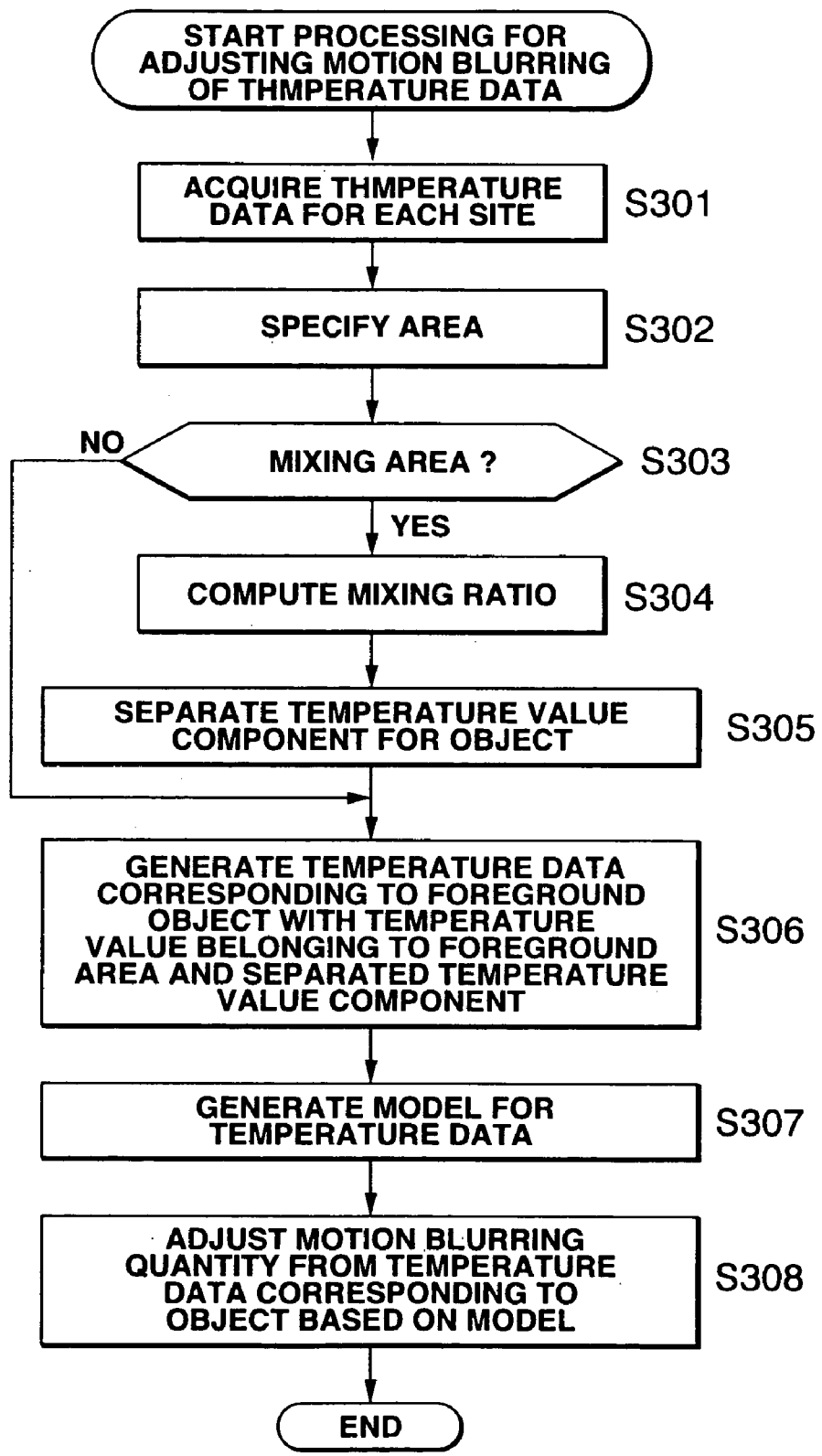
FIG. 72 is a flowchart for illustrating the processing for adjusting the amount of motion blurring by a signal processor 452.

FIG. 72 is a flowchart showing the processing for adjusting the motion blurring quantity by the signal processor 452. At step S301, the signal processor 452 acquires temperature data in which values indicating the temperatures for respective sites of the object being measured are arrayed two-dimensionally. Based on the temperature data, the signal processor 452 generates data specifying the movement.

At step S302, the signal processor 452 specifies areas of temperature data to a foreground area comprising only the values indicating the temperature corresponding to a desired object, a background area comprising only the values indicating the temperature corresponding to an object other than the desired object, and a mixed area comprising the temperature information corresponding to the desired object and the temperature information corresponding to the object other than the desired object.

At step S303, the signal processor 452 checks whether or not the temperature indicating value belongs to the temperature data. If the signal processor 452 decides that the temperature indicating value belongs to the mixed area, the signal processor 452 proceeds to step S304 to calculate the mixing ratio α by the processing similar to that of step S102 of FIG. 27.

At step S305, the signal processor 452 separates the information of the temperature corresponding to the object desiring temperature measurement, by the processing similar to the processing of step S103 of FIG. 27, to then proceed to step S306.

For separating the temperature information at step S305, the temperature information may be converted, based on the Kirchhoff's law or the law specifying the relation between the object temperature and the radiated IR rays, such as Stephen-Boltzmann law, into the energy quantity of the IR rays, emitted from the object desiring temperature measurement, to separate the energy quantity of the converted IR rays to reconvert the separated energy quantity into temperature. By conversion into the IR ray energy prior to separation, the signal processor 452 is able to separate the temperature information more accurately than in direct separation of the temperature information.

If, at step S303, the temperature indicating value contained in the temperature data does not belong to the mixed area, it is unnecessary to separate the temperature information corresponding to the object desiring the temperature measurement. So, the processing at steps S304 and S305 are skipped so that the processing proceeds to step S306.

At step S306, the signal processor 452 generates temperature data for causing temperature measurement to correspond to the desired object, from a value indicating the temperature belonging to the foreground temperature and the information on the temperature which causes the temperature measurement to correspond to the desired object.

At step S307, the signal processor 452 generates a model corresponding to the generated temperature data by the processing similar to the processing at step S251.

At step S308, the signal processor 452 adjusts the quantity of the motion blurring contained in the temperature data corresponding to the object, in need of temperature measurement, by the processing similar to that of steps S252 to S255 of FIG. 63, based on the generated model, to terminate the processing.

In this manner, the signal processor 452 adjusts the quantity of the motion blurring contained in the temperature data generated by the movement of the object being measured to calculate the more accurate temperature difference of respective object portions.

Figure 73:
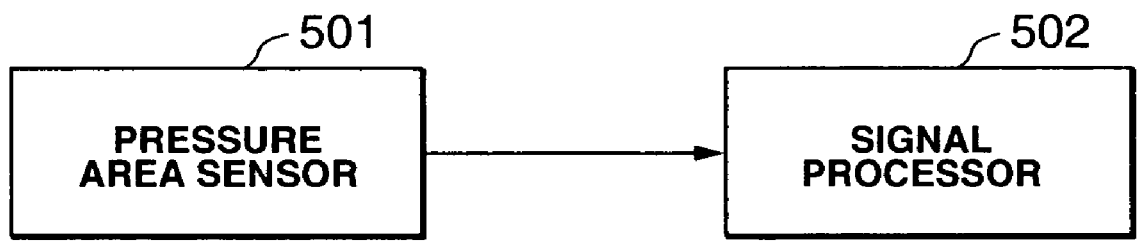
FIG. 73 shows an illustrative structure of a signal processing apparatus according to the present invention.
Figure 74:
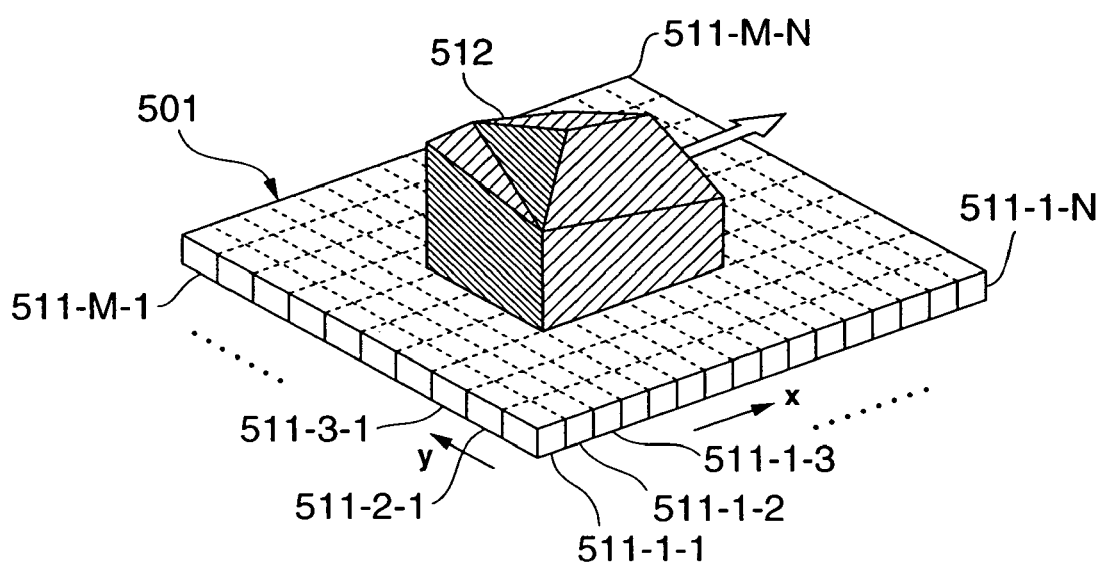
FIG. 74 shows a structure of a pressure area sensor 501.

FIG. 73 shows an illustrative structure of a signal processing apparatus according to the present invention for weighing measurement. The pressure area sensor 501 is made up of plural pressure sensors to measure the load per unit planar area, that is the pressure. The pressure area sensor 501 is of a structure comprised of a two-dimensional array on a floor surface of plural pressure sensors 511-1-1 to 511-M-N. When an object 512, the weight of which is being measured, is moved on the pressure area sensor 501, the pressure area sensor 501 measures the pressure applied to each of the pressure sensors 511-1-1 to 511-M-N to generate weight data for each of measured ranges of the pressure sensors 511-1-1 to 511-M-N to output the generated weight data to the signal processor 502.

The pressure sensors 511-1-1 to 511-M-N are each made up of a sensor exploiting double refraction produced when an external force is applied to a transparent elastic material, or the so-called photoelasticity.

The pressure area sensor 501 in its entirety may be constructed by a sensor exploiting the photoelasticity.

Figure 75:
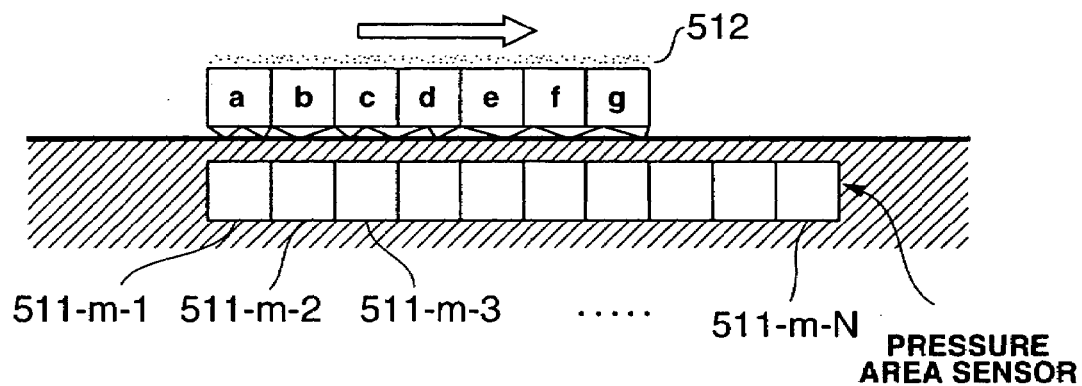
FIG. 75 illustrates the load applied to the pressure area sensor 501.

FIG. 75 illustrates the load associated with the weight of each part of the object 512 applied to respective ones of the pressure sensors 511-1-1 to 511-M-N making up the pressure area sensor 501.

The load A corresponding to the weight of the leftmost portion of the object 512 in FIG. 75 is applied to the pressure sensor 511-$m$-1. The load b corresponding to the weight of the second left portion of the object 512 is applied to the pressure sensor 511-$m$-2. The load c corresponding to the weight of the fourth left portion of the object 512 is applied to the pressure sensor 511-$m$-3. The load d corresponding to the weight of the fourth left portion of the object 512 is applied to the pressure sensor 511-$m$-4.

The load e corresponding to the weight of the second left portion of the object 512 is applied to the pressure sensor 511-$m$-5. The load f corresponding to the weight of the fourth left portion of the object 512 is applied to the pressure sensor 511-$m$-6. The load g corresponding to the weight of the fourth left portion of the object 512 is applied to the pressure sensor 511-$m$-7.

The weight data output by the pressure area sensor 501 corresponds to the arrangement of the pressure sensor 511-1-1 to 511-M-N and is comprised of weight values arrayed two-dimensionally in the spatial direction.

Figure 76:
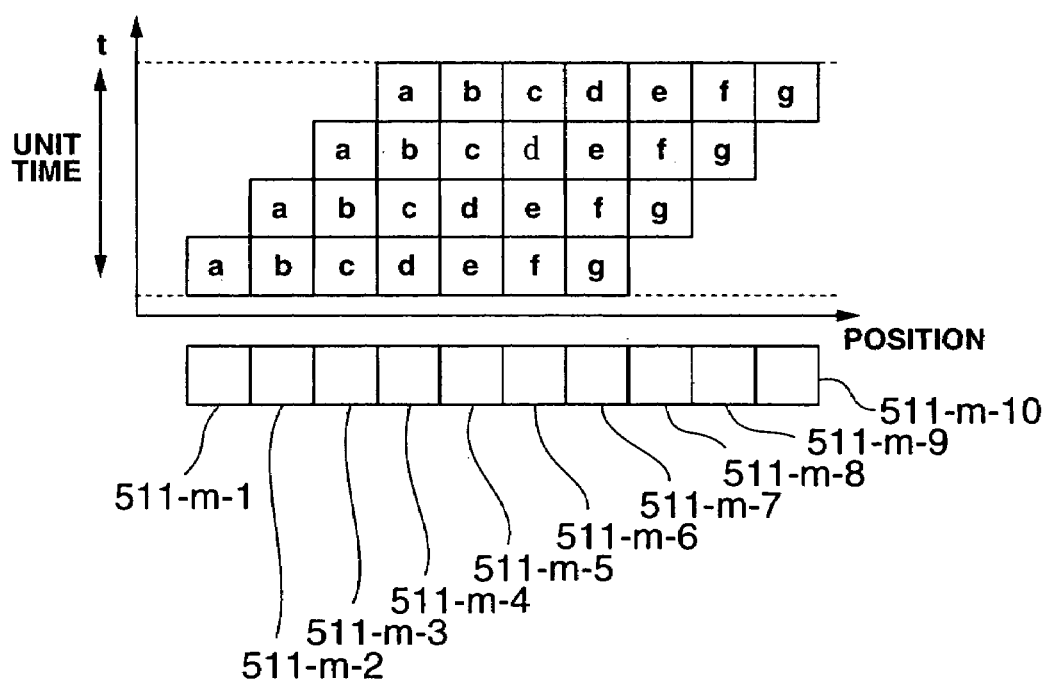
FIG. 76 illustrates typical weight data output by the pressure area sensor 501.

FIG. 76 illustrates typical weight data output by the pressure area sensor 501 when the object 512 is moving, with the pressure area sensor 501 having integrating effects.

On the pressure sensor 511-$m$-1 is applied a load A corresponding to the weight of the leftmost portion of the object 512 in a unit time of measurement, a value A is output as a value indicating the weight included in the weight data.

In the unit time for measurement, there are applied to the pressure sensor 511-$m$-2 a load b corresponding to the weight of the second left portion of the object 512, and a load d corresponding to the weight of the leftmost portion of the object 512, so the pressure sensor 511-$m$-2 outputs a value A+b as a value indicating the weight comprehended in the weight data.

In the unit time for measurement, there are applied to the pressure sensor 511-$m$-3 a load c corresponding to the weight of the third left portion of the object 512, a load b corresponding to the weight of the second left portion of the object 512 and subsequently the load A corresponding to the weight of the second left portion of the object 512, so the pressure sensor 511-$m$-2 outputs a value A+b+c as a value indicating the weight comprehended in the weight data.

In the unit time for measurement, there are applied to the pressure sensor 511-$m$-4 a load d corresponding to the weight of the fourth left portion of the object 512, a load c corresponding to the weight of the third left portion of the object 512, a load b corresponding to the weight of the second left portion of the object 512 and subsequently the load A corresponding to the weight of the leftmost portion of the object 512, so the pressure sensor 511-$m$-2 outputs a value A+b+c+d as a value indicating the weight comprehended in the weight data.

In the unit time for measurement, there are applied to the pressure sensor 511-$m$-5 a load e corresponding to the weight of the fifth left portion of the object 512, a load d corresponding to the weight of the fourth left portion of the object 512, a load c corresponding to the weight of the third left portion of the object 512 and subsequently the load A corresponding to the weight of the second left portion of the object 512, so the pressure sensor 511-*m*-5 outputs a value b+c+d+e as a value indicating the weight comprehended in the weight data.

In the unit time for measurement, there are applied to the pressure sensor 511-*m*-6 a load f corresponding to the weight of the sixth left portion of the object 512, a load e corresponding to the weight of the fifth left portion of the object 512, a load d corresponding to the weight of the fourth left portion of the object 512 and subsequently the load c corresponding to the weight of the third left portion of the object 512, so the pressure sensor 511-*m*-6 outputs a value c+d+e+f as a value indicating the weight comprehended in the weight data.

In the unit time for measurement, there are applied to the pressure sensor 511-*m*-7 a load g corresponding to the weight of the seventh left portion of the object 512, a load f corresponding to the weight of the sixth left portion of the object 512, a load e corresponding to the weight of the fifth left portion of the object 512 and subsequently the load d corresponding to the weight of the fourth left portion of the object 512, so the pressure sensor 511-*m*-7 outputs a value d+e+f+g as a value indicating the weight comprehended in the weight data.

In the unit time for measurement, there are applied to the pressure sensor 511-*m*-8 a load g corresponding to the weight of the seventh left portion of the object 512, a load f corresponding to the weight of the sixth left portion of the object 512, and a load e corresponding to the weight of the fifth left portion of the object 512, so the pressure sensor 511-*m*-8 outputs a value e+f+g as a value indicating the weight comprehended in the weight data.

In the unit time for measurement, there are applied to the pressure sensor 511-*m*-9 a load g corresponding to the weight of the seventh left portion of the object 512, and a load f corresponding to the weight of the sixth left portion of the object 512, so the pressure sensor 511-*m*-9 outputs a value f+g as a value indicating the weight comprehended in the weight data.

In the unit time for measurement, there is applied to the pressure sensor 511-*m*-10 a load g corresponding to the weight of the seventh left portion of the object 512, so the pressure sensor 511-*m*-10 outputs a value g as a value indicating the weight comprehended in the weight data.

The pressure area sensor 501 outputs weight data comprised of the value A output by the pressure sensor 511-*m*-1, the value A+b output by the pressure sensor 511-*m*-2, the value A+b+c output by the pressure sensor 511-*m*-3, the value A+b+c+d output by the pressure sensor 511-*m*-4, the value b+c+d+e output by the pressure sensor 511-*m*-4, the value A+b+c output by the pressure sensor 511-*m*-3, the value A+b+c+d output by the pressure sensor 511-*m*-4, the value b+c+d+e output by the pressure sensor 511-*m*-5, the value c+d+e+f output by the pressure sensor 511-*m*-6, the value d+e+f+g output by the pressure sensor 511-*m*-7, the value e+f+g output by the pressure sensor 511-*m*-8, the value f+g output by the pressure sensor 511-*m*-9, and the value g output by the pressure sensor 511-*m*-10.

The signal processor 502 adjusts the distortion generated by the movement of the object 512 being measured from weight data supplied from the pressure area sensor 501. For example, the signal processor 502 extracts more accurate weight of the desired sites of the object 512 being measured. For example, the signal processor 502 extracts the loads A and b to g from weight data comprised of the value A, A+b, A+b+c, A+b+c+d, b+c+d+e, c+d+e+f, d+e+f+g, e+f+g, f+g and g.

Figure 77:
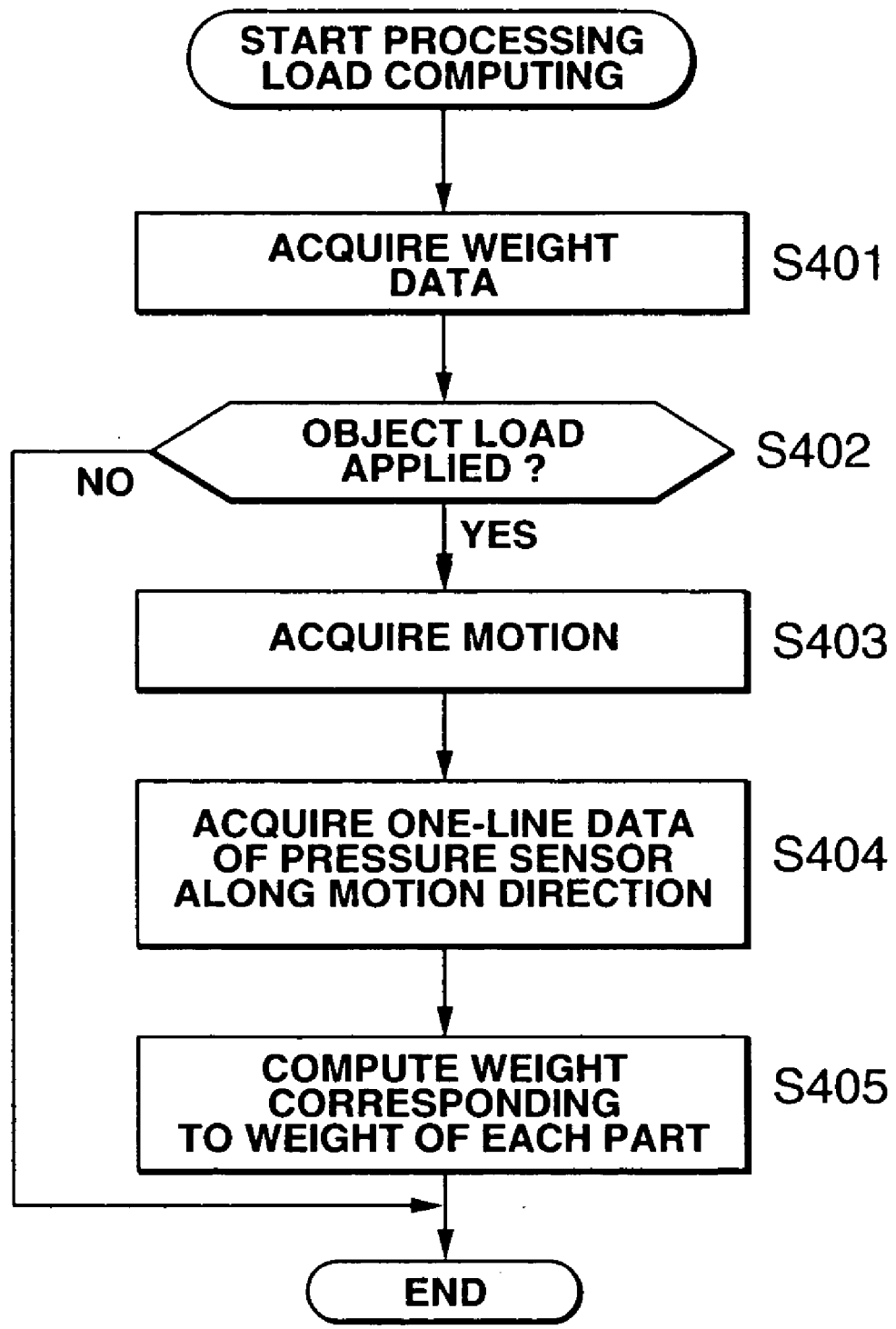
FIG. 77 is a flowchart for illustrating the load calculating processing executed by a signal processor 502.

Referring to the flowchart of FIG. 77, the processing for calculating the load executed by the signal processor 502 is explained.

At step S401, the signal processor 502 acquires weight data output by the pressure area sensor 501. At step S402, the signal processor 502 decides, based on the weight data acquired from the pressure area sensor 501, whether or not the load of the object 512 is being applied to the pressure area sensor 501. If it is decided that the load of the object 512 is being applied to the pressure area sensor 501, the signal processor 502 proceeds to step S403 to acquire the movement of the object 512 based on changes in the weight data.

At step S404, the signal processor 502 acquires one-line data of the pressure sensor 511 contained in the weight data along the direction of movement acquired by the processing at step S403.

At step S405, the signal processor 502 calculates the load corresponding to the weight of the respective portions o the object 512 to terminate the processing. The signal processor 502 calculates the load corresponding to the weights of respective parts of the object 512 by a processing similar to the processing explained with reference to the flowchart of FIG. 63.

If, at step S402, the load of the object 512 is not applied to the pressure area sensor 501, there is no weight data to be processed, so the processing is terminated.

In this manner, the weight measurement system is able to calculate the correct load corresponding to the weight of each portion of the moving object.

The signal processor 12 generating a picture of higher resolution in the spatial direction is explained.

Figure 78:
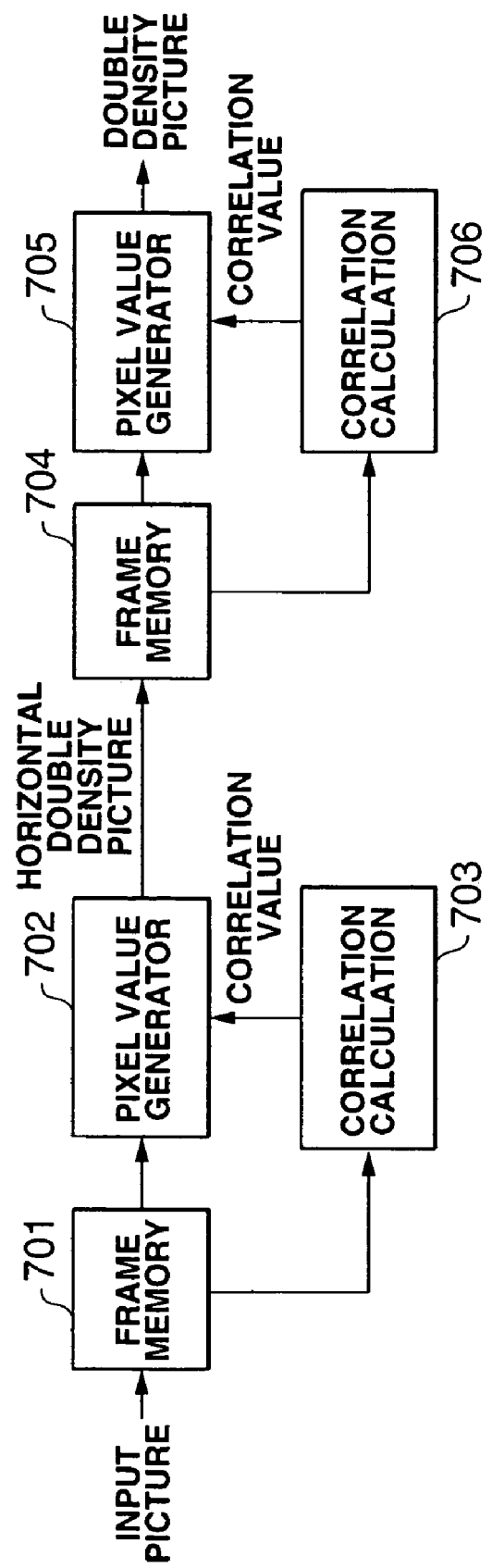
FIG. 78 is a block diagram showing the structure of generating a picture having an increased number of pixels per frame, as another function of the signal processor 12.

FIG. 78 is a block diagram showing a configuration of generating high resolution picture by increasing the number of pixels per frame, as another function of the signal processor 12.

A frame memory 701 stores an input picture on the frame basis and sends the stored picture to a pixel value generator 702 and to a correlation calculating unit 703.

The correlation calculating unit 703 calculates the correlation values of pixel values neighboring to one another in a transverse direction, contained in a picture supplied from the frame memory 701, to send the calculated correlation values to the pixel value generator 702. The pixel value generator 702 calculates double density picture components from the pixel values of the center pixel, based on the correlation values supplied from the correlation calculating unit 703, to generate a horizontal double-density picture, with the so-calculated picture component as the pixel value. The pixel value generator 702 sends the so-generated horizontal double-density picture to the frame memory 704.

The frame memory 704 stores the horizontal double-density picture, supplied from the pixel value generator 702, to send the so-stored horizontal double-density picture to a pixel value generating unit 705 and to a correlation calculating unit 706.

The correlation calculating unit 706 calculates the correlation values of pixel values neighboring to one another in a vertical direction, contained in a picture supplied from the frame memory 704, to send the calculated correlation values to the pixel value generator 705. The pixel value generator 705 calculates double density picture components from the pixel values of the center pixel, based on the correlation values supplied from the correlation calculating unit 703, to generate a horizontal double-density picture, with the so-calculated picture component as the pixel value. The pixel value generator 705 outputs the so-generated horizontal double-density picture.

The processing for generating a horizontal double-density picture by the pixel value generator 702 is explained.

Figure 79:
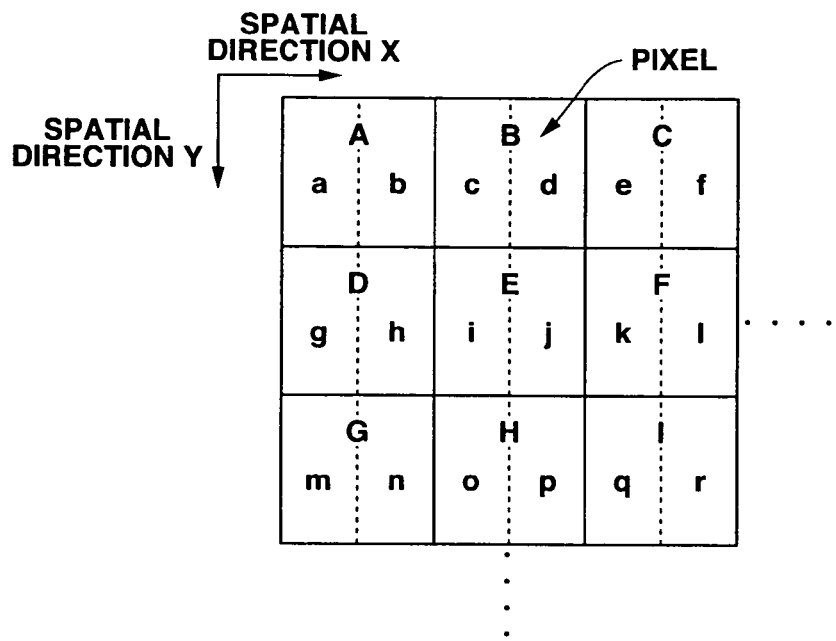
FIG. 79 illustrates pixel arrangement and an area corresponding to a pixel doubled in horizontal density.

FIG. 79 shows an arrangement of pixels provided in a sensor 11 as a CCD, and an area for pixel data of a horizontal double-density picture. In FIG. 79, A to I indicate individual pixels. The areas A to r each denote a light reception area obtained on halving the individual pixels A to I in the longitudinal direction. With the width 21 of the light reception area of each of the pixels A to I, the width of each of the areas A to r is I. The pixel value generator 702 calculates the pixel values of the pixel data associated with the areas A to r.

Figure 80:
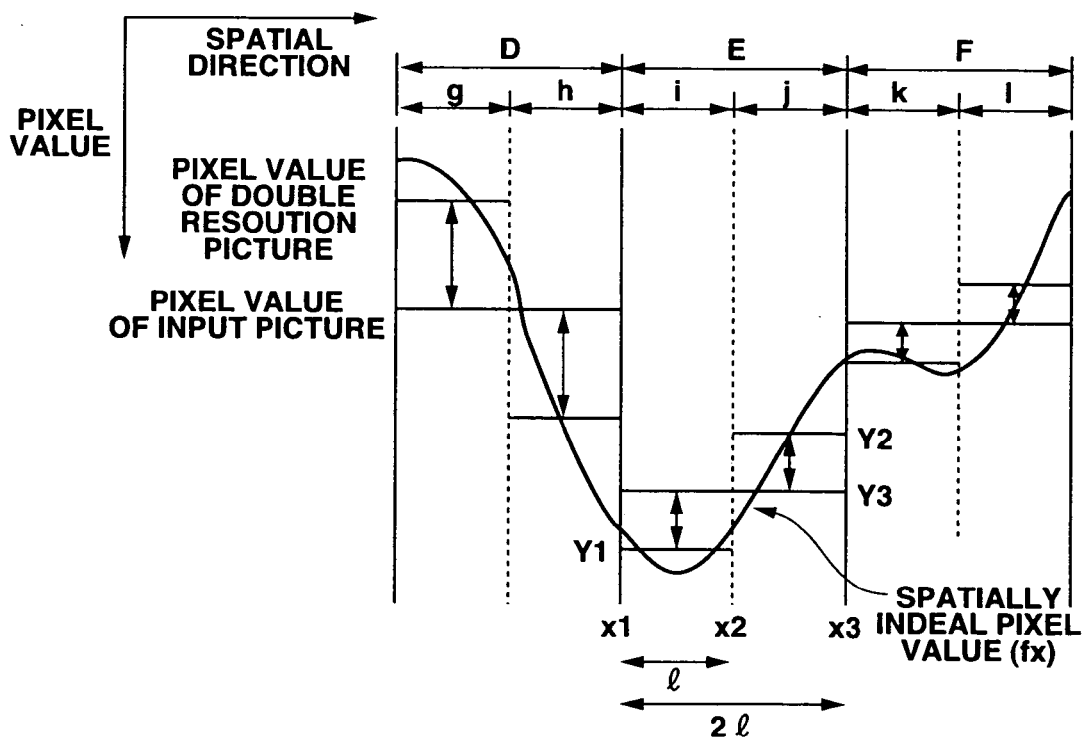
FIG. 80 illustrates a picture component of a picture corresponding to light input to areas A to r.

FIG. 80 illustrates pixel data corresponding to the light incident on the areas A to r. In FIG. 80, f'(x) denotes an spatially ideal pixel value in association with the input light and to the spatially tiny domain.

If a pixel value of a pixel data is represented by the uniform integration of the ideal pixel value f'(x), the pixel value Y1 of pixel data associated with the area i is represented by the equation (72):

$$Y1 = f(x)dx \cdot \frac{1}{e} \quad (72)$$

whilst the pixel value Y2 of the picture data associated with the area j and the pixel value Y3 of the pixel E are represented by the following equations (73) and (74):

$$Y2 = \int_{x2}^{x3} f(x)dx \cdot \frac{1}{e} \quad (73)$$

and $$Y3 = \int_{x1}^{x3} f(x)dx \cdot \frac{1}{2e} \quad (74)$$
$$= \frac{Y1 + Y2}{2}$$

respectively.

In the above equations (72) to (74), x1, x2 and x3 are spatial coordinates of the respective boundaries of the light reception area, area i and the area j of the pixel E, respectively.

By modifying the equation (74), the following equations (75), (76) may be derived:

$$Y1 = 2 \cdot Y3 \cdot Y2 \quad (75)$$

and $$Y2 = 2 \cdot Y3 \cdot Y1 \quad (76).$$

Therefore, if the pixel value Y3 of the pixel E and the pixel value Y2 of the pixel data corresponding to the area j are known, the pixel value Y1 of the pixel data corresponding to the area i may be calculated from the equation (75). Also, if the pixel value Y3 of the pixel E and the pixel value Y1 of the pixel data corresponding to the area i are known, the pixel value Y2 of the pixel data corresponding to the area j can be calculated from the area j.

If the pixel value corresponding to a pixel and one of pixel values of the pixel data corresponding to the two areas of the pixel are known, the pixel value of the other pixel data corresponding to the other areas of the pixel may be calculated.

Referring to FIG. 81, the manner of calculating the pixel values of the pixel data corresponding to the two areas of one pixel is explained. FIG. 81A shows the relation between the pixels D, E and F and the spatially ideal pixel value f'(x).

Figure 81A:
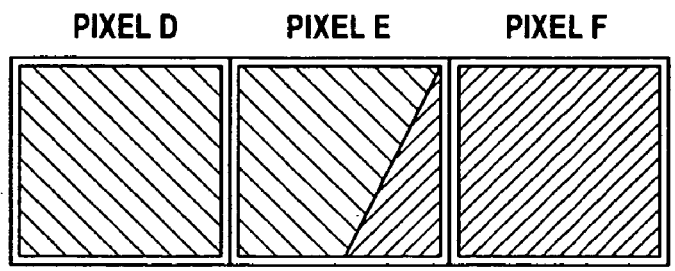
FIGS. 81A, 81B, 81C and 81D illustrates calculation of picture components corresponding to two areas of a pixel.
Figure 81B:
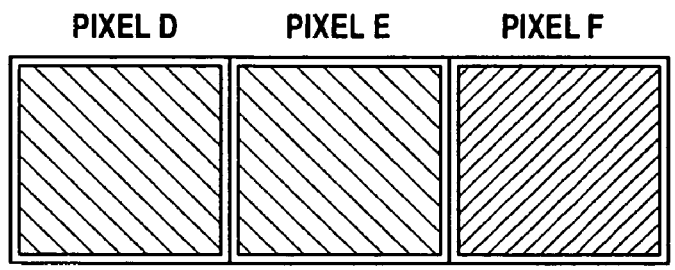
Figure 81C:
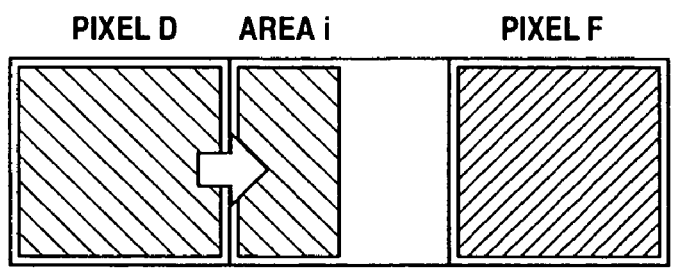

Since the pixels D to F own integrating effects, and one pixel outputs a pixel value, each one pixel value is output, as shown in FIG. 81B. The pixel value output by the pixel E corresponds to the integrated value of the pixel value f'(x) in the range of the light reception area.

The correlation calculating unit 703 generates the correlation value between the pixel value of the pixel D and that of the pixel E, and the correlation value between the pixel value of the pixel E and that of the pixel F, to route the so-generated correlation value to the pixel value generator 702. The correlation value calculated by the correlation calculating unit 703 is calculated based on the difference between the pixel value of the pixel D and that of the pixel E, or on the difference between the pixel value of the pixel E and that of the pixel F. When the pixel values of neighboring pixels are closer to each other, these pixels may be said to have higher correlation. That is, a smaller value of the difference between pixel values indicate stronger correlation.

So, if the difference between the pixel value of the pixel D and that of the pixel E, or the difference between the pixel value of the pixel E and that of the pixel F, is directly used as a correlation value, the correlation value, which is the smaller difference value, exhibits stronger correlation.

For example, if the correlation between the pixel value of the pixel D and that of the pixel E are stronger than that between the pixel value of the pixel E and that of the pixel F, the pixel value generator 702 divides the pixel value of the pixel D by 2 to use the resulting value as pixel data of the area i.

Figure 81D:
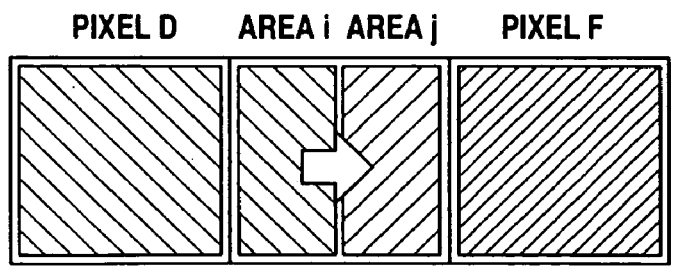

Based on the pixel value of the pixel E and on the pixel value of the area i, the pixel value generator 702 calculates the pixel values of the pixel data of the area j in accordance with the equation (75) or (76), as shown in FIG. 81D.

The pixel value generator 702 calculates the pixel values of the pixel data of the area g and those of the pixel data of the area h, for e.g., the pixel D, to calculate the pixel value of the pixel data of the area i and the pixel value of the pixel data of the area j, and then to calculate the pixel value of the pixel data of the area k and the pixel value of the pixel data of the area l, and so on, to calculate the pixel values of the pixel data in the picture as described above to generate a horizontal double-density picture comprehending the pixel values of the pixel data calculated to furnish the so-generated horizontal double-density picture to the frame memory 704.

Similarly to the pixel value generator 702, the pixel value generating unit 705 calculates, from the correlation of the pixel values of three vertically arrayed pixels of the horizontal double-density picture, supplied from the correlation calculating unit 706, and from the pixel values of the three pixels, the pixel values of the picture data corresponding to two areas obtained on vertically splitting the light reception area of the pixel, to thereby generate the double density picture.

Figure 82:
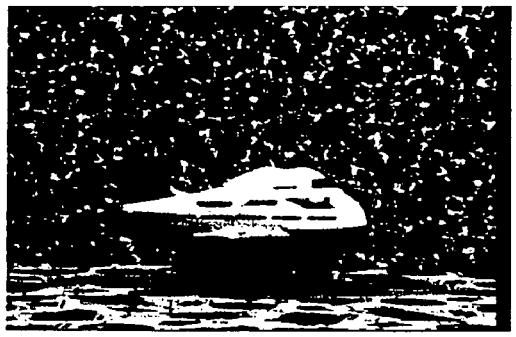
FIG. 82 shows a typical input picture.
Figure 83:
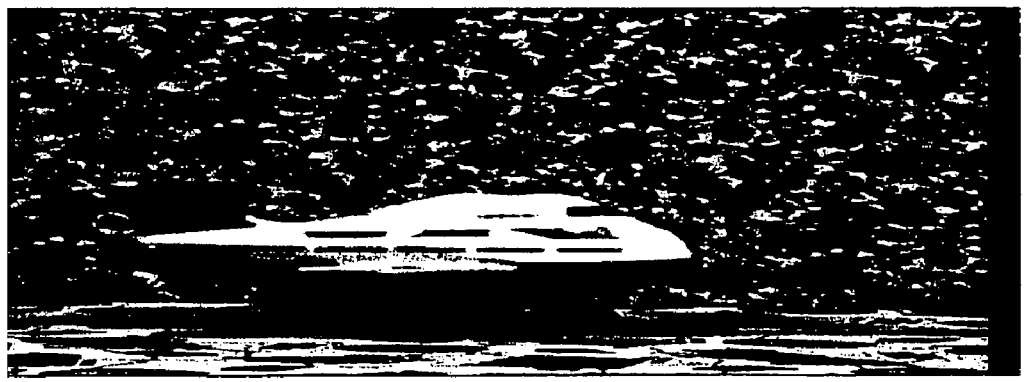
FIG. 83 shows a typical double horizontal density picture.

When fed with the picture shown as an example in FIG. 82, the pixel value generating unit 702 generates a double-density picture shown as an example in FIG. 83.

Figure 84:
FIG. 84 shows a typical double vertical density picture.
Figure 85:
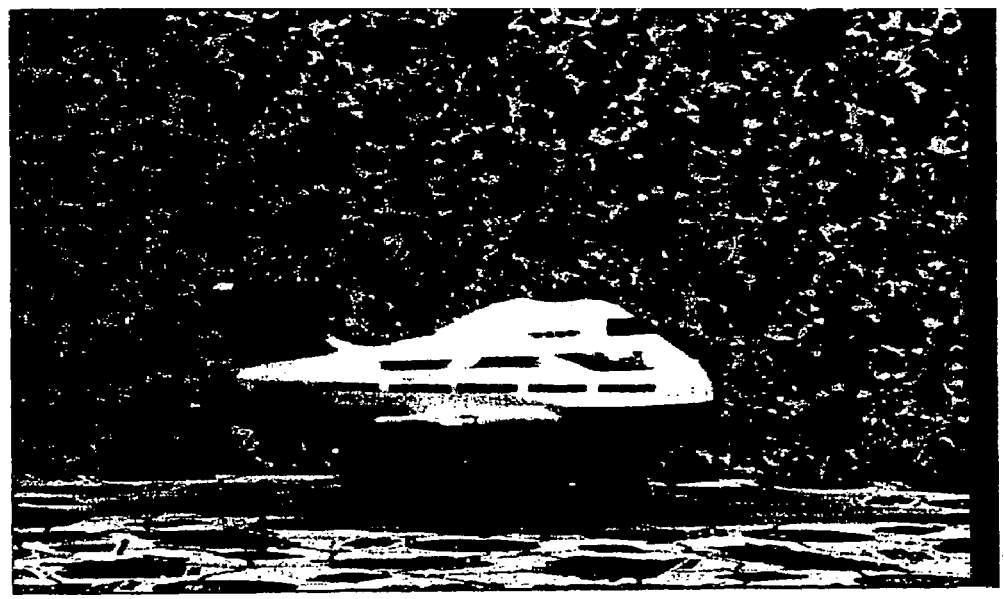
FIG. 85 shows a double density picture.

When fed with a picture, shown as an example in FIG. 82, the pixel value generating unit 705 generates a picture, shown as an example in FIG. 84. When fed with a horizontal double-density picture, shown as an example in FIG. 83, the pixel value generating unit 705 generates a double-density picture, shown as an example in FIG. 85.

Figure 86:
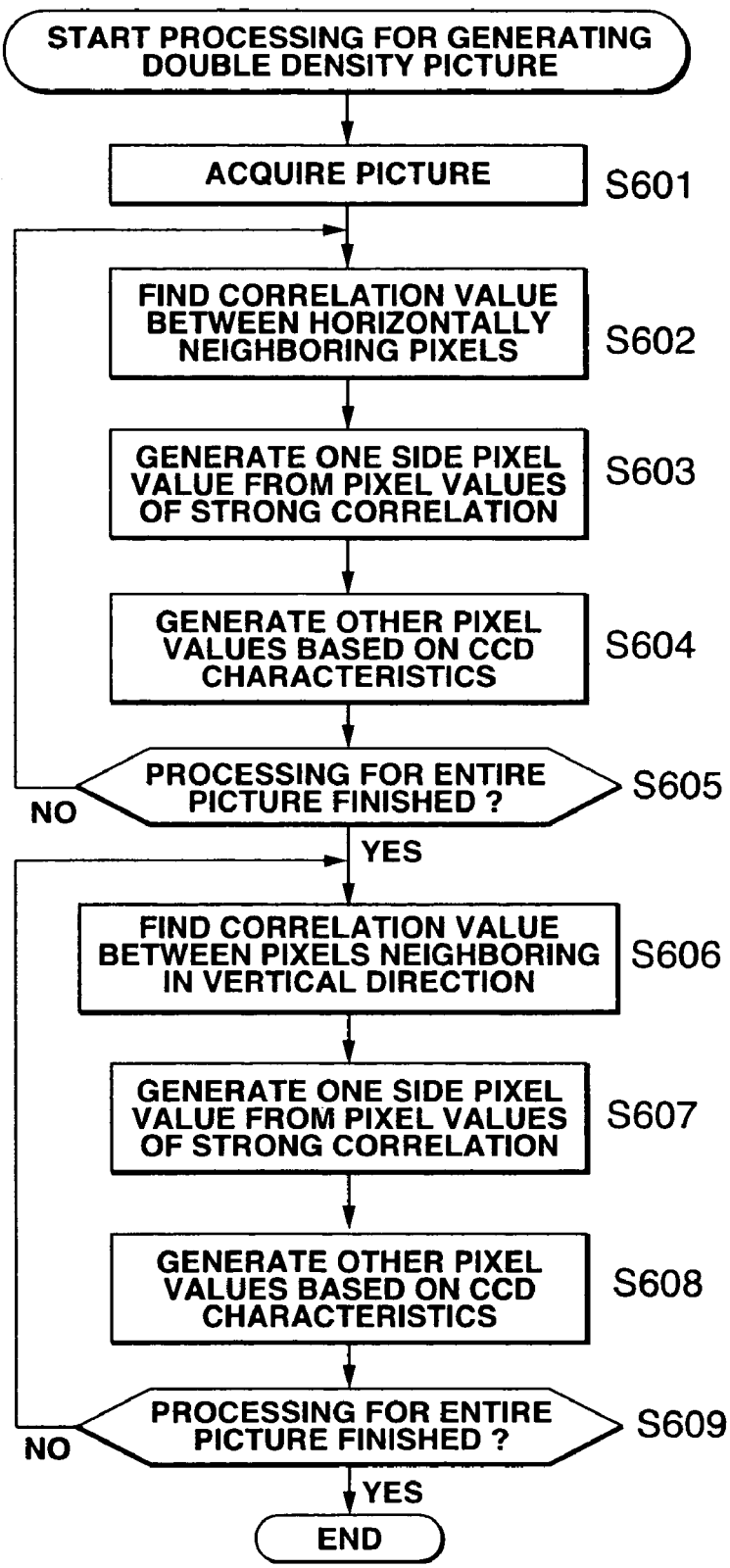
FIG. 86 is a flowchart for illustrating the processing for generating a double density picture by a signal processor 12 shown in FIG. 78.

FIG. 86 is a flowchart for illustrating the processing for generating the double-density picture by the signal processor 12, a structure of which is shown in FIG. 78. At step S601, the signal processor 12 acquires an input picture to store it in the frame memory 701.

At step S602, the correlation calculating unit 703 selects one of the pixels in the picture as a considered pixel, and finds a pixel horizontally neighboring to the considered pixel, based on the pixel value stored in the frame memory 701. At step S603, the pixel value generator 702 generates a pixel value of pixel data lying on one side of the horizontal double-density picture from a pixel value exhibiting stronger correlation, that is a higher correlation value.

Based on the characteristics of the CCD, the pixel value generator 702 at step S604 generates pixel values of other pixel data of the horizontal double-density picture. Specifically, the pixel value generator 702 calculates pixel values of the other picture data of the horizontal double-density picture, based on the pixel value calculated by the processing of step S603 and on the pixel value of the picture data of the input picture, in accordance with the equations (75) and (76) explained with reference to FIG. 80. The picture data of the horizontal double-density picture for the considered pixel, generated by the processing at steps S603 and S604, are stored in the frame memory 704.

At step S605, the pixel value generator 702 checks whether or not the processing of the entire picture has come to a close. If it is determined that the processing of the entire picture has come to a close, the program reverts to step S602 to select the next pixel as the considered pixel to repeat the processing of generating the horizontal double-density picture.

If it is determined at step S605 that the processing of the entire picture has come to a close, the correlation calculating unit 706 selects one of the pixels in the picture as the considered pixel to find the correlation value of the pixel neighboring to the considered pixel in the vertical direction based on the pixel value of the horizontal double-density picture stored in the frame memory 704. At step S607, the pixel value generating unit 705 generates the pixel value of the one side of the double-density picture from the pixel values of the stronger correlation, based on the correlation value supplied from the correlation calculating unit 706.

At step S608, as at step S604, the pixel value generating unit 705 generates the other pixel value of the double-density picture, based on the characteristics of the CCD. Specifically, the pixel value generator 702 calculates the pixel values of the other picture data of the double-density picture, based on the pixel values calculated by the processing at step S607 and on the pixel value of the pixel data of the horizontal double-density picture, in accordance with the equations (75) and (76) explained with reference to FIG. 80.

At step S609, the pixel value generating unit 705 decides whether or not the processing of the entire picture has been finished. If it is decided that the processing of the entire picture has not been finished, the program reverts to step S606 to select the next pixel as the considered pixel to repeat the processing of generating the double-density picture.

If it is decided at step S609 that the processing of the entire picture has been finished, the pixel value generating unit 705 outputs the so-generated double-density picture to complete the processing.

In this manner, a double-density picture, the number of pixels of which in the vertical and in the horizontal directions are doubled, may be produced from the input picture by the signal processor 12, the structure of which is shown in FIG. 78.

The signal processor 12, the structure of which is shown in FIG. 78, is able to generate a picture of high spatial resolution by performing signal processing taking account of the pixel correlation and the integrating effect of the CCD with respect to the space.

In the foregoing, a picture of the real space having a three-dimensional space and the time axis information is mapped on a time space having the two-dimensional space and the time axis information using a video camera. The present invention is, however, not limited to this embodiment and may be applied to correction of distortion caused by projecting the first information of a higher order first dimension to the lower-order second dimension, extraction of the significant information or to synthesis of more spontaneous pictures.

The sensor 11 may also be a sensor exemplified by, for example, a BBD (bucket brigard device), a CID (charge injection device) or a CDD (charge priming device), without being limited to a CCD. The sensor 11 may also be a sensor in which detection devices are arranged in a row instead of in a matrix.

The recording medium, having recorded thereon a program for executing the signal processing of the present invention may not only be constructed by a package medium, distributed to users for furnishing the program separately from a computer, inclusive of a magnetic disc 51, such as a floppy disc, having the program pre-recorded thereon, an optical disc 52, such as CD-ROM, Compact Disc, read-only memory or DVD (digital versatile disc), a magneto-optical disc 53, such as MD (mini-disc) or a semiconductor memory 54. But may also be constructed by a ROM 22 furnished to the user in a pre-assembled state in a computer, and having the program recorded thereon, and a hard disc included in the memory unit 28.

It should be noted that, in the present specification, the step for stating a program recorded on a recording medium includes not only the processing carried out chronologically in the specified sequence but also the processing that is not necessarily processed chronologically but is executed in parallel or batch-wise.

Thus, based on the area information specifying a foreground area made up only of foreground object components making up a foreground object in the picture data, a background area made up only of background object components making up a background object in the picture data, and on a mixed area which is a mixture of the foreground object components and the background object components in the picture data, and on the picture data, the mixed area including a covered background area formed at a leading end in the movement direction of the foreground object, and an uncovered background area formed at a trailing end of the foreground object, a processing unit made up of pixel data lying on at least a straight line extending in a direction coincident with the direction of movement of the foreground object from an outer end of the covered background area to an outer end of the uncovered background area, centered about the foreground area, are set. A normal equation is then generated by setting pixel values of pixels in the processing unit decided based on the processing unit and an unknown dividing value obtained on dividing the foreground object components in the mixed area with a predetermined dividing number. This normal equation is solved by the least square method to generate foreground object components adjusted for the quantity of movement blurring to adjust the movement blurring quantity.

Also, sample data present in detection data lying ahead and at back of the considered detection data where there exist considered sample data which is the sample data under consideration is extracted as foreground sample data corresponding to the foreground in the real world, whilst sample data present in detection data lying ahead and at back of the considered detection data where there exist considered sample data which is the sample data under consideration is extracted as background sample data corresponding to the background in the real world, and the mixing ratio of the considered sample data is detected based on the considered sample data, foreground sample data and on the background sample data, thereby enabling the detection of the mixing ratio.

The still/movement decision is given, based on the detection data, and a mixed area containing sample data comprised of a mixture of plural objects in the real world is detected, thereby enabling detection of the mixing ratio.

The second signal of a second dimension is acquired by detecting the first signal of the real world having a first dimension as mapped on the sensor, with the second dimension being lower than the first dimension, and the signal processing is performed on the second signal, thereby enabling the significant information buried due to projection to be extracted from the second signal.

Since the second signal is acquired by detecting the first signal of the real world having the first dimension by the sensor, with the second signal being of a second dimension lower than the first dimension and presenting distortion relative to the first signal, and a third signal, alleviated in distortion relative to the second signal, is generated by processing based on the second signal, it is possible to alleviate the signal distortion.

In the detection signal, the foreground area, composed only of the foreground object components, constituting the foreground object, the background area, composed only of the background object components, constituting the background object, and the mixed area composed of the foreground object components and the background object components, are specified, the mixing ratio of the foreground object components and background object components at least in the mixed area-is detected, and the foreground object components and background object components are separated from each other based on the specified results and on the mixing ratio, thus enabling utilization of the foreground and background objects as data of higher quality.

In the detection signal, the foreground area, composed only of the foreground object components, constituting the foreground object, the background area, composed only of the background object components, constituting the background object, and the mixed area composed of the foreground object components and the background object components, are specified, and the mixing ratio of the foreground and background object components in at least the mixed area is determined based on the specified results, thus enabling detection of the mixing ratio as the significant information.

The mixing ratio of the foreground and background object components in the mixed area comprised of a mixture of the foreground object components, constituting the foreground object, and the background object components, constituting the background object, is detected, and the foreground and background object components are separated from each other based on the mixing ratio, thus enabling utilization of the foreground and background objects as data of higher quality.

The invention claimed is:

1. A signal processing apparatus for processing detection data, acquired during a predetermined time period by a sensor made up of a predetermined number of detection elements having time-integrating effects, every predetermined time period, said signal processing apparatus comprising:
   still/movement decision means for deciding still/movement based on said detection data; and
   detection means for detecting a mixed area containing sample data having plural real world objects mixed together based on the results of discrimination,
   wherein said still/movement decision means includes:
      first decision means for discriminating whether said sample data being discriminated has moved, before a reference time point, from a state in which the sample value data is substantially constant with lapse of time to a state in which the sample value data is changed with lapse of time, and
      second decision means for discriminating whether said sample data being discriminated has moved, after said reference time point, from a state in which the sample value data is changed with lapse of time to a state in which the sample value data is substantially constant with lapse of time;
   said detection means detecting said sample data being discriminated as said sample data belonging to said mixed area when said first decision means determining that said sample data being discriminated has moved, before a reference time point, from a state in which the sample value data is substantially constant with lapse of time to a state in which the sample value data is changed with lapse of time, or when said second decision means determining that said sample data being discriminated has moved, after said reference time point, from a state in which the sample value data is changed with lapse of time to a state in which the sample value data is substantially constant with lapse of time.

2. The signal processing apparatus according to claim 1 wherein when said first decision means determining that said sample data being discriminated has moved, before a reference time point, from a state in which the sample value data is substantially constant to a state in which the sample value data is changed with lapse of time with lapse of time, said detection means detects said sample data being discriminated as said sample data belonging to a covered background area; and
   wherein when said second decision means determining that said sample data being discriminated has moved, after a reference time point, from a state in which the sample value data is changed with lapse of time to a state in which the sample value data is substantially constant with lapse of time, said detection means detects said sample data being discriminated as said sample data belonging to an uncovered background area.

3. The signal processing apparatus according to claim 1 wherein said detection data is picture data.

4. A signal processing method for processing detection data, acquired every predetermined time period by a sensor made up of a predetermined number of detection elements having time-integrating effects, every predetermined time period, said signal processing method comprising:
   a still/movement decision step of deciding still/movement by a still/moving decision circuit based on said detection data; and
   a detection step of detecting a mixed area containing sample data having plural real world objects mixed together based on the results of discrimination,
   wherein said still/movement decision step includes:
      a first decision step for discriminating whether said sample data being discriminated has moved, before a reference time point, from a state in which the sample value data is substantially constant with lapse of time to a state in which the sample value data is changed with lapse of time, and
      a second decision step for discriminating whether said sample data being discriminated has moved, after said reference time point, from a state in which the sample value data is changed with lapse of time to a state in which the sample value data is substantially constant with lapse of time;

said detection step detecting said sample data being discriminated as said sample data belonging to said mixed area when said first decision step determines that said sample data being discriminated has moved, before a reference time point, from a state in which the sample value data is substantially constant with lapse of time to a state in which the sample value data is changed with lapse of time, or when said second decision step determines that said sample data being discriminated has moved, after said reference time point, from a state in which the sample value data is changed with lapse of time to a state in which the sample value data is substantially constant with lapse of time.

5. A signal processing program recorded on a computer-readable medium for processing detection data, acquired every predetermined time period by a sensor made up of a predetermined number of detection elements having time-integrating effects, every predetermined time period, said signal processing program comprising:

a still/movement decision step of deciding still/movement based on said detection data; and a detection step of detecting a mixed area containing sample data having plural real world objects mixed together based on the results of discrimination, wherein said still/movement decision step includes:

first decision step for discriminating whether said sample data being discriminated has moved, before a reference time point, from a state in which the sample value data is substantially constant with lapse of time to a state in which the sample value data is changed with lapse of time, and second decision step for discriminating whether said sample data being discriminated has moved, after said reference time point, from a state in which the sample value data is changed with lapse of time to a state in which the sample value data is substantially constant with lapse of time;

said detection step detecting said sample data being discriminated as said sample data belonging to said mixed area when said first decision step determines that said sample data being discriminated has moved, before a reference time point, from a state in which the sample value data is substantially constant with lapse of time to a state in which the sample value data is changed with lapse of time, or when said second decision step determines that said sample data being discriminated has moved, after said reference time point, from a state in which the sample value data is changed with lapse of time to a state in which the sample value data is substantially constant with lapse of time.

* * * * *